United States Patent
Xu et al.

(10) Patent No.: US 12,050,768 B2
(45) Date of Patent: Jul. 30, 2024

(54) CARD DISPLAY METHOD, ELECTRONIC DEVICE, AND COMPUTER READABLE STORAGE MEDIUM

(71) Applicant: Honor Device Co., Ltd., Shenzhen (CN)

(72) Inventors: Jie Xu, Shenzhen (CN); Shoucheng Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 121 days.

(21) Appl. No.: 17/793,480

(22) PCT Filed: Jan. 19, 2021

(86) PCT No.: PCT/CN2021/072592
§ 371 (c)(1),
(2) Date: Jul. 18, 2022

(87) PCT Pub. No.: WO2021/159922
PCT Pub. Date: Aug. 19, 2021

(65) Prior Publication Data
US 2023/0077467 A1    Mar. 16, 2023

(30) Foreign Application Priority Data
Feb. 11, 2020    (CN) .......................... 202010094030.9

(51) Int. Cl.
*G06F 3/04817* (2022.01)
*G06F 3/0481* (2022.01)
(Continued)

(52) U.S. Cl.
CPC .......... *G06F 3/0488* (2013.01); *G06F 3/0481* (2013.01); *G06F 3/04817* (2013.01);
(Continued)

(58) Field of Classification Search
None
See application file for complete search history.

(56) References Cited

U.S. PATENT DOCUMENTS 5,499,334 A * 3/1996 Staab .................. G06F 9/44505
715/802
5,841,435 A * 11/1998 Dauerer ................ G06F 3/0481
715/764
(Continued)

FOREIGN PATENT DOCUMENTS

| CN | 101241413 A | 8/2008 |
| CN | 102193719 A | 9/2011 |

(Continued)

OTHER PUBLICATIONS

Tea Man, "A horizontal evaluation of the floating window function of mainstream download software from the university in a small floating window," Perfect Skill, Oct. 9, 2008, 3 pages, (with English abstract).

(Continued)

*Primary Examiner* — Ryan Barrett
(74) *Attorney, Agent, or Firm* — Conley Rose, P.C.

(57) ABSTRACT

An electronic device in this application includes a display, a processor, a memory, and a computer program stored in the memory. When the computer program is executed by the processor, the electronic device is caused to perform the following steps: displaying a current screen of a home screen, where the current screen of the home screen displays several icons and a background; detecting a user input on a first icon of the several icons; and displaying a first card on the current screen, where the first card does not fill up the current screen. The first icon corresponds to a first application. The first card includes: first card content, including part of content included in an $M^{th}$-layer interface that is displayed after the first application is launched; and N controls, (Continued)

where each of the N controls is used to launch a corresponding application, the application corresponds to a corresponding icon that is displayed on the home screen before the first card is displayed, the first card is different from all and any part of the $M^{th}$-layer interface that is displayed after the first application is launched, and both M and N are positive integers. A user can not only intuitively obtain card content, but also directly launch several second applications, and can also directly perform an operation on the current screen of the home screen.

22 Claims, 44 Drawing Sheets

(51) Int. Cl.
| | | |
|---|---|---|
| *G06F 3/0482* | (2013.01) | |
| *G06F 3/0483* | (2013.01) | |
| *G06F 3/0484* | (2022.01) | |
| *G06F 3/0488* | (2022.01) | |

(52) U.S. Cl.
CPC .......... *G06F 3/0482* (2013.01); *G06F 3/0483* (2013.01); *G06F 3/0484* (2013.01)

(56) References Cited

U.S. PATENT DOCUMENTS

| | | | |
|---|---|---|---|
| 9,798,443 B1 | 10/2017 | Gray | |
| 10,437,422 B2 | 10/2019 | Zatalovski | |
| 11,080,069 B2 | 8/2021 | Lin et al. | |
| 11,474,664 B2 | 10/2022 | Zhu et al. | |
| 2006/0161859 A1* | 7/2006 | Holecek | G06F 3/048 715/781 |
| 2006/0277491 A1 | 12/2006 | Kaneko | |
| 2008/0189658 A1 | 8/2008 | Jeong et al. | |
| 2009/0172587 A1 | 7/2009 | Carlisle et al. | |
| 2010/0107115 A1* | 4/2010 | Sareen | G06F 9/451 715/783 |
| 2010/0162108 A1* | 6/2010 | Stallings | G06F 3/04886 715/810 |
| 2010/0287505 A1* | 11/2010 | Williams | G06F 3/04817 715/834 |
| 2011/0078624 A1* | 3/2011 | Missig | G06F 3/0488 345/173 |
| 2011/0169749 A1* | 7/2011 | Ganey | G06F 1/1626 345/173 |
| 2012/0005269 A1 | 1/2012 | Janssen et al. | |
| 2012/0030623 A1* | 2/2012 | Hoellwarth | G06F 3/04817 715/811 |
| 2012/0084644 A1 | 4/2012 | Robert | |
| 2012/0159386 A1* | 6/2012 | Kang | G06F 3/04883 715/800 |
| 2013/0047119 A1* | 2/2013 | Lee | G06F 3/04883 715/800 |
| 2013/0061172 A1 | 3/2013 | Huang et al. | |
| 2013/0125043 A1* | 5/2013 | Jeon | G06F 3/04815 345/173 |
| 2014/0068518 A1 | 3/2014 | Liu et al. | |
| 2015/0058796 A1* | 2/2015 | Thakur | G06F 3/04883 715/781 |
| 2015/0067589 A1* | 3/2015 | Xiao | G06F 3/04883 715/788 |
| 2016/0062640 A1 | 3/2016 | Lu | |
| 2017/0046025 A1 | 2/2017 | Dascola et al. | |
| 2017/0124055 A1 | 5/2017 | Radakovitz et al. | |
| 2018/0335939 A1* | 11/2018 | Karunamuni | G06F 3/0481 |
| 2019/0369830 A1* | 12/2019 | Alonso Ruiz | G06F 3/0483 |
| 2019/0369862 A1* | 12/2019 | de Vries | G06F 3/04883 |
| 2020/0310627 A1* | 10/2020 | Ning | G06F 9/451 |
| 2021/0349590 A1 | 11/2021 | Lei | |
| 2022/0188131 A1 | 6/2022 | Song | |
| 2022/0229708 A1 | 7/2022 | Hu | |
| 2022/0269405 A1 | 8/2022 | Wu et al. | |
| 2022/0291816 A1 | 9/2022 | Fan et al. | |
| 2022/0350450 A1* | 11/2022 | Li | G06F 9/485 |

FOREIGN PATENT DOCUMENTS

| | | |
|---|---|---|
| CN | 102722588 A | 10/2012 |
| CN | 103210371 A | 7/2013 |
| CN | 103558958 A | 2/2014 |
| CN | 104598109 A | 5/2015 |
| CN | 105677183 A | 6/2016 |
| CN | 105808095 A | 7/2016 |
| CN | 106227404 A | 12/2016 |
| CN | 106598394 A | 4/2017 |
| CN | 106775192 A | 5/2017 |
| CN | 106775814 A | 5/2017 |
| CN | 107665162 A | 2/2018 |
| CN | 109643207 A | 4/2019 |
| CN | 109766036 A | 5/2019 |
| CN | 109814972 A | 5/2019 |
| CN | 110032307 A | 7/2019 |
| CN | 110262877 A | 9/2019 |
| CN | 110333814 A | 10/2019 |
| CN | 110489043 A | 11/2019 |
| CN | 110647274 A | 1/2020 |
| CN | 111966251 A | 11/2020 |
| JP | 9171451 A | 6/1997 |
| JP | 1125285 A | 1/1999 |
| JP | 2013058188 A | 3/2013 |
| JP | 2016517991 A | 6/2016 |
| KR | 20180074443 A | 7/2018 |

OTHER PUBLICATIONS

Luigi Sportiello, "Internet of Smart Cards": A pocket attacks scenario, Wireless News, Sep. 10, 2019, 15 pages.

* cited by examiner

CARD DISPLAY METHOD, ELECTRONIC DEVICE, AND COMPUTER READABLE STORAGE MEDIUM

CROSS-REFERENCE TO RELATED APPLICATIONS

This application is a U.S. National Stage of International Application No. PCT/CN2021/072592 filed on Jan. 19, 2021, which claims priority to Chinese Patent Application No. 202010094030.9, filed with the China National Intellectual Property Administration on Feb. 11, 2020, both of which are incorporated herein by reference in their entireties.

TECHNICAL FIELD

This application relates to the field of information display, and in particular, to a card display method, an electronic device, and a computer readable storage medium.

BACKGROUND

Cards allow users to view relevant information or run a specific function of an application intuitively and conveniently on an electronic device, and therefore are widely used. However, currently, cards are displayed at fixed positions, without sufficient flexibility; it is complex to display and switch between cards, causing high management costs; and cards take up space for icons, affecting a layout on a home screen, or block icons, causing inconvenience to operate applications corresponding to those icons.

SUMMARY

To resolve the foregoing technical problems existing in the conventional technology, this application provides a card display method, an electronic device, and a computer readable storage medium, allowing a user to display and switch between cards, and manipulate other applications on a current screen (current screen) of a home screen (home screen) through only simple operations, thereby facilitating flexible card positions, low management costs, and ease of operation, and improving user experience.

According to a first aspect, an electronic device is provided. The electronic device includes a display, one or more processors, a memory, and one or more computer programs. The one or more computer programs are stored in the memory, and when the one or more computer programs are executed by the one or more processors, the electronic device is caused to perform the following steps: displaying a current screen of a home screen, where the current screen displays several icons; detecting a first user input on a first icon of the several icons; and in response to the first user input, displaying a first card on the current screen, where the first card does not fill up the current screen. The first icon is a first folder icon, the first folder icon includes at least a first application icon, and the first application icon corresponds to a first application: or the first icon is a first application icon, and the first application icon corresponds to a first application. The first card includes at least: first card content, where the first card content includes part of content included in an $M^{th}$-layer interface that is displayed after the first application is launched, and M is a positive integer greater than or equal to 1; and N controls, where each of the N controls is used to launch a corresponding application, the application corresponds to a corresponding icon that is displayed on the home screen before the first card is displayed, and N is a positive integer greater than or equal to 1. The first card is different from all and any part of the $M^{th}$-layer interface that is displayed after the first application is launched. That the first card is different from all and any part of the $M^{th}$-layer interface that is displayed after the first application is launched means that the first card is different from the M-layer interface as a whole that is displayed after the first application is launched, and is also different from any part of the $M^{th}$-layer interface that is displayed after the first application is launched. In this way, with a user input on the first icon, the first card can be displayed on the current screen, without a need to switch from the current screen to another screen, thereby facilitating relatively low card management costs and relatively flexible positions for displaying cards. In addition, with a limited scope defined for the first card content, the first card may be displayed with content of only key information, allowing intuitive and quick obtainment of the key information. Besides, because the first card is displayed on the current screen of the home screen and does not fill up the current screen, the user can still intuitively obtain information that is displayed in a region other than the first card on the current screen, and can directly perform an operation on the current screen, for example, touch an icon that is displayed in the region other than the first card on the current screen to launch a corresponding application, or swipe left or right on a background that is displayed in the region other than the first card on the current screen of the home screen to switch to another screen. In addition, by using each of the N controls on the first card, the user can also directly launch a corresponding application. In other words, the user can not only intuitively obtain the first card content, but also directly launch an application corresponding to one of the N controls, and can also directly perform an operation on the current screen. This facilitates convenience of use for the user in these three aspects, striking a balance among convenience of use in the three aspects. Furthermore, as long as displaying of the first card is not stopped, the first card is always displayed on the current screen. In this way, when the user needs to always use the first card content in a near future, after the first card is displayed on the current screen, the user can directly use the first card content on the current screen without a need to perform the first user input again. Technical features included in this technical solution are closely related to each other, and form an inseparable whole. Because of such whole, this technical solution produces the foregoing beneficial technical effects. This applies to all solutions corresponding to the following embodiments, and is not noted again.

According to the first aspect or any one of the foregoing implementations of the first aspect, a region occupied by the first card on the current screen is a first region; and before the first card is displayed, N icons are located in the first region, or N icons are located in a region other than the first region on the current screen, or N icons are located on a screen of the home screen other than the current screen, or any part of N icons is located in any of the three regions. In this way, before the first card is displayed, the N icons corresponding to the N controls on the first card may be located in the first region or a region other than the first region on the current screen, or on a screen of the home screen other than the current screen. Therefore, an application corresponding to any icon displayed on the home screen can be launched from the first card, which is more convenient for the user.

According to the first aspect or any one of the foregoing implementations of the first aspect, the first user input is implemented by one step of operation; the first card content accounts for a largest proportion of an area of the first card; an area of the first card content is greater than or equal to an area of the first icon; the region occupied by the first card on the current screen is the first region; the current screen also displays a background; and before the first card is displayed, the N controls correspond to the N icons, the N icons are displayed in the first region, the first region includes only a first part of the background, the first icon, and the N icons, and a quantity of icons included in the first region is equal to N plus 1. In this way, it is defined that the card can be displayed by performing only one operation on the current screen, thereby greatly reducing costs such as card management steps, providing convenience of operation for the user, and improving user experience; the first card content is displayed more prominently, so that the user intuitively and quickly obtains the first card content; and it is further defined that a position at which the first card is displayed on the current screen is a position that is on the current screen and that includes the first icon, the N icons, and the second part of the background before the first card is displayed. In this way, it is more convenient for the user to obtain a positional relationship between the first card and the first icon and N icons.

According to the first aspect or any one of the foregoing implementations of the first aspect, M is a positive integer greater than or equal to 2. In this way, through a user input, a second-layer interface, a third-layer interface, or a deeper-layer interface that is displayed after the first application is launched can be directly displayed on the card, reducing operation steps and providing convenience for the user. For example, a payment code interface of Alipay is a second-layer interface of Alipay, and is directly displayed through a user input. Other interfaces deeper than the second-layer interface can also be directly displayed through a user input.

According to the first aspect or any one of the foregoing implementations of the first aspect, the electronic device further performs the following steps: detecting a second user input on one of the N controls; in response to the second user input, displaying an $S^{th}$-layer interface that is displayed after an application corresponding to the one of the N controls is launched, where S is a positive integer greater than or equal to 1; detecting a return operation; and in response to the return operation, displaying the current screen, where content displayed on the current screen is content that is displayed on the current screen before the second user input is responded to. In this way, a manner is provided for accessing, from the first card, the $S^{th}$-layer interface that is displayed after the application corresponding to the one of the N controls is launched. This manner gives ease of operation for the user, allowing fast switching to the $S^{th}$-layer interface that is displayed after the application corresponding to the one of the N controls is launched. In addition, a manner is also provided for returning to the content that is displayed on the current screen before the second user input is responded to, from the $S^{th}$-layer interface that is displayed after the application corresponding to the one of the N controls is launched, that is, returning to a state with the first card displayed on the current screen. This manner gives ease of operation for the user, allowing fast switching back to the state with the first card displayed on the current screen.

According to the first aspect or any one of the foregoing implementations of the first aspect, the electronic device further performs the following steps: detecting a third user input on the first card on the current screen; and in response to the third user input, displaying, in the first region, content that is displayed in the first region before the first user input is responded to. In this way, displaying the first card can be stopped on the current screen through the third user input, without a need to switch from the current screen to another screen, thereby greatly reducing costs such as card management steps, providing ease of operation, and allowing quick switching back to a state with displaying of the content that is displayed in the first region before the first user input is responded to.

According to the first aspect or any one of the foregoing implementations of the first aspect, the electronic device further performs the following steps: also displaying L icons in a region other than the first region on the current screen, where L is a positive integer greater than or equal to 1; detecting a fourth user input on one of the L icons; in response to the fourth user input, displaying an interface that is displayed after an application corresponding to the one of the L icons is launched; detecting a return operation; and in response to the return operation, displaying the current screen, where content displayed on the current screen is content that is displayed on the current screen before the fourth user input is responded to. In this way, after the first card is displayed on the current screen, the user is able to launch the corresponding application by performing an operation on the one of the L icons displayed in the region other than the first region on the current screen, which provides convenience of operation. In addition, a manner is provided for returning to the content that is displayed on the current screen before the fourth user input is responded to, from the interface that is displayed after the application corresponding to the one of the L icons is launched, that is, returning to the state with the first card displayed on the current screen. This manner gives ease of operation for the user, allowing fast switching back to the state with the first card displayed on the current screen.

According to the first aspect or any one of the foregoing implementations of the first aspect, the first card further includes a first control, where the first control is used to launch the first application, and the first control is a control that is displayed after the first icon is reduced in size by a first scale factor; the N controls are controls that are displayed after the N icons are reduced in size by a second scale factor; an area of the first control is greater than an area of any one of the N controls; the first control, the N controls, and the first card content are displayed in an upper left corner, an upper right corner, and a middle lower part of the first card, respectively; the first user input is a first speech input or a first gesture input, where the first gesture input is a gesture input with a starting point located at the first icon and a swiping direction being upward, and the first card changes with the first gesture input; the second user input and the fourth user input are a second speech input and a fourth speech input, or a second gesture input and a fourth gesture input, respectively; the second gesture input and the fourth gesture input are touch inputs; the third gesture input is implemented by one step of operation; and the third gesture input is a gesture input with a starting point located at the first card and a swiping direction opposite to the swiping direction of the first gesture input. In this way, the user can learn from the first card that applications corresponding to the N controls can also be launched from the first card. In addition, the first control is displayed prominently in a manner of occupying a larger region, so that the user more clearly learns that the first card content corresponds to the first control. Besides, a preferred manner is provided for distribution and display of the first control, the N controls, and the first card content on the first card. In addition, two specific manners are defined for user input, requiring only an operation on the current screen without a need to switch from the current screen to another screen of the home screen, thereby greatly reducing costs such as card management steps, providing ease of operation, and improving user experience. Furthermore, a preferred way that is easy to use and easy to memorize is provided for implementation of the third gesture input, which can be memorized by the user together with a way of the first gesture input.

According to the first aspect or any one of the foregoing implementations of the first aspect, the electronic device further performs the following steps: detecting a fifth user input on a second icon of the several icons; and in response to the fifth user input, displaying a second card on the current screen, where the second card does not fill up the current screen. The second icon is a second folder icon, the second folder icon includes at least a second application icon, and the second application icon corresponds to a second application, or the second icon is a second application icon, and the second application icon corresponds to a second application. The second card includes at least: second card content, where the second card content corresponds to the second application, the second card content includes part of content included in a $P^{th}$-layer interface that is displayed after the second application is launched, and P is a positive integer greater than or equal to 1; and K controls, where each of the K controls is used to launch a corresponding application, the application corresponds to a corresponding icon that is displayed on the home screen before the second card is displayed, and K is a positive integer greater than or equal to 1. The second card is different from all and any part of the $P^{th}$-layer interface that is displayed after the second application is launched. An area of the second card content is greater than an area of the second icon. A region occupied by the second card on the current screen is a second region. The second region and the first region do not overlap and the current screen continues displaying the first card; or the second region and the first region overlap and the current screen stops displaying the first card. In this way, the second card can be displayed on the current screen, and a technical effect of displaying the second card on the current screen is the same as a technical effect of displaying the first card on the current screen. In addition, a limited scope is further defined for the second card content, with part of redundant information excluded, allowing concise second card content to be obtained or used by the user. In other words, when the second card is displayed on the current screen and does not fill up the current screen, the user can not only intuitively obtain the second card content, but also directly launch a fourth application, and can also directly perform an operation on the current screen. This facilitates convenience of use in these three aspects, striking a balance among convenience of use in the three aspects. Furthermore, both the first card and the second card can be displayed on the current screen, with a same operating procedure used for displaying the second card and the first card but different content displayed on the second card and the first card, where the icon based on which the second card is displayed is different from the icon based on which the first card is displayed. Displaying of the first card and displaying of the second card may be independent of each other with no mutual impact. Besides, as long as displaying of the second card is not stopped, the second card is always displayed on the current screen. In this way, when the user needs to always use the second card content in a near future, after the second card is displayed on the current screen, the user can directly use or obtain the second card content that is on the current screen and that corresponds to the second icon, without a need to perform the fifth user input again. Moreover, a condition under which both the first card and the second card are displayed and how the first card and the second card are displayed when co-display is not supported are defined.

According to the first aspect or any one of the foregoing implementations of the first aspect, the electronic device further performs the following steps: The fifth user input is implemented by one step of operation; the second card content accounts for a largest proportion of an area of the second card; an area of the second card content is greater than or equal to an area of the second icon; and before the second card is displayed, the K controls correspond to K icons, the K icons are displayed in the second region, the second region includes only a second part of the background, the second icon, and the K icons, and a quantity of icons included in the second region is equal to K plus 1. In this way, before the second card is displayed, the K icons corresponding to the K controls on the second card may be located in the second region or a region other than the second region on the current screen, or on a screen of the home screen other than the current screen. Therefore, an application corresponding to any icon displayed on the home screen can be launched from the second card, which is more convenient for the user.

According to the first aspect or any one of the foregoing implementations of the first aspect, the electronic device further performs the following steps: detecting a sixth user input on one of the K controls; in response to the sixth user input, displaying a $Q^{th}$-layer interface that is displayed after an application corresponding to the one of the K controls is launched, where Q is a positive integer greater than or equal to 1; detecting a return operation; and in response to the return operation, displaying the current screen, where content displayed on the current screen is content that is displayed on the current screen before the sixth user input is responded to. In this way, a manner is provided for accessing, from the second card, the $Q^{th}$-layer interface that is displayed after the application corresponding to the one of the K controls is launched. This manner gives ease of operation for the user, allowing fast switching to the $Q^{th}$-layer interface that is displayed after the application corresponding to the one of the K controls is launched. In addition, a manner is also provided for returning to the content that is displayed on the current screen before the sixth user input is responded to, from the $Q^{th}$-layer interface that is displayed after the application corresponding to the one of the K controls is launched. This manner gives ease of operation for the user.

According to the first aspect or any one of the foregoing implementations of the first aspect, the electronic device further performs the following steps: detecting a seventh user input on the second card on the current screen; and in response to the seventh user input, displaying, in the second region, content that is displayed in the second region before the fifth user input is responded to. In this way, displaying the second card can be stopped on the current screen through the seventh user input, without a need to switch from the current screen to another screen, thereby greatly reducing costs such as card management steps, providing ease of operation, and allowing quick switching back to a state with displaying of the content that is displayed in the first region before the fifth user input is responded to.

According to the first aspect or any one of the foregoing implementations of the first aspect, the electronic device further performs the following steps: also displaying R icons in a region other than the second region on the current screen, where R is a positive integer greater than or equal to 1; detecting an eighth user input on one of the R icons; in response to the eighth user input, displaying an interface that is displayed after an application corresponding to the one of the R icons is launched: detecting a return operation; and in response to the return operation, displaying the current screen, where content displayed on the current screen is content that is displayed on the current screen before the eighth user input is responded to. In this way, after the second card is displayed on the current screen, the user is able to launch the corresponding application by performing an operation on the one of the R icons displayed in the region other than the second region on the current screen, which provides convenience of operation. In addition, a manner is provided for returning to the content that is displayed on the current screen before the eighth user input is responded to, from the interface that is displayed after the application corresponding to the one of the R icons is launched. This manner gives ease of operation for the user.

According to the first aspect or any one of the foregoing implementations of the first aspect, the second card further includes a second control, where the second control is used to launch the second application, and the second control is a control that is displayed after the second icon is reduced in size by a third scale factor; the K controls are controls that are displayed after the K icons are reduced in size by a fourth scale factor; an area of the second control is greater than an area of any one of the K controls; a shape of the first card is the same as a shape of the second card, and a size of the first card is the same as a size of the second card; the first scale factor is the same as the third scale factor, and the second scale factor is the same as the fourth scale factor; the second control, the K controls, and the second card content are displayed in an upper left corner, an upper right corner, and a middle lower part of the second card, respectively; the fifth user input is a fifth speech input or a fifth gesture input, where the fifth gesture input is a gesture input with a starting point located at the second icon and a swiping direction being upward, and the second card changes with the fifth gesture input; the sixth user input, the seventh user input, and the eighth user input are a sixth speech input, a seventh speech input, and an eighth speech input, or a sixth gesture input, a seventh gesture input, and an eighth gesture input, respectively; the sixth gesture input and the eighth gesture input are touch inputs; the seventh gesture input is implemented by one step of operation; and the seventh gesture input is a gesture input with a starting point located at the second card and a swiping direction opposite to the swiping direction of the fifth gesture input. In this way, the user can learn from the second card that applications corresponding to the K controls can also be launched from the second card. In addition, the second control is displayed prominently in a manner of occupying a larger region, so that the user more clearly learns that the second card content corresponds to the second control. Besides, a preferred manner is provided for distribution and display of the second control, the K controls, and the second card content on the second card. In addition, two specific manners are defined for user input, requiring only an operation on the current screen without a need to switch from the current screen to another screen of the home screen, thereby greatly reducing costs such as card management steps, providing ease of operation, and improving user experience. Furthermore, a preferred way that is easy to use and easy to memorize is provided for implementation of the seventh gesture input, which can be memorized by the user together with a way of the fifth gesture input.

According to a second aspect, a card display method is provided. The method is applied to an electronic device including a display, and includes: displaying a current screen of a home screen on the display, where the current screen displays several icons; detecting a first user input on a first icon of the several icons; and in response to the first user input, displaying a first card on the current screen, where the first card does not fill up the current screen. The first icon is a first folder icon, the first folder icon includes at least a first application icon, and the first application icon corresponds to a first application; or the first icon is a first application icon, and the first application icon corresponds to a first application. The first card includes at least: first card content, where the first card content includes part of content included in an $M^{th}$-layer interface that is displayed after the first application is launched, and M is a positive integer greater than or equal to 1; and N controls, where each of the N controls is used to launch a corresponding application, the application corresponds to a corresponding icon that is displayed on the home screen before the first card is displayed, and N is a positive integer greater than or equal to 1. The first card is different from all and any part of the $M^{th}$-layer interface that is displayed after the first application is launched. That the first card is different from all and any part of the $M^{th}$-layer interface that is displayed after the first application is launched means that the first card is different from the $M^{th}$-layer interface as a whole that is displayed after the first application is launched, and is also different from any part of the $M^{th}$-layer interface that is displayed after the first application is launched. In this way, with a user input on the first icon, the first card can be displayed on the current screen, without a need to switch from the current screen to another screen, thereby facilitating relatively low card management costs and relatively flexible positions for displaying cards. In addition, with a limited scope defined for the first card content, the first card may be displayed with content of only key information, allowing intuitive and quick obtainment of the key information. Besides, because the first card is displayed on the current screen of the home screen and does not fill up the current screen, the user can still intuitively obtain information that is displayed in a region other than the first card on the current screen, and can directly perform an operation on the current screen, for example, touch an icon that is displayed in the region other than the first card on the current screen to launch a corresponding application, or swipe left or right on a background that is displayed in the region other than the first card on the current screen of the home screen to switch to another screen. In addition, by using one of the N controls on the first card, the user can also directly launch a corresponding application. In other words, the user can not only intuitively obtain the first card content, but also directly launch an application corresponding to one of the N controls, and can also directly perform an operation on the current screen. This facilitates convenience of use for the user in these three aspects, striking a balance among convenience of use in the three aspects. Furthermore, as long as displaying of the first card is not stopped, the first card is always displayed on the current screen. In this way, when the user needs to always use the first card content in a near future, after the first card is displayed on the current screen, the user can directly use the first card content on the current screen without a need to perform the first user input again.

According to the second aspect, the method includes: The first user input is implemented by one step of operation; the first card content accounts for a largest proportion of an area of the first card; an area of the first card content is greater than or equal to an area of the first icon; a region occupied by the first card on the current screen is a first region; the current screen also displays a background; and before the first card is displayed, the N controls correspond to the N icons, the N icons are displayed in the first region, the first region includes only a first part of the background, the first icon, and the N icons, and a quantity of icons included in the first region is equal to N plus 1. In this way, it is defined that the card can be displayed by performing only one operation on the current screen, thereby greatly reducing costs such as card management steps, providing convenience of operation for the user, and improving user experience; the first card content is displayed more prominently, so that the user intuitively and quickly obtains the first card content; and it is further defined that a position at which the first card is displayed on the current screen is a position that is on the current screen and that includes the first icon, the N icons, and the second part of the background before the first card is displayed. In this way, it is more convenient for the user to obtain a positional relationship between the first card and the first icon and N icons.

According to the second aspect or any one of the foregoing implementations of the second aspect, the method includes: detecting a second user input on one of the N controls; in response to the second user input, displaying an $S^{th}$-layer interface that is displayed after an application corresponding to the one of the N controls is launched, where S is a positive integer greater than or equal to 1; detecting a return operation; and in response to the return operation, displaying the current screen, where content displayed on the current screen is content that is displayed on the current screen before the second user input is responded to. In this way, a manner is provided for accessing, from the first card, the $S^{th}$-layer interface that is displayed after the application corresponding to the one of the N controls is launched. This manner gives ease of operation for the user, allowing fast switching to the $S^{th}$-layer interface that is displayed after the application corresponding to the one of the N controls is launched. In addition, a manner is also provided for returning to the content that is displayed on the current screen before the second user input is responded to, from the $S^{th}$-layer interface that is displayed after the application corresponding to the one of the N controls is launched, that is, returning to a state with the first card displayed on the current screen. This manner gives ease of operation for the user, allowing fast switching back to the state with the first card displayed on the current screen.

According to the second aspect or any one of the foregoing implementations of the second aspect, the method includes: detecting a third user input on the first card on the current screen; and in response to the third user input, displaying, in the first region, content that is displayed in the first region before the first user input is responded to. In this way, displaying the first card can be stopped on the current screen through the third user input, without a need to switch from the current screen to another screen, thereby greatly reducing costs such as card management steps, providing ease of operation, and allowing quick switching back to a state with displaying of the content that is displayed in the first region before the first user input is responded to.

According to the second aspect or any one of the foregoing implementations of the second aspect, the method includes: also displaying L icons in a region other than the first region on the current screen, where L is a positive integer greater than or equal to 1; detecting a fourth user input on one of the L icons; in response to the fourth user input, displaying an interface that is displayed after an application corresponding to the one of the L icons is launched; detecting a return operation; and in response to the return operation, displaying the current screen, where content displayed on the current screen is content that is displayed on the current screen before the fourth user input is responded to. In this way, after the first card is displayed on the current screen, the user is able to launch the corresponding application by performing an operation on the one of the L icons displayed in the region other than the first region on the current screen, which provides convenience of operation. In addition, a manner is provided for returning to the content that is displayed on the current screen before the fourth user input is responded to, from the interface that is displayed after the application corresponding to the one of the L icons is launched, that is, returning to the state with the first card displayed on the current screen. This manner gives ease of operation for the user, allowing fast switching back to the state with the first card displayed on the current screen.

According to the second aspect or any one of the foregoing implementations of the second aspect, the method includes: The first card further includes a first control, where the first control is used to launch the first application, and the first control is a control that is displayed after the first icon is reduced in size by a first scale factor; the N controls are controls that are displayed after the N icons are reduced in size by a second scale factor; an area of the first control is greater than an area of any one of the N controls; the first control, the N controls, and the first card content are displayed in an upper left corner, an upper right corner, and a middle lower part of the first card, respectively; the first user input is a first speech input or a first gesture input, where the first gesture input is a gesture input with a starting point located at the first icon and a swiping direction being upward, and the first card changes with the first gesture input; the second user input and the fourth user input are a second speech input and a fourth speech input, or a second gesture input and a fourth gesture input, respectively; the second gesture input and the fourth gesture input are touch inputs; the third gesture input is implemented by one step of operation; and the third gesture input is a gesture input with a starting point located at the first card and a swiping direction opposite to the swiping direction of the first gesture input. In this way, the user can learn from the first card that applications corresponding to the N controls can also be launched from the first card. In addition, the first control is displayed prominently in a manner of occupying a larger region, so that the user more clearly learns that the first card content corresponds to the first control. Besides, a preferred manner is provided for distribution and display of the first control, the N controls, and the first card content on the first card. In addition, two specific manners are defined for user input, requiring only an operation on the current screen without a need to switch from the current screen to another screen of the home screen, thereby greatly reducing costs such as card management steps, providing ease of operation, and improving user experience. Furthermore, a preferred way that is easy to use and easy to memorize is provided for implementation of the third gesture input, which can be memorized by the user together with a way of the first gesture input.

According to the second aspect or any one of the foregoing implementations of the second aspect, the method includes: detecting a fifth user input on a second icon of the several icons; and in response to the fifth user input, displaying a second card on the current screen, where the second card does not fill up the current screen. The second icon is a second folder icon, the second folder icon includes at least a second application icon, and the second application icon corresponds to a second application; or the second icon is a second application icon, and the second application icon corresponds to a second application. The second card includes at least: second card content, where the second card content corresponds to the second application, the second card content includes part of content included in a $P^{th}$-layer interface that is displayed after the second application is launched, and P is a positive integer greater than or equal to 1; and K controls, where each of the K controls is used to launch a corresponding application, the application corresponds to a corresponding icon that is displayed on the home screen before the second card is displayed, and K is a positive integer greater than or equal to 1. The second card is different from all and any part of the $P^{th}$-layer interface that is displayed after the second application is launched. An area of the second card content is greater than an area of the second icon. A region occupied by the second card on the current screen is a second region. The second region and the first region do not overlap and the current screen continues displaying the first card; or the second region and the first region overlap and the current screen stops displaying the first card. In this way, the second card can be displayed on the current screen, and a technical effect of displaying the second card on the current screen is the same as a technical effect of displaying the first card on the current screen. In addition, a limited scope is further defined for the second card content, with part of redundant information excluded, allowing concise second card content to be obtained or used by the user. In other words, when the second card is displayed on the current screen and does not fill up the current screen, the user can not only intuitively obtain the second card content, but also directly launch a fourth application, and can also directly perform an operation on the current screen. This facilitates convenience of use in these three aspects, striking a balance among convenience of use in the three aspects. Furthermore, both the first card and the second card can be displayed on the current screen, with a same operating procedure used for displaying the second card and the first card but different content displayed on the second card and the first card, where the icon based on which the second card is displayed is different from the icon based on which the first card is displayed. Displaying of the first card and displaying of the second card may be independent of each other with no mutual impact. Besides, as long as displaying of the second card is not stopped, the second card is always displayed on the current screen. In this way, when the user needs to always use the second card content in a near future, after the second card is displayed on the current screen, the user can directly use or obtain the second card content that is on the current screen and that corresponds to the second icon, without a need to perform the fifth user input again. Moreover, a condition under which both the first card and the second card are displayed and how the first card and the second card are displayed when co-display is not supported are defined.

According to the second aspect or any one of the foregoing implementations of the second aspect, the method includes: The fifth user input is implemented by one step of operation; the second card content accounts for a largest proportion of an area of the second card; an area of the second card content is greater than or equal to an area of the second icon, and before the second card is displayed, the K controls correspond to K icons, the K icons are displayed in the second region, the second region includes only a second part of the background, the second icon, and the K icons, and a quantity of icons included in the second region is equal to K plus 1. In this way, before the second card is displayed, the K icons corresponding to the K controls on the second card may be located in the second region or a region other than the second region on the current screen, or on a screen of the home screen other than the current screen. Therefore, an application corresponding to any icon displayed on the home screen can be launched from the second card, which is more convenient for the user.

According to the second aspect or any one of the foregoing implementations of the second aspect, the method includes: detecting a sixth user input on one of the K controls; in response to the sixth user input, displaying a $Q^{th}$-layer interface that is displayed after an application corresponding to the one of the K controls is launched, where Q is a positive integer greater than or equal to 1; detecting a return operation; and in response to the return operation, displaying the current screen, where content displayed on the current screen is content that is displayed on the current screen before the sixth user input is responded to. In this way, a manner is provided for accessing, from the second card, the $Q^{th}$-layer interface that is displayed after the application corresponding to the one of the K controls is launched. This manner gives ease of operation for the user, allowing fast switching to the $Q^{th}$-layer interface that is displayed after the application corresponding to the one of the K controls is launched. In addition, a manner is also provided for returning to the content that is displayed on the current screen before the sixth user input is responded to, from the $Q^{th}$-layer interface that is displayed after the application corresponding to the one of the K controls is launched. This manner gives ease of operation for the user.

According to the second aspect or any one of the foregoing implementations of the second aspect, the method includes: detecting a seventh user input on the second card on the current screen; and in response to the seventh user input, displaying, in the second region, content that is displayed in the second region before the fifth user input is responded to. In this way, displaying the second card can be stopped on the current screen through the seventh user input, without a need to switch from the current screen to another screen, thereby greatly reducing costs such as card management steps, providing ease of operation, and allowing quick switching back to a state with displaying of the content that is displayed in the first region before the fifth user input is responded to.

According to the second aspect or any one of the foregoing implementations of the second aspect, the method includes: also displaying R icons in a region other than the second region on the current screen, where R is a positive integer greater than or equal to 1; detecting an eighth user input on one of the R icons; in response to the eighth user input, displaying an interface that is displayed after an application corresponding to the one of the R icons is launched; detecting a return operation; and in response to the return operation, displaying the current screen, where content displayed on the current screen is content that is displayed on the current screen before the eighth user input is responded to. In this way, after the second card is displayed on the current screen, the user is able to launch the corresponding application by performing an operation on the one of the R icons displayed in the region other than the second region on the current screen, which provides convenience of operation. In addition, a manner is provided for returning to the content that is displayed on the current screen before the eighth user input is responded to, from the interface that is displayed after the application corresponding to the one of the R icons is launched. This manner gives ease of operation for the user.

According to the second aspect or any one of the foregoing implementations of the second aspect, the method includes: The second card further includes a second control, where the second control is used to launch the second application, and the second control is a control that is displayed after the second icon is reduced in size by a third scale factor; the K controls are controls that are displayed after the K icons are reduced in size by a fourth scale factor; an area of the second control is greater than an area of any one of the K controls; a shape of the first card is the same as a shape of the second card, and a size of the first card is the same as a size of the second card; the first scale factor is the same as the third scale factor, and the second scale factor is the same as the fourth scale factor; the second control, the K controls, and the second card content are displayed in an upper left corner, an upper right corner, and a middle lower part of the second card, respectively; the fifth user input is a fifth speech input or a fifth gesture input, where the fifth gesture input is a gesture input with a starting point located at the second icon and a swiping direction being upward, and the second card changes with the fifth gesture input; the sixth user input, the seventh user input, and the eighth user input are a sixth speech input, a seventh speech input, and an eighth speech input, or a sixth gesture input, a seventh gesture input, and an eighth gesture input, respectively; the sixth gesture input and the eighth gesture input are touch inputs; the seventh gesture input is implemented by one step of operation; and the seventh gesture input is a gesture input with a starting point located at the second card and a swiping direction opposite to the swiping direction of the fifth gesture input. In this way, the user can learn from the second card that applications corresponding to the K controls can also be launched from the second card. In addition, the second control is displayed prominently in a manner of occupying a larger region, so that the user more clearly learns that the second card content corresponds to the second control. Besides, a preferred manner is provided for distribution and display of the second control, the K controls, and the second card content on the second card. In addition, two specific manners are defined for user input, requiring only an operation on the current screen without a need to switch from the current screen to another screen of the home screen, thereby greatly reducing costs such as card management steps, providing ease of operation, and improving user experience. Furthermore, a preferred way that is easy to use and easy to memorize is provided for implementation of the seventh gesture input, which can be memorized by the user together with a way of the fifth gesture input.

According to the second aspect or any one of the foregoing implementations of the second aspect, when the first folder icon includes E first application icons, and E is a positive integer greater than or equal to 2, the method includes: detecting a first switching user input; and in response to the first switching user input, switching from the first card content of the first card to another piece of first card content, where the first card content and the another piece of first card content correspond to two of the E first application icons, respectively. In this way, when the first folder icon includes a plurality of first application icons, the first card content of the first card can be changed based on the first switching user input performed by the user.

According to the second aspect or any one of the foregoing implementations of the second aspect, when the second folder icon includes F second application icons, and F is a positive integer greater than or equal to 2, the method includes: detecting a second switching user input; and in response to the second switching user input, switching from the second card content of the second card to another piece of second card content, where the second card content and the another piece of second card content correspond to two of the F second application icons, respectively. In this way, when the second folder icon includes a plurality of second application icons, the second card content of the second card can be changed based on the switching user input performed by the user. In this way, when the second folder icon includes a plurality of second application icons, the second card content of the second card can be changed based on the second switching user input performed by the user.

According to the second aspect or any one of the foregoing implementations of the second aspect, when at least one of the E first application icons corresponds to a plurality of first cards, the method includes: detecting a third switching user input; and in response to the third switching user input, switching between the plurality of first cards. In this way, when at least one first application icon included in the first folder icon corresponds to a plurality of first cards, the plurality of first cards can be switched based on the third switching user input performed by the user.

According to the second aspect or any one of the foregoing implementations of the second aspect, when at least one of the F second application icons corresponds to a plurality of second cards, the method includes: detecting a fourth switching user input; and in response to the fourth switching user input, switching between the plurality of second cards. In this way, when at least one second application icon included in the second folder icon corresponds to a plurality of second cards, the plurality of second cards can be switched based on the fourth switching user input performed by the user.

According to the second aspect or any one of the foregoing implementations of the second aspect, the first card floats on the current screen, the first card further includes a pin button, and after the pin button is touched, the first card is pinned to the current screen. In this way, another manner for displaying the first card on the current screen is provided so that at least two options are provided for the user. The user may choose to make the first card float on the current screen or pin the first card to the current screen based on a preference of the user.

According to the second aspect or any one of the foregoing implementations of the second aspect, the second card floats on the current screen, the second card further includes a pin button, and after the pin button is touched, the second card is pinned to the current screen. In this way, another manner for displaying the second card on the current screen is provided so that at least two options are provided for the user. The user may choose to make the second card float on the current screen or pin the second card to the current screen based on a preference of the user.

According to the second aspect or any one of the foregoing implementations of the second aspect, after the first card is pinned to the current screen, the pin button of the first card changes to a close button, and after the close button is touched, displaying the first card is stopped; or the first card further includes a close button, and after the close button is touched, displaying the first card is stopped. In this way, two implementations are provided for stopping displaying the first card. The user stops displaying the first card by using the close button.

According to the second aspect or any one of the foregoing implementations of the second aspect, after the second card is pinned to the current screen, the pin button of the second card changes to a close button, and after the close button is touched, displaying the second card is stopped; or the second card further includes a close button, and after the close button is touched, displaying the second card is stopped. In this way, two implementations are provided for stopping displaying the second card. The user stops displaying the second card by using the close button.

According to the second aspect or any one of the foregoing implementations of the second aspect, when the first icon is a first application icon, and the first application icon corresponds to a plurality of first cards, the method includes: detecting a fifth switching user input; and in response to the fifth switching user input, switching between the plurality of first cards. In this way, when the first icon is a first application icon and corresponds to a plurality of first cards, the plurality of first cards can be switched based on the fifth switching user input performed by the user.

According to the second aspect or any one of the foregoing implementations of the second aspect, the method includes: detecting a sixth switching user input on the first control and one of the N controls; and in response to the sixth switching user input, exchanging positions of the one of the N controls and the first control, and adjusting scale factors to fit the post-adjustment positions, where the first card content is updated, and the updated first card content corresponds to the post-adjustment first control. In this way, by exchanging the positions of the first control and the one of the N controls, the user can conveniently and flexibly update the first card content and display the updated first card content, and therefore, feels more convenient and flexible.

According to the second aspect or any one of the foregoing implementations of the second aspect, the N controls are initially displayed on the first card in a form of a ball, and after the ball is touched, the first card displays the N controls. In this way, another operation manner is provided such that the N controls unfold for display only when the N controls need to unfold for display, and contract into a ball when the N controls do not need to unfold for display, thereby saving more display space for display of other content included in the first card.

According to the second aspect or any one of the foregoing implementations of the second aspect, the method includes: detecting a ninth user input on the first control or any one of the N controls, and in response to the ninth user input, displaying, on the display, content that is to be displayed after the first application or an application corresponding to the any one of the N controls is launched. In this way, it is convenient for the user to launch the first application corresponding to the first control on the first card or an application corresponding to any one of the N controls on the first card.

According to the second aspect or any one of the foregoing implementations of the second aspect, the method includes: detecting that a touch device is placed above the first control or any one of the N controls in a direction perpendicular to the current screen, and detecting a leaving input on the first control or the any one of the N controls in the direction, or detecting that a touch device is placed above the first control or any one of the N controls in a direction perpendicular to the current screen and that the first control or the any one of the N controls is enlarged, and detecting a leaving input on the first control or the any one of the N controls in the direction; or detecting that a touch device is placed above any one of the N controls in a direction perpendicular to the current screen and that the any one of the N controls is enlarged, and detecting a touch input on the enlarged any one control; and in response to the input, displaying, on the display, content that is to be displayed after the first application or an application corresponding to the any one of the N controls is launched. In this way, a manner is provided for launching the application that corresponds to the first control or the any one of the N controls, such that the user can launch, more conveniently, quickly, and flexibly, the first application corresponding to the first control on the first card or the application corresponding to the any one of the N controls on the first card.

According to the second aspect or any one of the foregoing implementations of the second aspect, after the first card is selected and dragged to another region other than the first region on the current screen, when there is another first icon in the another region according to a relative position of the first icon in the first region, the first card changes to another first card, where the another first card includes another piece of first card content, and the another piece of first card content corresponds to the another first icon. In this way, after the first card is dragged to another region that satisfies a specific condition on the current screen, the first card is automatically changed and updated, thereby providing more convenience of use for the user.

According to the second aspect or any one of the foregoing implementations of the second aspect, the method includes: detecting a tenth user input on the current screen; in response to the tenth user input, bringing the current screen to an editing state, where the first card is transparent or semi-transparent, and the first control and/or one of the N controls are/is restored to a size and a position of the first icon and/or a size and a position of a corresponding icon in the N icons on the current screen existing before the first user input is responded to; detecting that any one or more icons in the first region on the current screen are dragged out of the first region and released, or detecting that any one or more icons outside the first region on the current screen are dragged into the first region and released; in response to the detection result, stopping displaying the first card; and arranging and displaying icons in the first region according to an arrangement manner of icons on the home screen. In this way, a manner is provided where displaying the first card is stopped after the current screen enters the editing state, when an icon in the first region is dragged out of the first region and released or an icon outside the first region is dragged into the first region and released. Therefore, with such manner, it is convenient for the user to stop displaying the first card. Further, a corresponding operation may also be performed on the second card, to obtain a corresponding result. The operation performed on the second card and the obtained result correspond to the operation performed on the first card and the obtained result, respectively, and therefore, details are not described herein again.

According to the second aspect or any one of the foregoing implementations of the second aspect, the method includes: detecting an eleventh user input on the current screen; in response to the eleventh user input, bringing the current screen to an editing state, where the card is transparent or semi-transparent, and the first control and/or one of the N controls are/is restored to a size and a position of the first icon and/or a size and a position of a corresponding icon in the N icons on the current screen existing before the first user input is responded to; detecting that any one or more icons in the first region on the current screen are dragged out of the first region and released, or detecting that any one or more icons outside the first region on the current screen are dragged into the first region and released; and in response to the detection result, updating the first card accordingly, where first card content of the updated first card corresponds to a post-updating first icon. In this way, a manner is provided where the first card is updated after the current screen enters the editing state, when an icon in the first region is dragged out of the first region and released or an icon outside the first region is dragged into the first region and released. Therefore, it is convenient for the user to update the first card in the manner. Further, a corresponding operation may also be performed on the second card, to obtain a corresponding result. The operation performed on the second card and the obtained result correspond to the operation performed on the first card and the obtained result, respectively, and therefore, details are not described herein again.

According to the second aspect or any one of the foregoing implementations of the second aspect, the first card moves with a drag gesture on the current screen. In this way, an operation manner is provided, and the first card is directly dragged with the drag gesture on the current screen, instead of being dragged after being unpinned by using a gesture such as touch and hold. Therefore, it is more convenient for the user to operate, and user experience is improved. Further, a corresponding operation may also be performed on the second card, to obtain a corresponding result. The operation performed on the second card and the obtained result correspond to the operation performed on the first card and the obtained result, respectively, and therefore, details are not described herein again.

According to the second aspect or any one of the foregoing implementations of the second aspect, after the first card is selected, dragged to a region other than the first card and/or the second card on the current screen, and released, content included in the first card remains unchanged. In this way, when the first card is dragged to a region other than the first card and/or the second card on the current screen, automatic switching to display of a new first card does not take place.

According to the second aspect or any one of the foregoing implementations of the second aspect, the shapes of the first card and the second card are preset. Preferably, the shapes of the first card and the second card are preset to be the same. In this way, cards that the user sees are in a same shape, providing good user experience.

According to the second aspect or any one of the foregoing implementations of the second aspect, the first card is in a shape of a rounded rectangle, and the rounded rectangle covers several rows and several columns of icons arranged on the home screen. In this way, the shape of the first card is kept consistent with arrangement of icons in a region other than the first card on the current screen.

According to the second aspect or any one of the foregoing implementations of the second aspect, the first card further includes a first sub-control, where a region occupied by the first sub-control on the first card is a first sub-region; a region occupied by the first card content on the first card is a third region; the first sub-region is outside the third region; after a twelfth user input on the first sub-control is detected, displaying the first card content is stopped, where a second sub-control corresponding to the first card content is displayed in a second sub-region, and third card content corresponding to the first sub-control is displayed in the third region; the second sub-region is outside the third region; and the first card content and the third card content correspond to different functions and/or different information of the first application, respectively. In this way, this allows the user to switch between, by using a user input on the first sub-control, card content corresponding to different functions and/or different information of the first application.

According to the second aspect or any one of the foregoing implementations of the second aspect, the first sub-region and the second sub-region are the same, or the first sub-region and the second sub-region are different.

According to the second aspect or any one of the foregoing implementations of the second aspect, the first card content further includes a second sub-control; a region occupied by the first card content on the first card is a third region; and after a thirteenth user input on the second sub-control is detected, displaying the first card content is stopped, where fourth card content corresponding to the second sub-control is displayed in the third region. In this way, different card content can be switched by using a control included in the card content, providing more convenience for the user.

According to the second aspect or any one of the foregoing implementations of the second aspect, the electronic device includes but is not limited to a smart device such as a mobile phone, a tablet computer, a watch, a band, a computer, glasses, a helmet, a television, or a vehicle-mounted device.

It should be noted that any one of the implementations of the second aspect is also applicable to the first aspect, unless otherwise specified; and any one of the implementations of the first aspect is also applicable to the second aspect, unless otherwise specified.

According to a third aspect, an electronic apparatus is provided. The electronic apparatus includes: a display module, where the display module displays a current screen of a home screen of the electronic device, and the current screen displays several icons; and a detection module, configured to detect a first user input on a first icon of the several icons. The display module is further configured to: in response to the first user input, display a first card on the current screen, where the first card does not fill up the current screen. The first icon is a first folder icon, the first folder icon includes at least a first application icon, and the first application icon corresponds to a first application; or the first icon is a first application icon, and the first application icon corresponds to a first application. The first card includes at least: first card content, where the first card content includes part of content included in an $M^{th}$-layer interface that is displayed after the first application is launched, and M is a positive integer greater than or equal to 1; and N controls, where each of the N controls is used to launch a corresponding application, the application corresponds to a corresponding icon that is displayed on the home screen before the first card is displayed, and N is a positive integer greater than or equal to 1. The first card is different from all and any part of the $M^{th}$-layer interface that is displayed after the first application is launched.

Implementations of the third aspect correspond to the implementations of the second aspect, respectively. For technical effects corresponding to any one of the third aspect and the implementations of the third aspect, refer to the technical effects corresponding to any one of the second aspect and the implementations of the second aspect, and details are not described herein again.

According to a fourth aspect, a computer readable storage medium including instructions is provided. When the instructions are run on an electronic device, the electronic device is caused to perform the card display method according to any one of the second aspect and the implementations of the second aspect.

In addition, for implementations of the fourth aspect and corresponding technical effects, refer to the implementations of the second aspect and the corresponding technical effects, and details are not described herein again.

According to a fifth aspect, a graphical user interface system on an electronic device is provided. The electronic device has a display, a memory, and one or more processors, the one or more processors are configured to execute one or more computer programs stored in the memory, and the graphical user interface includes a graphical user interface that is displayed when the electronic device performs the method according to any one of the second aspect and the implementations of the second aspect.

According to a sixth aspect, a computer program product is provided. When the computer program product is run on a computer, the computer is caused to perform the card display method according to any one of the second aspect and the implementations of the second aspect.

In addition, for implementations of the sixth aspect and corresponding technical effects, refer to the implementations of the second aspect and the corresponding technical effects, and details are not described herein again.

According to a seventh aspect, an electronic system is provided, including an electronic device and a server. The electronic device includes a display and a communication interface. The server includes one or more processors, one or more memories, and one or more computer programs. The one or more computer programs are stored in the one or more memories. When the one or more processors execute the one or more computer programs, the electronic system is caused to implement the card display method according to any one of the second aspect and the implementations of the second aspect.

In addition, for implementations of the seventh aspect and corresponding technical effects, refer to the implementations of the second aspect and the corresponding technical effects, and details are not described herein again.

BRIEF DESCRIPTION OF DRAWINGS

To describe the technical solutions in the conventional technology and embodiments of this application more clearly, the following briefly describes the accompanying drawings required for describing the conventional technology and the embodiments of this application. Apparently, the accompanying drawings in the following descriptions relate to some embodiments of this application, and a person of ordinary skill in the art may derive other drawings from these accompanying drawings without creative efforts.

DESCRIPTION OF EMBODIMENTS

The following clearly and completely describes the technical solutions in the embodiments of this application with reference to the accompanying drawings. Obviously, the described embodiments are merely some but not all of the embodiments of this application. All other embodiments obtained by a person of ordinary skill in the art based on the embodiments of this application and without creative efforts shall fall within the protection scope of this application.

It should be noted that descriptions such as "first" and "second" in the embodiments of this application are used for distinguishing between different icons, content, modules, applications, and the like, and do not indicate a sequential order. Unless otherwise specified, "first" and "second" indicate different objects. For example, a first application is different from a second application.

Figure 1:
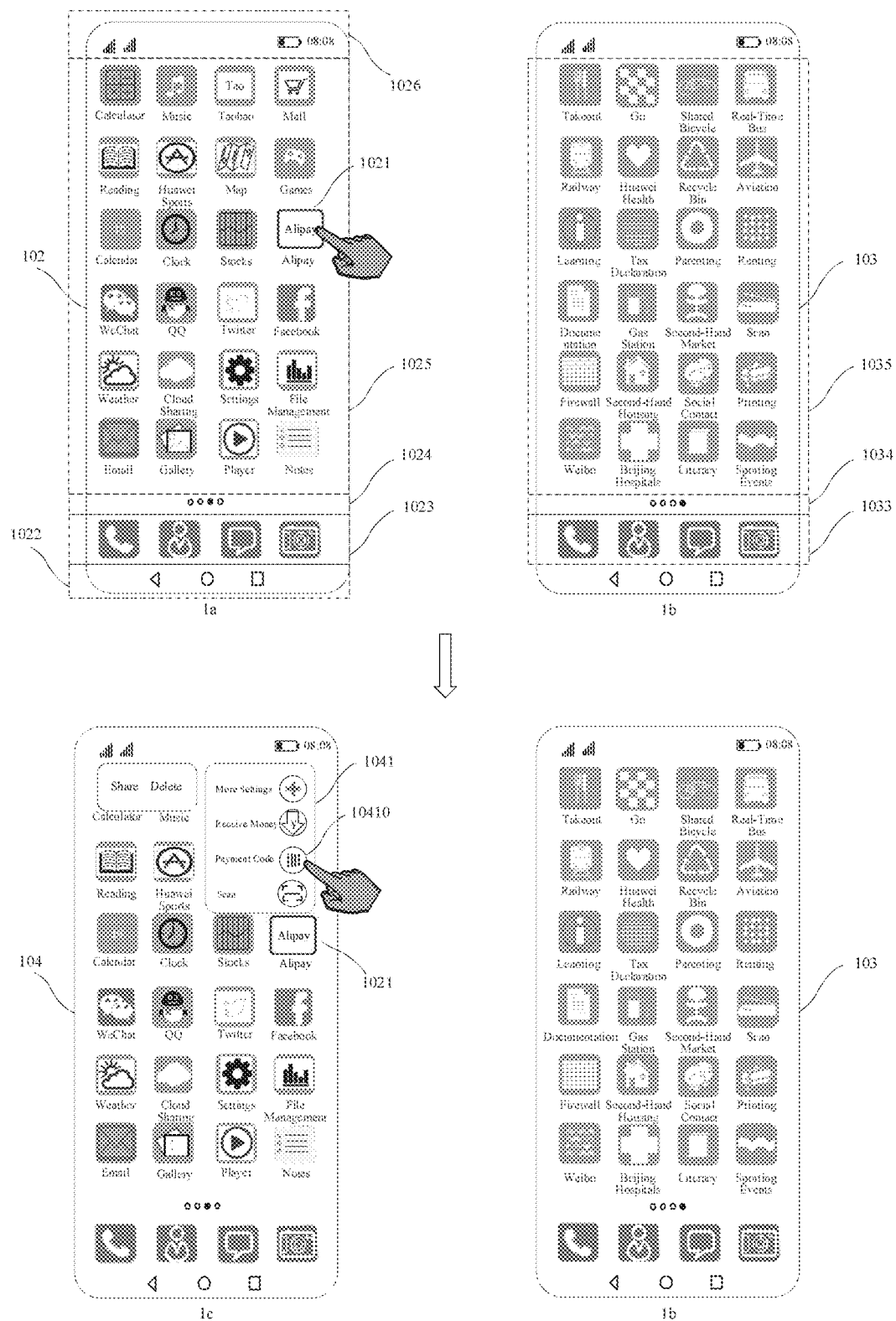
FIG. 1 is a schematic diagram of user interfaces for pop-up window display provided.

Generally speaking, a card is an information carrier with a closed outline, provides important or closely relevant information intuitively and quickly in a condensed form, and is used for display and exchange of such information. In practice, a card is mainly displayed on a minus one screen of a home screen of an electronic device. FIG. 1 is used as an example for describing the concept of home screen. In FIG. 1, a user interface 102 includes a navigation bar region 1022, a status bar region 1026, and a second screen of a home screen located between the navigation bar region 1022 and the status bar region 1026. The second screen of the home screen includes a fixed icon region 1023, a page indicator region 1024, and a swipeable page region 1025. Likewise, a minus one screen of the home screen, a first screen of the home screen, and a third screen of the home screen all include a fixed icon region, a page indicator region, and a swipeable page region. It can be learned from the page indicator region 1024 that the home screen totally includes the minus one screen, the first screen, the second screen, and the third screen. Therefore, in FIG. 1, the minus one screen of the home screen, the first screen of the home screen, the second screen of the home screen, and the third screen of the home screen together form the home screen. On the home screen, the swipeable page region included in a screen other than the second screen of the home screen may display one or more icons. In some optional embodiments, a navigation bar may be hidden; in some optional embodiments, a status bar may be hidden; and in some optional embodiments, the navigation bar and the status bar are integrated into one. The minus one screen of the home screen is located on a user interface that is displayed when an electronic device displays the home screen and the home screen is swiped to a leftmost side. The first screen of the home screen, the second screen of the home screen, the third screen of the home screen, and the like are located on user interfaces that start from the minus one screen of the home screen and that are sequentially displayed after the home screen is swiped right. It should be noted that FIG. 1 is merely an example, and is not used to limit a scope of the home screen in this application.

A card is usually in a shape of a rounded rectangle, similar to a credit card. Certainly, the card may alternatively be in another shape. Cards allow users of electronic devices to obtain information and perform operations more conveniently and intuitively, and therefore are widely used. However, currently, cards are displayed at fixed positions, without sufficient flexibility; it is complex to display and switch between cards, causing high management costs; and a card displays only information of a single application, not convenient enough to manipulate another application. Therefore, a card display method featuring ease of operation, flexible display positions, and convenience of manipulating other applications needs to be provided.

FIG. 1 is described by using quick access to the payment code function of Alipay as an example. In FIG. 1a, a user touches and holds an Alipay icon 1021 displayed on the user interface 102. Then, the user interface 102 changes to a user interface 104. The user interface 104 displays a pop-up window 1041 located above the Alipay icon 1021. The user then touches a Payment code 10410 of Alipay in the pop-up window 1041, thereby implementing quick access to the payment code function of the Alipay application. In this way, although there is no need to switch to another screen of the home screen, and the user only needs to perform an operation on the second screen of the home screen, where the second screen of the home screen is a current screen. However, this operation requires two steps, still not convenient enough. In addition, after the payment code of the Alipay application is launched, the payment code occupies the entire second screen of the home screen, forming a payment code interface. If the user wants to switch to another application displayed on the user interface, the user needs to first exit the payment code interface, and then touch another icon on the user interface. This is not convenient enough. Moreover, if the user wants to view or touch content or an icon that is blocked by the pop-up window 1041 on the user interface 104 shown in FIG. 1c, the user needs to touch another position on the user interface 104, for example, a blank position on the user interface 104, to make the pop-up window 10410 disappear, before viewing or touching the blocked content or icon. This operation is relatively complex, and the pop-up window 10410 cannot be always displayed on the user interface 104. For example, once the user launches an application, when the user returns, the user interface 102 does not display the pop-up window 1041. To quickly access the payment code of Alipay, the user needs to touch and hold the Alipay icon 1021 displayed on the user interface 102 again. This operation is relatively complex.

Figure 2:
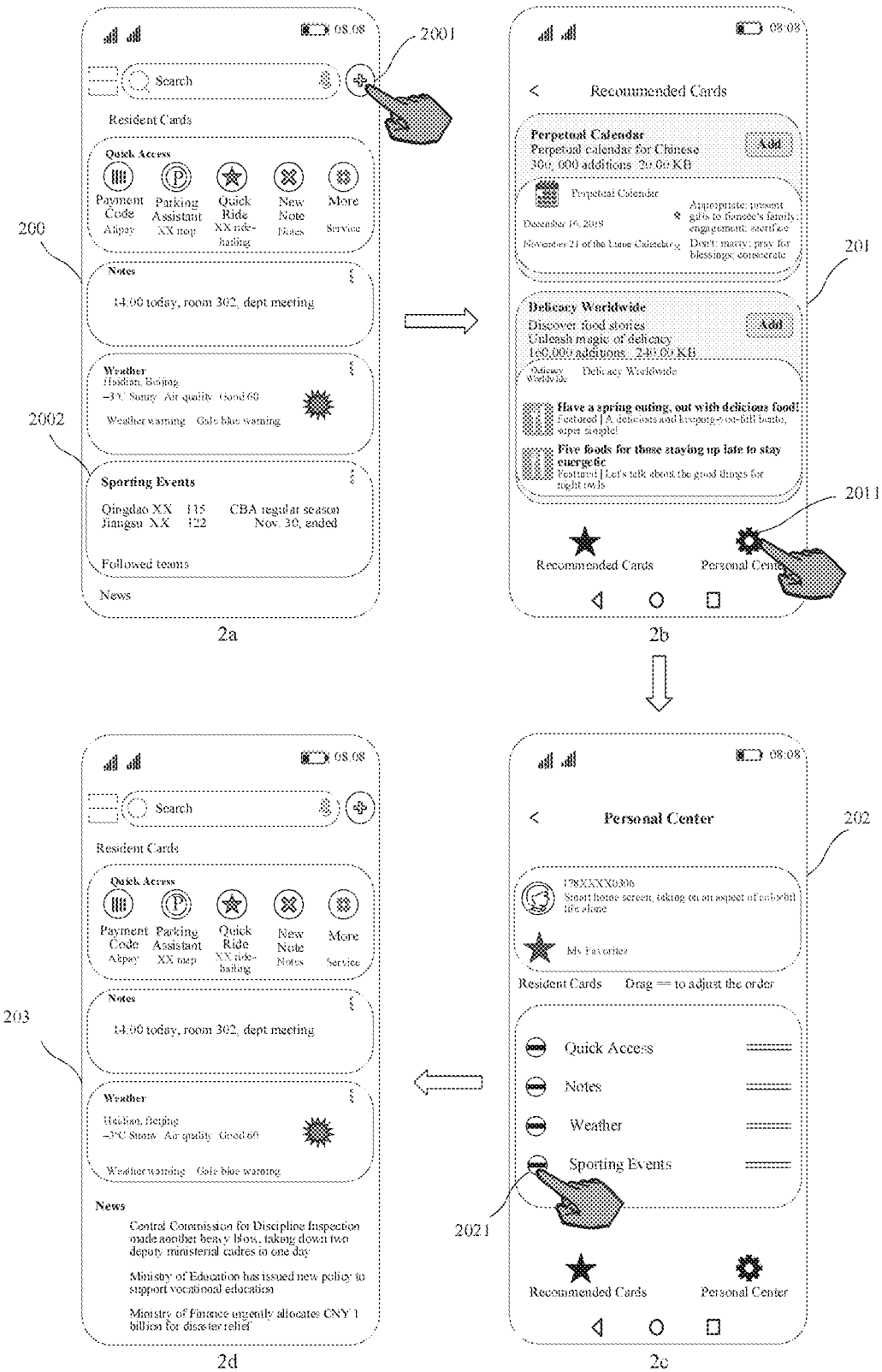
FIG. 2 is a schematic diagram of user interfaces for card management operations provided.

FIG. 2 is a schematic diagram of user interfaces of switching between display of different cards in a card display method provided. An user interface 200 displays a minus one screen of a home screen. An example is used in which display of a card 2002 is cancelled on the interface 200. A user touches a button 2001 on the interface 200 shown in FIG. 2a, and then, the interface 200 shown in FIG. 2a changes to an interface 201 shown in FIG. 2b. Then, the user touches a button 2011 on the interface 201 shown in FIG. 2b, and then, the interface 201 shown in FIG. 2b changes to an interface 202 shown in FIG. 2c. Then, the user touches a button 2021 on the interface 202 shown in FIG. 2c. After the user returns to the minus one screen of the home screen, the minus one screen of the home screen no longer displays the card 2002, as shown in FIG. 2d. As such, to manage display and switching of different cards, the user needs to first access a settings interface, and then browse and perform setting on the settings interface. This operation is relatively complex.

Figure 3:
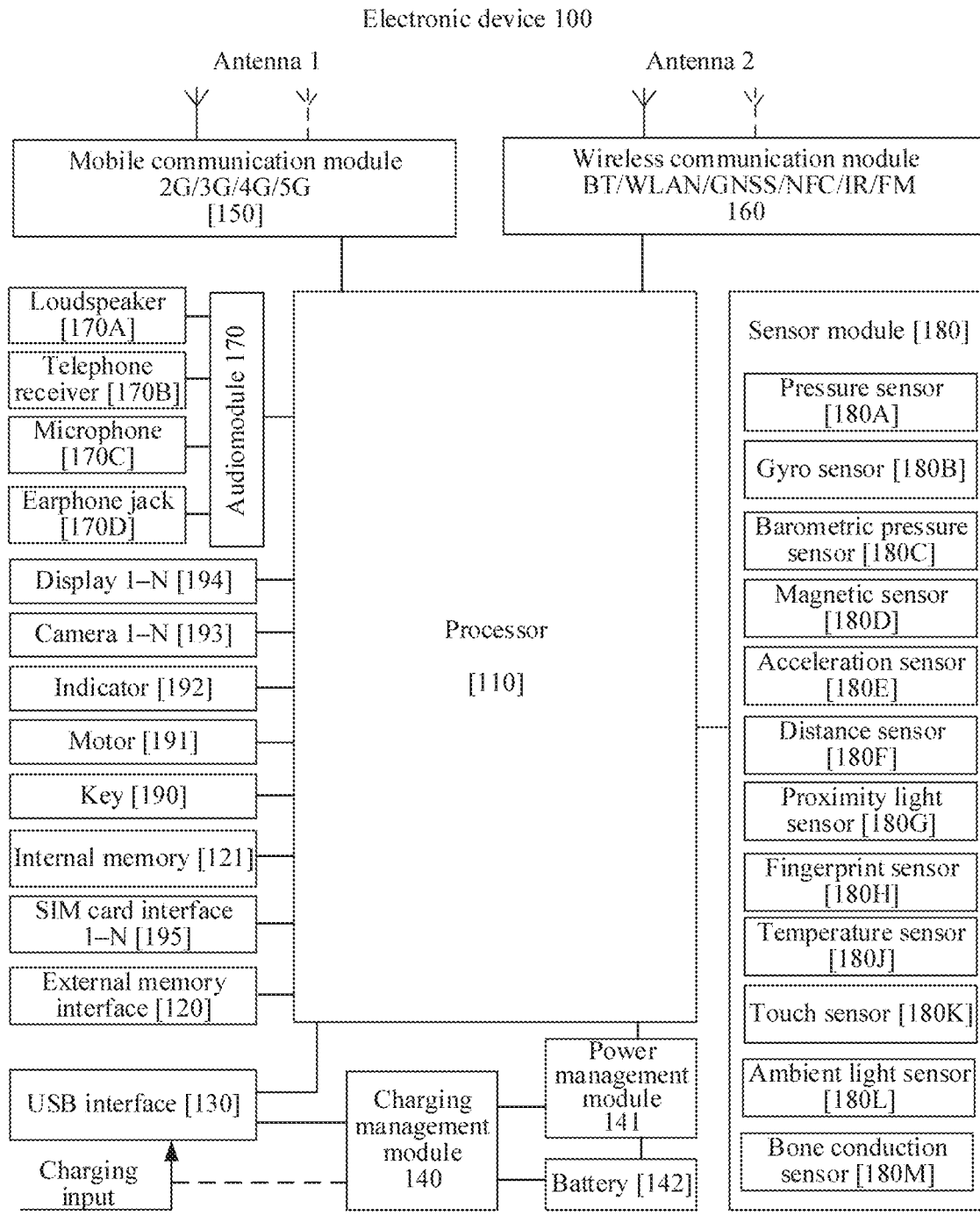
FIG. 3 is a schematic structural diagram of an electronic device according to an embodiment of this application.

A card display method provided in the embodiments of this application may be applied to an electronic device 100 shown in FIG. 3. FIG. 3 is a schematic structural diagram of the electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a loudspeaker 170A, a telephone receiver 170B, a microphone 170C, an earphone jack 170D, a sensor module 180, a key 190, a motor 191, an indicator 192, a camera 193, a display 194, a subscriber identity module (subscriber identification module. SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, a proximity light sensor 180G, a fingerprint sensor 180H a temperature sensor 180J, a touch sensor 180K, an ambient light sensor 180L, a bone conduction sensor 180M, and the like.

It may be understood that the structure illustrated in this embodiment of this application does not constitute a specific limitation on the electronic device 100. In some other embodiments of this application, the electronic device 100 may include more or fewer components than shown in the figure, or combine some components, or split some components, or have different component arrangements. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural-network processing unit, NPU). Different processing units may be separate components or integrated in one or more processors.

The controller may generate an operation control signal according to an instruction operation code and a timing signal, to complete control of instruction fetching and execution.

A memory may be further provided in the processor 110 for storing instructions and data. In some embodiments, the memory in the processor 110 is a cache. The cache may store instructions or data recently used or repeatedly used by the processor 110. If the processor 110 needs to use the instruction or data again, the processor 110 can directly invoke the instruction or data from the cache. This avoids repeated access and reduces a waiting time of the processor 110, thereby improving efficiency of a system.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The USB interface 130 is an interface that conforms to USB specifications, and may be specifically a mini USB interface, a micro USB interface, a USB type-C interface, or the like. It may be understood that an interface connection relationship between the modules shown in this embodiment of this application is merely an example for description, and does not constitute a limitation on the structure of the electronic device 100. In some other embodiments of this application, the electronic device 100 may alternatively use an interface connection manner different from those in the foregoing embodiment or a combination of a plurality of interface connection manners.

The charging management module 140 is configured to receive a charging input from a charger. The power management module 141 is configured to connect to the battery 142, the charging management module 140, and the processor 110. A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. In addition, different antennas may be multiplexed to improve utilization of the antennas. For example, the antenna 1 may multiplex a diversity antenna used in a wireless local area network. In some other embodiments, the antenna may be used in combination with a tuning switch.

The mobile communication module 150 may provide wireless communication solutions for use on the electronic device 100, including 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transmit the processed electromagnetic wave to a modem processor for demodulation. The mobile communication module 150 may further amplify a signal modulated by the modem processor, and convert the signal into an electromagnetic wave and radiate the electromagnetic wave by using the antenna 1. In some embodiments, at least some functional modules of the mobile communication module 150 may be provided in the processor 110. In some embodiments, at least some functional modules of the mobile communication module 150 may be provided in a same device with at least some modules of the processor 110.

The modem processor may include a modulator and a demodulator. The modulator is configured to modulate a low frequency baseband signal that is to be sent into a medium or high frequency signal. The demodulator is configured to demodulate a received electromagnetic wave signal into a low frequency baseband signal. Then, the demodulator sends the low frequency baseband signal obtained through demodulation to the baseband processor for processing. After being processed by the baseband processor, the low frequency baseband signal is sent to the application processor. The application processor outputs a sound signal by using an audio device (not limited to the loudspeaker 170A, the telephone receiver 170B, and the like), or displays an image or a video by using the display 194. In some embodiments, the modem processor may be a separate device. In some other embodiments, the modem processor may be separate from the processor 110 and arranged in a same device with the mobile communication module 150 or another functional module.

The wireless communication module 160 may provide wireless communication solutions for the electronic device 100, including wireless local area network (wireless local area networks, WLAN)(for example, wireless fidelity (wireless fidelity, Wi-Fi) network), Bluetooth (Bluetooth. BT), global navigation satellite system (global navigation satellite system, GNSS), frequency modulation (frequency modulation, FM), near field communication (near field communication, NFC), infrared (infrared, IR) technology, and the like. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may also receive a to-be-sent signal from the processor 110, perform frequency modulation and amplification on the signal, and convert the signal into an electromagnetic wave and radiate the electromagnetic wave by using the antenna 2.

In some embodiments, in the electronic device 100, the antenna 1 is coupled to the mobile communication module 150, and the antenna 2 is coupled to the wireless communication module 160, so that the electronic device 100 can communicate with a network and other devices by using a wireless communication technology. The wireless communication technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR technology, and/or the like. The GNSS may include the global positioning system (global positioning system, GPS), the global navigation satellite system (global navigation satellite system, GLONASS), the BeiDou navigation satellite system (beidou navigation satellite system, BDS), the quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is an image processing microprocessor and connects to the display 194 and the application processor. The GPU is configured to perform mathematical and geometric computation for graphics rendering. The processor 110 may include one or more GPUs, which execute program instructions to generate or change display information.

The display 194 is configured to display images, videos, and the like. The display 194 includes a display panel. The display panel may use a liquid crystal display (liquid crystal display, LCD), an organic light-emitting diode (organic light-emitting diode, OLED), an active-matrix organic light-emitting diode or an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes, QLED), and the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. The camera 193 is configured to capture a static image or a video. An optical image of an object is generated by using a lens and is projected to a photosensitive element.

The digital signal processor is configured to process digital signals, including digital image signals and other digital signals. For example, when the electronic device 100 is performing frequency selection, the digital signal processor is configured to perform Fourier transform or the like on energy of frequencies.

The video codec is configured to compress or decompress a digital video. The electronic device 100 may support one or more types of video codecs. In this way, the electronic device 100 can play or record videos in a plurality of encoding formats, for example, moving picture experts group (moving picture experts group, MPEG) 1, MPEG 2, MPEG 3, and MPEG 4.

The NPU is a neural network (neural-network, NN) computing processor. By learning from structures of biological neural networks, for example, from the mode of transmission between neurons in a human brain, the NPU can quickly process input information and perform self-learning continuously.

The external memory interface 120 may be configured to connect an external memory card, for example, a micro SD card, to extend a storage capacity of the electronic device 100. The external memory card communicates with the processor 110 by using the external memory interface 120, to implement a data storage function. For example, files such as music and videos are stored in the external memory card.

The internal memory 121 may be configured to store computer executable program code, where the executable program code includes instructions. The internal memory 121 may include a program storage area and a data storage area. The program storage area may store an operating system, an application program required by at least one function (for example, a sound play function or an image play function), and the like. The data storage area may store data (for example, audio data or a phone book) and the like that are created during use of the electronic device 100. In addition, the internal memory 121 may include a high-speed random access memory, and may further include a nonvolatile memory, for example, at least one magnetic disk storage device, flash memory device, or universal flash storage (universal flash storage, UFS). By running the instructions stored in the internal memory 121 and/or the instructions stored in the memory that is provided in the processor, the processor 110 executes various functional applications and data processing of the electronic device 100.

The electronic device 100 may implement an audio function, for example, music playing or recording, by using the audio module 170, the loudspeaker 170A, the telephone receiver 170B, the microphone 170C, the earphone jack 170D, the application processor, and the like.

The pressure sensor 180A is configured to sense a pressure signal, and may convert the pressure signal into an electrical signal. In some embodiments, the pressure sensor 180A may be disposed at the display 194. There are many types of pressure sensors 180A, such as a resistive pressure sensor, an inductive pressure sensor, and a capacitive pressure sensor. The capacitive pressure sensor may include at least two parallel plates with a conductive material. When force is applied to the pressure sensor 180A, a capacitance between electrodes changes. The electronic device 100 determines a strength of pressure based on a change in the capacitance. When a touch operation is performed on the display 194, the electronic device 100 detects a strength of the touch operation by using the pressure sensor 180A. The electronic device 100 may also calculate a touch position based on a detection signal of the pressure sensor 180A. In some embodiments, touch operations that are performed on a same touch position but have different touch operation strengths may correspond to different operation instructions. For example, when a touch operation whose touch operation strength is less than a first pressure threshold is performed on an icon of the Messaging application, an instruction for viewing a short message is executed, whereas when a touch operation whose touch operation strength is greater than or equal to the first pressure threshold is performed on the icon of the Messaging application, an instruction for creating a short message is executed.

The gyro sensor 180B may be configured to determine a motion posture of the electronic device 100. The barometric pressure sensor 180C is configured to measure barometric pressure. In some embodiments, the electronic device 100 calculates an altitude by using a barometric pressure value measured by the barometric pressure sensor 180C, to assist in positioning and navigation. The magnetic sensor 180D includes a Hall sensor. The acceleration sensor 180E may detect magnitudes of accelerations of the electronic device 100 in various directions (typically three axes). The distance sensor 180F is configured to measure a distance. The electronic device 100 may measure a distance by using infrared light or a laser. In some embodiments, in a shooting scenario, the electronic device 100 may measure a distance by using the distance sensor 180F, to implement fast focusing. The proximity light sensor 180G may include, for example, a light-emitting diode (LED) and an optical detector, for example, a photodiode. The ambient light sensor 180L is configured to sense luminance of ambient light. The fingerprint sensor 180H is configured to collect a fingerprint. The electronic device 100 may implement fingerprint-based unlock, access to an application lock, fingerprint-based photographing, fingerprint-based incoming call answering, and the like by using characteristics of a collected fingerprint. The temperature sensor 180J is configured to detect a temperature.

The touch sensor 180K is also referred to as a "touch device". The touch sensor 180K may be disposed at the display 194, and the touch sensor 180K and the display 194 form a touchscreen, which is also referred to as a "touch control screen". The touch sensor 180K is configured to detect a touch operation performed on or near the touch sensor 180K. The touch sensor may transfer the detected touch operation to an application processor for determining a type of touch event. Visual output related to the touch operation may be provided by using the display 194. In some other embodiments, the touch sensor 180K may be alternatively disposed on a surface of the electronic device 100, and is located at a different position than the display 194.

The SIM card interface 195 is configured to connect a SIM card. The SIM card may be inserted into the SIM card interface 195 or removed from the SIM card interface 195 to achieve contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of SIM cards can be inserted into a same SIM card interface 195. The plurality of SIM cards may be of a same type or different types. The SIM card interface 195 may also be compatible with different types of SIM cards. The SIM card interface 195 may also be compatible with an external memory card. The electronic device 100 interacts with a network through a SIM card to implement functions such as calling and data communication. In some embodiments, the electronic device 100 uses an eSIM card, that is, an embedded SIM card. The eSIM card may be embedded in the electronic device 100, unable to be separated from the electronic device 100. A software system of the electronic device 100 may use a layered architecture, an event-driven architecture, a microkernel architecture, a microservice architecture, or a cloud architecture.

The embodiments of this application provide a card display method, an electronic device, and a computer readable storage medium, allowing a user to quickly display and switch between cards on a current screen of a home screen through only simple operations, even only one step of operation, with little impact on a current layout of icons, thereby facilitating ease of operation and improving user experience. The current screen of the home screen is any screen of the home screen, and may be any one of a minus one screen of the home screen, a first screen of the home screen, a second screen of the home screen, a third screen of the home screen, or the like.

Figure 4:
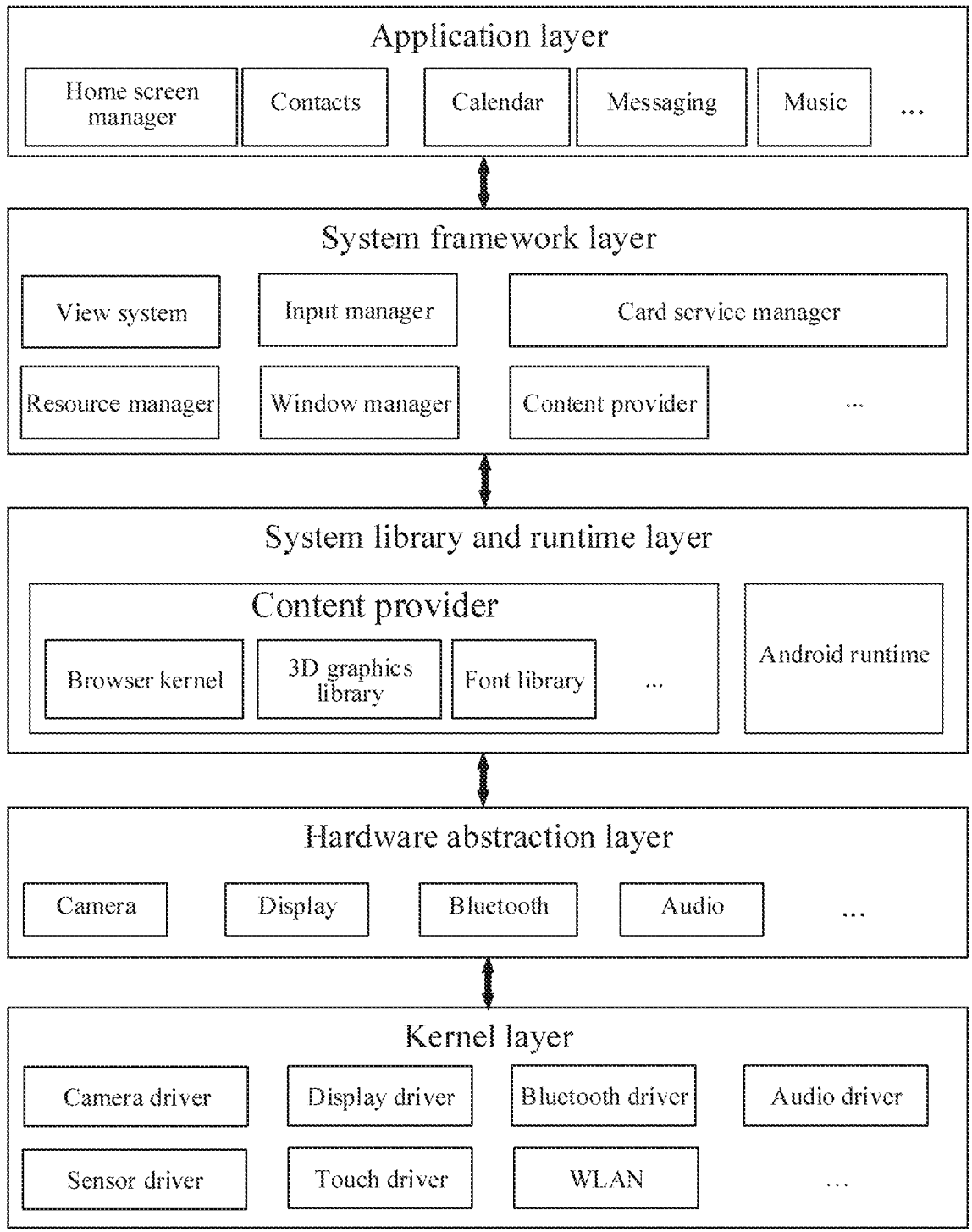
FIG. 4 is a block diagram of a software structure of an electronic device according to an embodiment of this application.

FIG. 4 is a block diagram of a software structure of an electronic device 100 according to an embodiment of this application. A layered architecture divides software into several layers, and each layer has a clear role and responsibility. The layers communicate with each other by using software interfaces. In some embodiments, an Android system is divided into five layers, which are an application layer, a system framework layer, a system library and runtime layer, a hardware abstraction layer, and a kernel layer from top to bottom. The application layer may include a series of application packages. As shown in FIG. 4, the application packages may include applications such as a home screen manager, Contacts, Calendar, Messaging, and Music. The home screen manager is used to manage and display icons of all common applications and card information corresponding to all the common applications, and does not have an icon on a home screen. When a user triggers a card display operation, the home screen manager loads and displays card information. The common applications such as Contacts and Calendar are applications with icons that can be tapped on the home screen, and are used to provide data related to card display.

The system framework layer provides application programming interfaces (Application Programming Interface, API) and a programming framework for applications at the application layer, and includes various components and services to support developers' Android development. The system framework layer includes some predefined functions. As shown in FIG. 4, the system framework layer may include a view system, an input manager, a card service manager, a resource manager, a window manager, a content provider, and the like. The view system includes visual controls, for example, controls with text displayed and controls with pictures displayed. The view system may be used to build applications. A display interface may include one or more views. The window manager is used to manage window programs. The window manager can obtain a size of a display screen, determine whether a status bar is present, lock a screen, take a screenshot, and the like. The input manager is used to manage and dispatch touch events. The card service manager is used to receive and store card information published by applications apps (Application) on the home screen, and provides an interface for home screen programs to query for the card information of the apps. The Android system is used as an example. The card service manager may serve as a service process resident on the Android system, providing a remote call interface to receive card information published by apps and another remote call interface for home screen programs to query for card information. The card service manager stores a unique ID of an app and card information corresponding to the app. The card information corresponding to the app is published and stored in a form of a data structure. The unique ID of the app may be an application package name (PackageName) of the app or a hash code of the application package name. The resource manager provides various resources for applications, for example, localized strings, icons, pictures, layout files, and video files. The window manager is used to manage window programs. The window manager can obtain a size of a display screen, determine whether a status bar is present, lock a screen, take a screenshot, and the like. The content provider is used to store and obtain data and allow the data to be accessed by applications. The data may include videos, images, audio, outgoing and received calls, a browsing history, bookmarks, a phone book, and the like.

The system library and runtime layer includes system libraries and an Android runtime (Android Runtime). The system libraries may include a plurality of functional modules, for example, a browser kernel, a 3D graphics library (for example, OpenGL ES), and a font library. The browser kernel is responsible for interpreting syntax of a web page (for example, an application HTML or JavaScript under a standard generalized markup language) and rendering (displaying) the web page. The 3D graphics library is used to implement three-dimensional graphics drawing, image rendering, synthesis, layer processing, and the like. The font library is used to implement inputting of different fonts. The Android runtime includes core libraries and a virtual machine. The Android runtime is responsible for scheduling and management of the Android system. The core libraries include functional functions that the java language needs to call and core libraries of Android. The application layer and the application framework layer run on the virtual machine. The virtual machine executes java files of the application layer and the application framework layer as binary files. The virtual machine is used to perform functions such as object life cycle management, stack management, thread management, security and exception management, and garbage collection.

The hardware abstraction layer is an abstract interface for kernel drivers of the device, and provides a higher-level java API framework with application programming interfaces for accessing an underlying device. The HAL includes a plurality of library modules, and each library module implements an interface for a specific type of hardware component.

The kernel layer is a layer between hardware and software. The kernel layer includes at least a camera driver, a display driver, a Bluetooth driver, an audio driver, a sensor driver, a touch driver, and a WLAN. The kernel layer is the foundation of the Android®™ system. Final implementation of functions of the Android®™ system is completed by using the kernel layer.

Figure 5:
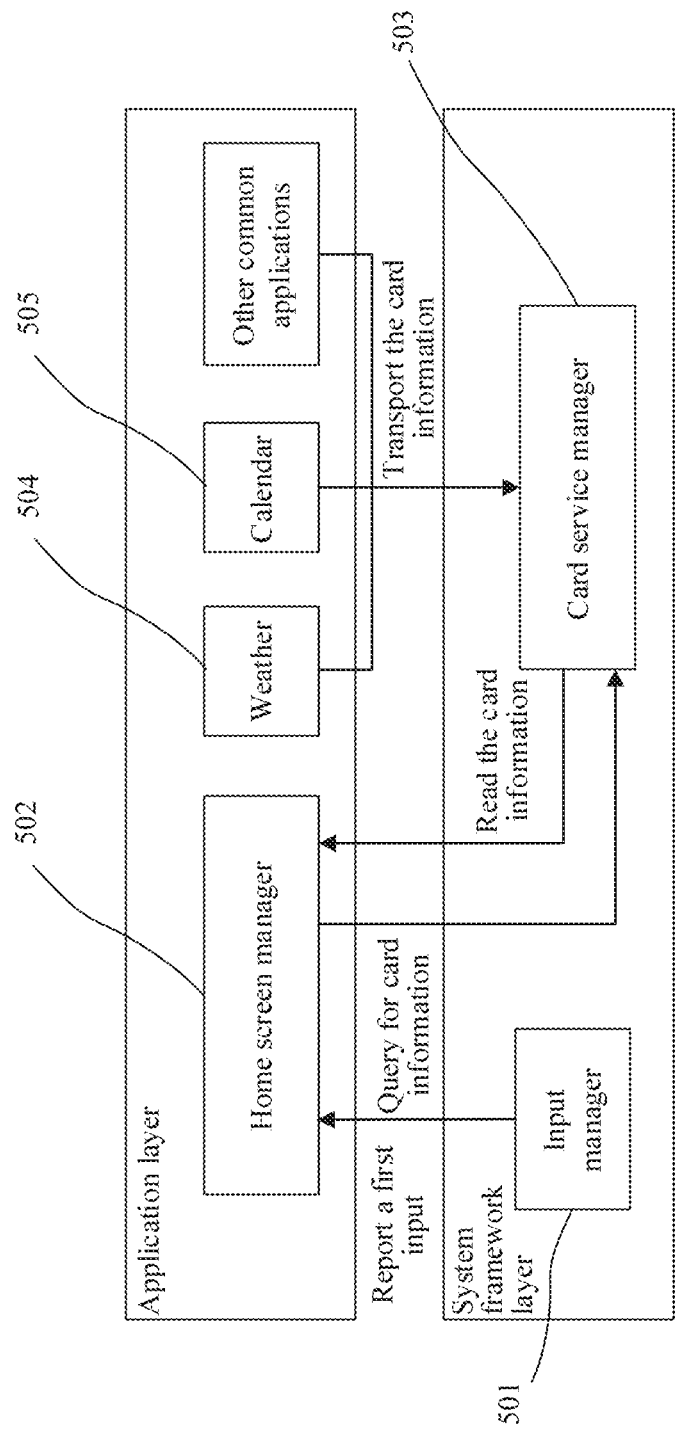
FIG. 5 is a schematic diagram of a software procedure of a card display method according to an embodiment of this application.

FIG. 5 is a schematic diagram of a software procedure of a card display method according to an embodiment of this application. As shown in FIG. 5, applications that are related to a home screen and that run at an application layer of an electronic device fall in two categories: a home screen manager 502 and common applications such as Weather 504 and Calendar 505. Optionally, card information is preset for common applications such as Weather 504 and Calendar 505, and under a particular condition, the common applications transport the card information corresponding to the common applications to a card service manager 503 at a system framework layer. In some embodiments, that card information is preset for a common application includes: presetting card information in the common application by using a RemoteViews data structure. For example, RemoteViews and its coordinate layout are defined, and data information such as text color, character string content, icons, and operations in response to user inputs are set for RemoteViews. In some embodiments, that card information is preset for a common application includes: presetting card information about a card layout in the common application by using an xml file data structure.

The following is part of pseudo code for presetting card information in the common application by using a RemoteViews data structure:

```
    ......
    RemoteViews remoteView = new Remote Views(getPackageName( ),
R.layout.layout_notification)
    remoteView.setTextColor(R.id.re_text.Color.RED)
    remoteView.setTextViewText(R.id.re_text, "remote view demo")
    remoteView.setImageViewResource(R.id.re_image,
R.drawable.btn_me_share)
    remoteView.setOnClickPendingIntent(R.id.re_image, pendingIntent)
    ......
```

The following is part of pseudo code for presetting card information about a card layout in the common application by using an xml file data structure:

```
      ......
      <LinearLayout
      xmlns:android="http://schemas.android.com/apk/res/android"
         android:layout_width=="fill parent"
         android:layout_height="fill_parent">
       < ImageView
         android:contentDescription="@string/app_name"
         android:id="@+id/re_image"
         android:layout_width="wrap_content"
         android:layout_height="wrap_content"
         android:src"@drawable/btn_me_share"/>
      <TextView
      android:id="@+id/re_text"
      android:layout_width="wrap content"
      android:layout_height="wrap content"
      android:textColor="@color/red"
      android:text="remote view demo"/>
      </LinearLayout>
      ......
```

As required, definition of the xml file may be extended.

After the preceding presettings are completed, the common application transports the card information corresponding to the common application to the card service manager 503 at the system framework layer under a specific condition, for example, when data of the common application changes, or after the electronic device is powered on. The card service manager 503 receives and stores the card information. The card service manager 503 may store, in a form of a list, an ID corresponding to each icon and card information corresponding to the ID. The home screen manager determines, based on a user input, whether to query about a card, and generates and displays a card on a current screen of the home screen of the electronic device based on a query result. The user input may be a gesture input of a user or a speech instruction input of the user. A user gesture may be a user gesture on a touchscreen or a mid-air swiping gesture above the current screen of the home screen. For example, the user inputs a first gesture on the touchscreen of the electronic device. The touchscreen detects the first gesture, and reports the first gesture to the home screen manager 502 at the application layer through an input manager 501 at the system framework layer. The home screen manager 502 receives the first gesture, and determines whether the first gesture matches a preset gesture. If the first gesture matches the preset gesture, the home screen manager 502 obtains, based on the first gesture, a first icon that is to be used as a reference for card display, and then obtains an ID corresponding to the first icon. Based on the ID, the home screen manager 502 queries the card service manager 503 for card information corresponding to the ID. The card service manager 503 transports the card information corresponding to the ID to the home screen manager 502. The home screen manager 502 generates and displays a card based on the received card information corresponding to the ID.

Optionally, no card service manager 503 needs to be provided at the system framework layer. Common applications such as Weather 504 and Calendar 505 are provided with their respective card service managers. Based on the ID, the home screen manager 502 queries the card service managers of the common applications such as Weather 504 and Calendar 505 for card information corresponding to the ID. A common application whose ID is the same as that ID transports the card information corresponding to the ID to the home screen manager 502 through the card service manager of the common application, and a common application whose ID is different from that ID does not transport card information to the home screen manager 502 through the card service manager of the common application. The home screen manager 502 generates a card based on the received card information corresponding to the ID.

The presettings may be presettings made by an electronic device manufacturer for its self-developed applications before delivering the electronic device. A just delivered electronic device, for example, has not been installed with any application other than applications self-developed by a manufacturer of the electronic device. For another example, the electronic device manufacturer and a third-party application provider have agreed through negotiation that a third-party application downloaded from an application market built in the electronic device is preset as described above. Certainly, of applications installed on the electronic device, alternatively, some may have been preset and some may have not been preset.

Figure 6A:
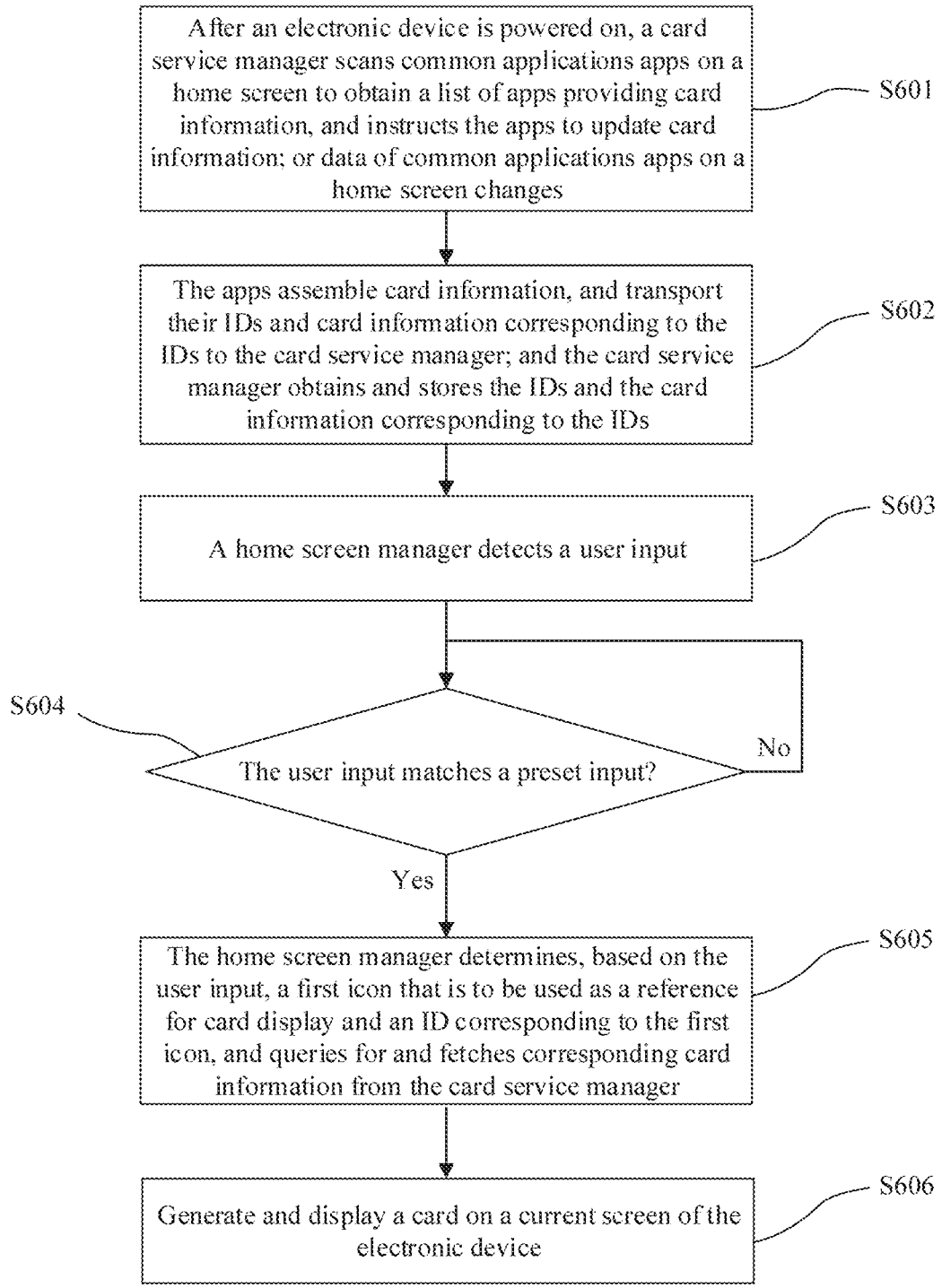
FIG. 6a and FIG. 6b are schematic flowcharts of a card display method according to an embodiment of this application.
Figure 6B:
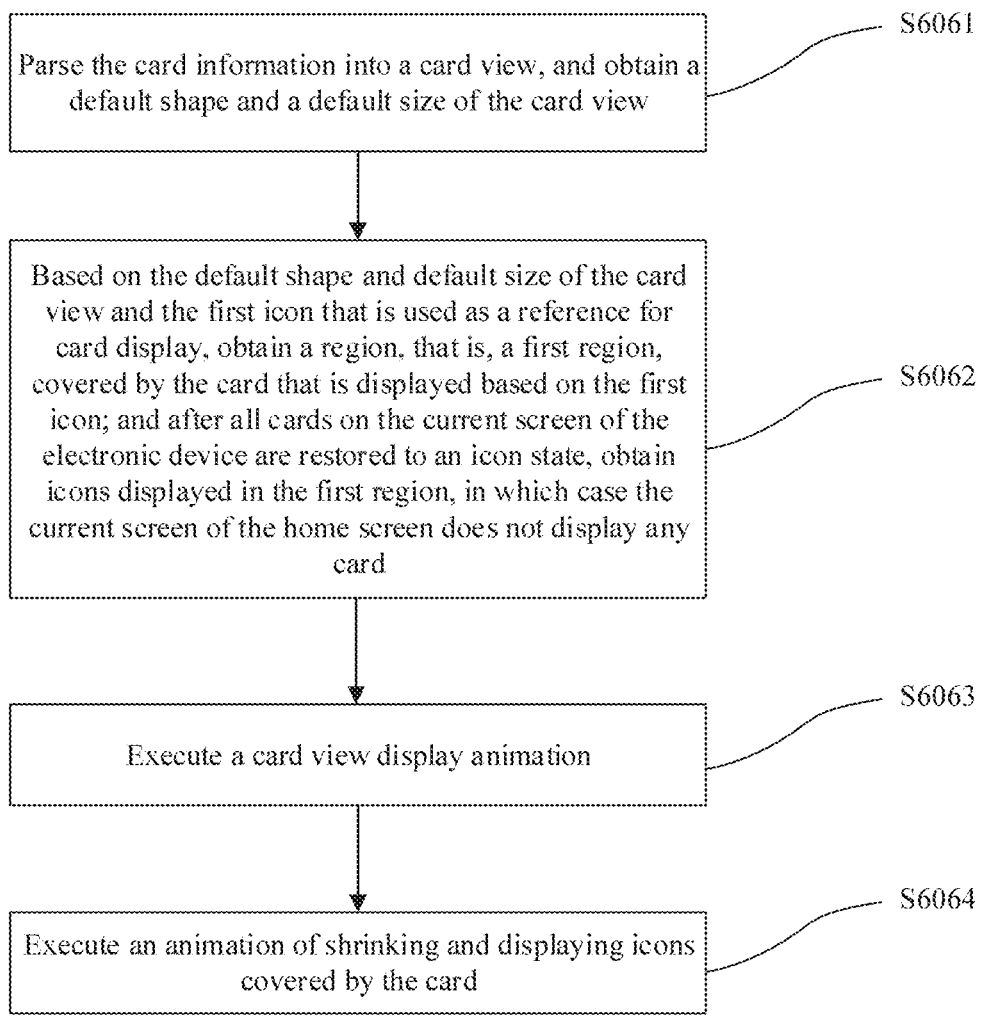

FIG. 6a and FIG. 6b are schematic diagrams of an implementation process of a card display method according to an embodiment of this application. FIG. 6a is a schematic diagram of the implementation process of the card display method. As shown in FIG. 6a, in S601, after an electronic device is powered on, a card service manager scans common applications apps to obtain a list of apps providing card information, and instructs the apps to update card information, or data of common applications apps on a home screen has changed. In S602, the apps assemble card information, and transport IDs of the common applications apps and card information corresponding to the IDs to the card service manager; and the card service manager obtains and stores the IDs and the card information corresponding to the IDs, where the IDs correspond to not only the card information but also the apps. In S603, a home screen manager detects a user input. In S604, it is determined whether the user input matches a preset input, where if the user input does not match the preset input, the process returns to S604; or if the user input matches the preset input, S605 is performed. In S605, the home screen manager determines, based on the user input, an ID corresponding to a first icon that is to be used as a reference for card display, queries the card service manager for corresponding card information, and reads the corresponding card information. In S606, a card is generated and displayed on a current screen of the home screen of the electronic device based on the card information.

The user input may be a gesture input of a user or a speech instruction input of the user. A user gesture may be a user gesture on a touchscreen or a mid-air swiping gesture above the current screen of the home screen. An example is used in which the user enters a first gesture on the touchscreen of the electronic device.

Correspondingly, S604 is specifically determining whether the first gesture meets a preset gesture, where if the first gesture does not meet the preset gesture, the process returns to S604; and S605 is specifically that the home screen manager determines, based on the first gesture, the ID corresponding to the first icon that is to be used as a reference for card display, queries the card service manager for the corresponding card information, and reads the corresponding card information.

Optionally, determining whether the first gesture matches a preset gesture is specifically determining whether a swiping direction of the first gesture matches a preset a swiping direction.

Optionally, that the home screen manager determines, based on the first gesture, the ID corresponding to the first icon that is to be used as a reference for card display, queries the card service manager for the corresponding card information, and reads the corresponding card information is specifically that the home screen manager determines, based on a starting point of the first gesture, the ID corresponding to the first icon that is to be used as a reference for card display, queries the card service manager for the corresponding card information, and reads the corresponding card information.

FIG. 6b is a schematic flowchart of sub-steps of step S606 in FIG. 6a. In S6061, the card information is parsed into a card view, with a default shape and a default size of the card view obtained. In S6062, a region, that is, a first region, covered by the card that is displayed based on the first icon is obtained based on the default shape and default size of the card view and the first icon that is used as a reference for card display: and after all cards on the current screen of the home screen of the electronic device are restored to an icon state, icons displayed in the first region are obtained, where the current screen of the home screen does not display any card. In S6063, an animation of displaying the card view is executed. In S6064, an animation of shrinking and displaying the icons corresponding to the first region is executed, that is, the icons are displayed on the card in a form of controls after being reduced in size, in which case no icon is located in the first region.

In some embodiments, S6064 may not be included. After the card is displayed, the icons corresponding to the first region are blocked by the card, and controls corresponding to the icons are displayed on the card.

The card information includes the default shape, default size, and card content of the card view as displayed. The card content includes content of elements. The content of elements is content included in a content interface or function interface that is displayed after a common application corresponding to the card information is launched. The content interface includes a content simplified interface. The function interface includes a function simplified interface. Content in the content simplified interface is less than content in the content interface. Content in the function simplified interface is less than content in the function interface.

Optionally, the first icon that is to be used as a reference for card display is determined based on the starting point of the first gesture.

Optionally, the card information of common applications may include cards views of the same or different default shapes and/or default sizes. Preferably, the card information of common applications includes card views of the same default shape and the same default size. For presetting of each common application, the same default shape and default size are recommended for the card view.

Optionally, further, after the card is displayed on the current screen of the home screen, the shape and size of the card may be changed based on a user input.

Optionally, S4063 and S4064 may be combined into one step, which is executing the animation of displaying the card view and executing the animation of shrinking and displaying the icons displayed in the first region. In other words, the animation of displaying the card view and the animation of shrinking and displaying the icons displayed in the first region are executed simultaneously, and there is no sequential order. Alternatively, the animation of displaying the card view and the animation of shrinking and displaying the icons displayed in the first region are combined into one animation, which is an animation of displaying the card view and shrinking and displaying the icons displayed in the first region and is executed in the step with S4063 and S4064 combined.

Optionally, S4063 and S4064 may be interchanged in sequence. In other words, the animation of shrinking and displaying the icons displayed in the first region is executed before the animation of displaying the card view.

It should be noted that the process shown in FIG. 6b is merely an embodiment of further subdivision of step S606 in FIG. 6a, and S606 in FIG. 6a may have other embodiments of subdivision.

Figure 7:
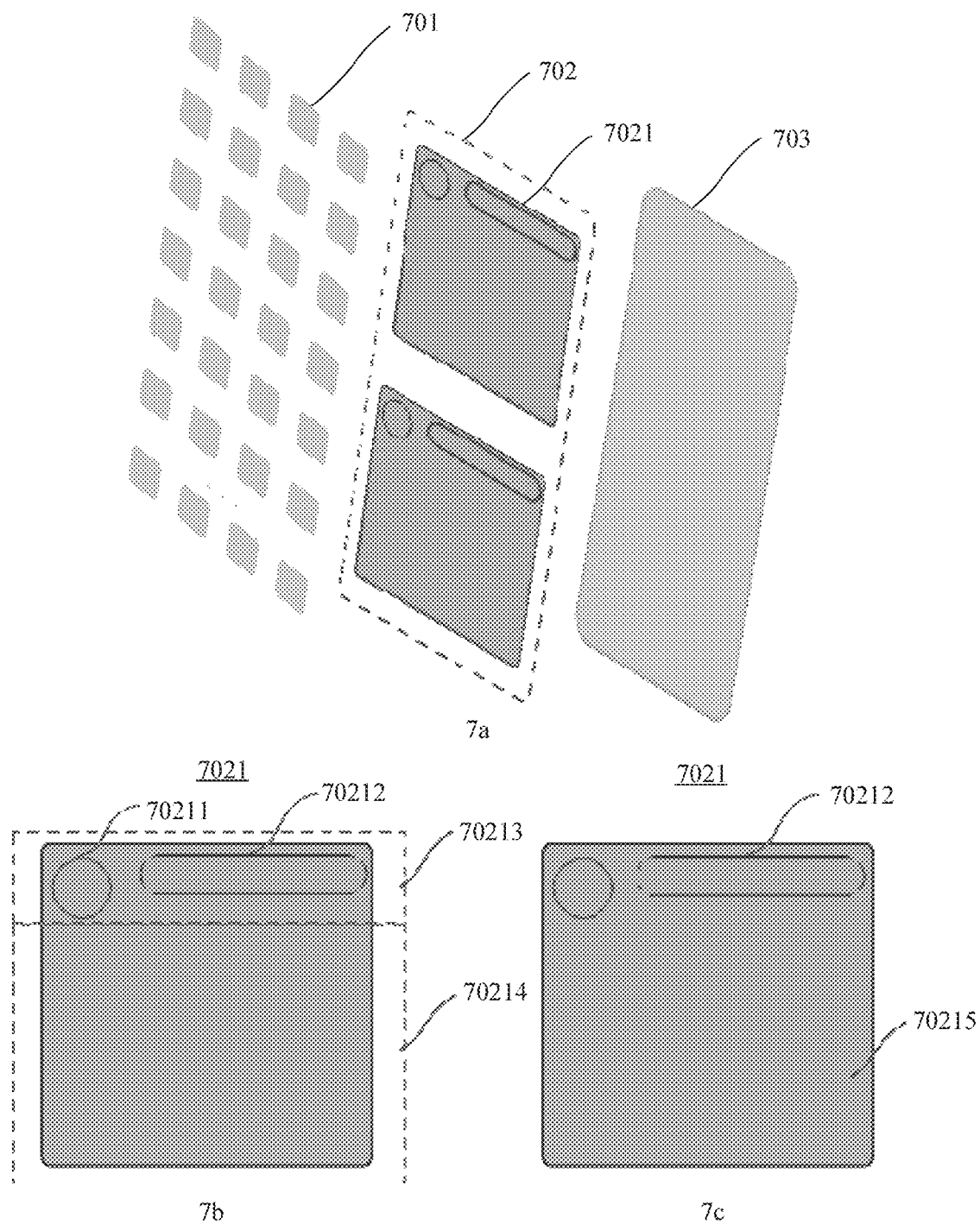
FIG. 7 is a schematic structural diagram of layers in a card display method according to an embodiment of this application.

FIG. 7 is a schematic structural diagram of layers in a card display method according to an embodiment of this application. As shown in FIG. 7a, the card display method provided in this embodiment of this application involves three layers: an icon layer 701, a card layer 702, and a wallpaper layer 703. The icon layer 701 includes icons displayed on a current screen of a home screen of an electronic device. The card layer 702 includes cards displayed on the current screen of the home screen of the electronic device. The wallpaper layer 703 includes a wallpaper displayed on the current screen of the home screen of the electronic device. When no icon is present on the current screen of the home screen of the electronic device, the current screen of the home screen of the electronic device does not have the icon layer. Likewise, when no card and/or wallpaper is present on the current screen of the home screen of the electronic device, the current screen of the home screen of the electronic device does not have the card layer and/or wallpaper layer. The following uses a card 7021 included in the card layer as an example to further describe region division on the card 7021.

As shown in FIG. 7b, when being divided by display region, the card 7021 includes a card title bar 70213 and a card content region 70214. The card title bar 70213 includes a first control region 70211 and a second control region 70212. A region occupied by the card 7021 on the current screen of the home screen of the electronic device is a first region. After all cards on the current screen of the home screen of the electronic device are restored to an icon state, icons displayed in the first region include a first icon and other icons. In some embodiments, the first control region 70211 displays only a first control corresponding to the first icon, and the second control region 70212 displays N controls corresponding to the other icons. In some embodiments, the first control region 70211 does not display a control corresponding to any icon, and the second control region 70212 displays controls corresponding to the other icons, or the second control region 70212 displays a control corresponding to any icon other than the first icon and the other icons.

The first control displayed in the first control region 70211 may be a control that is displayed after an application icon or a folder icon is reduced in size by a specific scale factor. The N controls displayed in the second control region 70212 are controls that are displayed after the N icons are reduced in size by another scale factor. The N icons include an application icon and/or a folder icon. Content displayed in the card content region 70214 is associated with the first icon and the first control.

Optionally, the card title bar 70213 is located in an upper part of the card 7021, and the card content region 70214 is located in a lower part of the card 7021. In this case, the card title bar 70213 is arranged transversely. Optionally, the card title bar 70213 is located in a lower part of the card 7021, and the card content region 70214 is located in an upper part of the card 7021. In this case, the card title bar 70213 is arranged transversely. Optionally, the card title bar 70213 is located in a left part of the card 7021, and the card content region 70214 is located in a right part of the card 7021. In this case, the card title bar 70213 is arranged longitudinally. Optionally, the card title bar 70213 is located in an upper part of the card 7021, and the card content region 70214 is located in a lower part of the card 7021. In this case, the card title bar 70213 is arranged longitudinally.

Optionally, the first control region 70211 is located in a left part of the card title bar 70213, and the second control region 70212 is located in a right part of the card title bar 70213. Optionally, the first control region 70211 is located in a right part of the card title bar 70213, and the second control region 70212 is located in a left part of the card title bar 70213. Optionally, the first control region 70211 is located in an upper part of the card title bar 70213, and the second control region 70212 is located in a lower part of the card title bar 70213. Optionally, the first control region 70211 is located in a lower part of the card title bar 70213, and the second control region 70212 is located in an upper part of the card title bar 70213.

That the card title bar 70213 or the card content region 70214 is located in an upper, lower, left, or right part of the card 7021 means that the card title bar 70213 or the card content region 70214 is located in an upper, lower, left, or right part within a region of the card 7021. That the first control region 70211 or the second control region 70212 is located in an upper, lower, left, or right part of the card title bar 70213 means that the first control region 70211 or the second control region 70212 is located in an upper, lower, left, or right part within a region of the card title bar 70213.

Optionally, the second control region 70212 may be alternatively located outside the card title bar 70213, for example, located in a part above the region of the card title bar 70213. Optionally, a floating ball is provided in a part above the region of the card 7021, and the second control region 70212 is displayed only after the floating ball is touched.

In addition to the foregoing manners, other manners perceivable by a person skilled in the art all fall within the protection scope of the embodiments of this application. Details are not described herein.

As shown in FIG. 7c, when being divided by consistency of content display, the card 7021 includes a card layer substrate 70215 and the second control region 70212. On the card 7021, all regions except the second control region 70212 belong to the card layer substrate 70215. Optionally, the second control region 70212 may be located in an upper left corner, upper right corner, a lower left corner, a lower right corner, an upper part, a lower part, a left part, or a right part within the region of the card 7021. When the second control region 70212 is located in the upper or lower part within the region of the card 7021, the second control region is arranged transversely. When the second control region 70212 is located in the left or right part within the region of the card 7021, the second control region is arranged longi-tudinally. Optionally, the second control region 70212 may be located at any other position within the region of the card 7021.

Optionally, the second control region 70212 may be located outside the region of the card 7021, for example, in a part above the region of the card 7021. Optionally, a floating ball is provided in a part above periphery of the card 7021, and the second control region 70212 is displayed after the floating ball is touched. In addition to the foregoing manners, other manners perceivable by a person skilled in the art all fall within the protection scope of the embodiments of this application. Details are not described herein.

On the current screen of the home screen of the electronic device, the icon layer 701 and the wallpaper layer 703 may always be present while the card layer 702 may sometimes not be present. With no card layer present previously, detection of a first input triggers generation and display of the card 7021. Generation and display of the card 7021 being triggered also indicates that the card layer 702 is generated and displayed. In addition, icons that are on the icon layer 701 and that are covered by the card 7021 are absorbed by the card 7021, and displayed on the card 7021 in a form of controls after being reduced in size by a scale factor. In this case, a quantity of icons included in the icon layer 701 decreases. Similarly, under triggering of a second gesture, the card 7021 is converted into icons, and the previously absorbed icons that are displayed on the card 7021 in the form of controls after being reduced in size by a scale factor are restored to icon sizes and positions that are before the absorption. Optionally, in some cases, the card layer 702 is located between the icon layer 701 and the wallpaper layer 703, and in some cases, the card layer 702 is located above the icon layer 701.

It should be noted that a circular shape of the first control region and a runway rectangle shape of the second control region are used merely to indicate positions of the first control region and the second control region on the card layer, respectively, and are not intended to limit shapes of the first control region and the second control region. The first control region and the second control region may be in any shape, including but not limited to a circle, a rectangle, a rounded rectangle, a runway rectangle, or the like. A rounded rectangle shape of the card is merely an illustrative example of the shape of the card, and is not intended to limit the shape of the card. The card may be in other shapes. The other shapes are any shapes perceivable by a person skilled in the art, including but not limited to a rounded rectangle, a runway rectangle, and the like.

Figure 8:
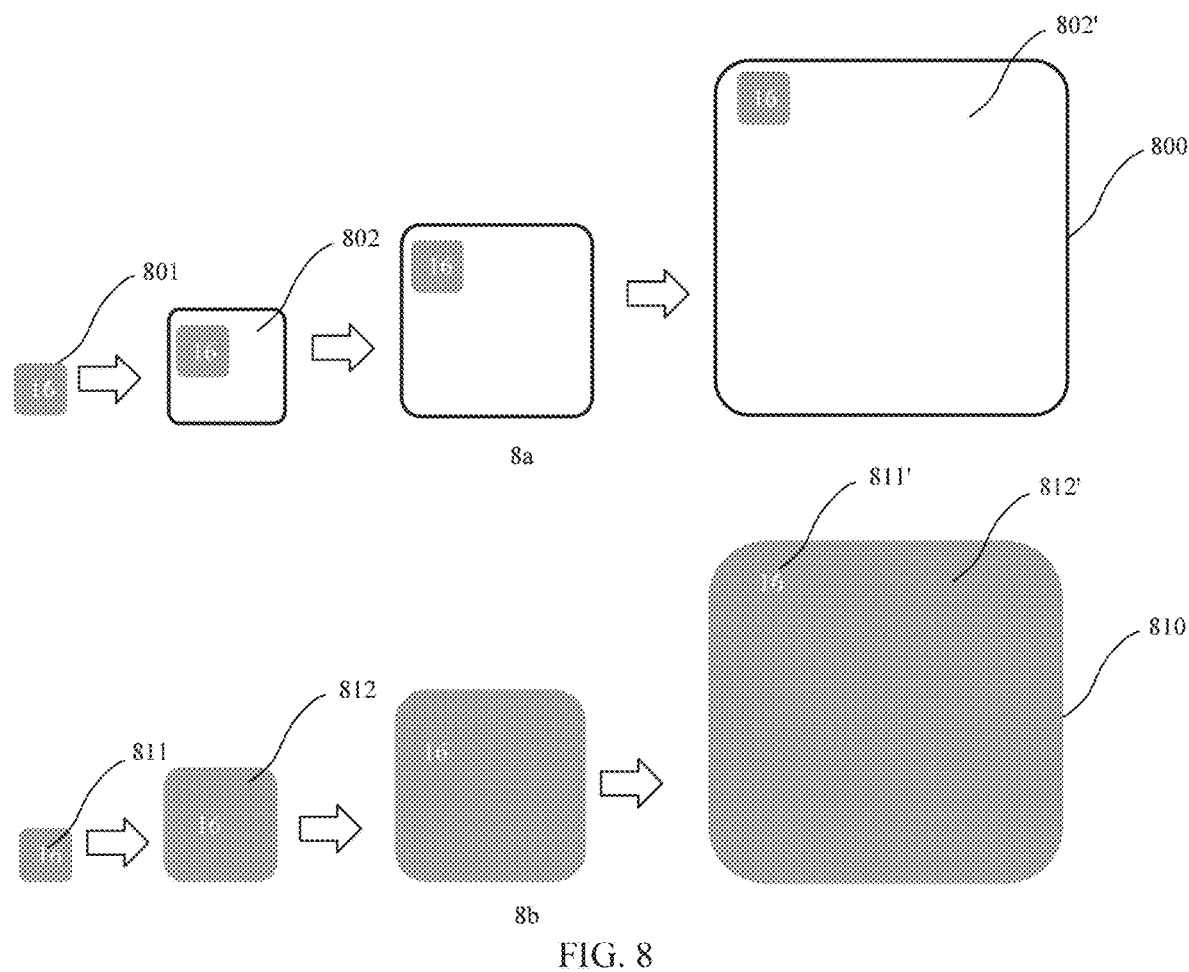
FIG. 8 is a schematic diagram of generation of a card layer substrate in a card display method according to an embodiment of this application.

FIG. 8 is a schematic diagram of generation of a card layer substrate in a card display method according to an embodiment of this application. FIG. 8a and FIG. 8b show two different manners of generating a card layer substrate. An icon of a Calendar application is used as an example. In FIG. 8a, an icon 801 represents the icon of the Calendar application. In a process of generating and displaying a card layer substrate 800 based on the icon 801 of the Calendar application, a display content region 802 grows gradually in size, and the icon 801 remains unchanged in size, reduced by a specific scale factor, or is enlarged by a specific scale factor. A position of the icon 801 in the display content region 802 gradually approaches an upper left corner of the display content region 802. Finally, when growing to 802', the display content region 802 stops growing. In this case, the icon 801 is located in an upper left corner of the display content region 802'. In this way, the card layer substrate 800 is generated. In FIG. 8b, an icon includes two parts: a number 16 and a display content region. 811 represents the number 16, and 812 represents the display content region. The number 16 is an identifier of the Calendar application, indicating that today is the $16^{th}$ The number 16 is selected merely for illustration purposes, and changes accordingly as time changes. For example, today is the $16^{th}$, and tomorrow, the identifier of the Calendar application changes from the number 16 to a number 17 accordingly. In a process of generating a card layer substrate based on the icon of the Calendar application, the display content region 812 grows gradually is size, and the number 16 811 also grows gradually in size and gradually approaches an upper left corner of the display content region 812. Finally, when growing to 812', the display content region 812 stops growing, and when growing to 811', the number 16 811 also stops growing. In this case, the number 16 811' is located in an upper left corner of the display content region 812'. In this way, the card layer substrate 810 is generated. The two manners of generating a card layer substrate are used merely as illustrative examples, and are not intended to limit the manner of generating a card layer substrate. Any card layer substrate generation manner perceivable by a person skilled in the art falls within the protection scope of the embodiments of this application.

Optionally, in FIG. 8a, the icon of the Calendar application may be alternatively located in an upper right corner of the card layer substrate.

Optionally, in FIG. 8a, the icon of the Calendar application may be alternatively located at another position on the card layer substrate, and the display content region may be alternatively located at another position on the card layer substrate, provided that the two positions do not conflict.

Figure 9:
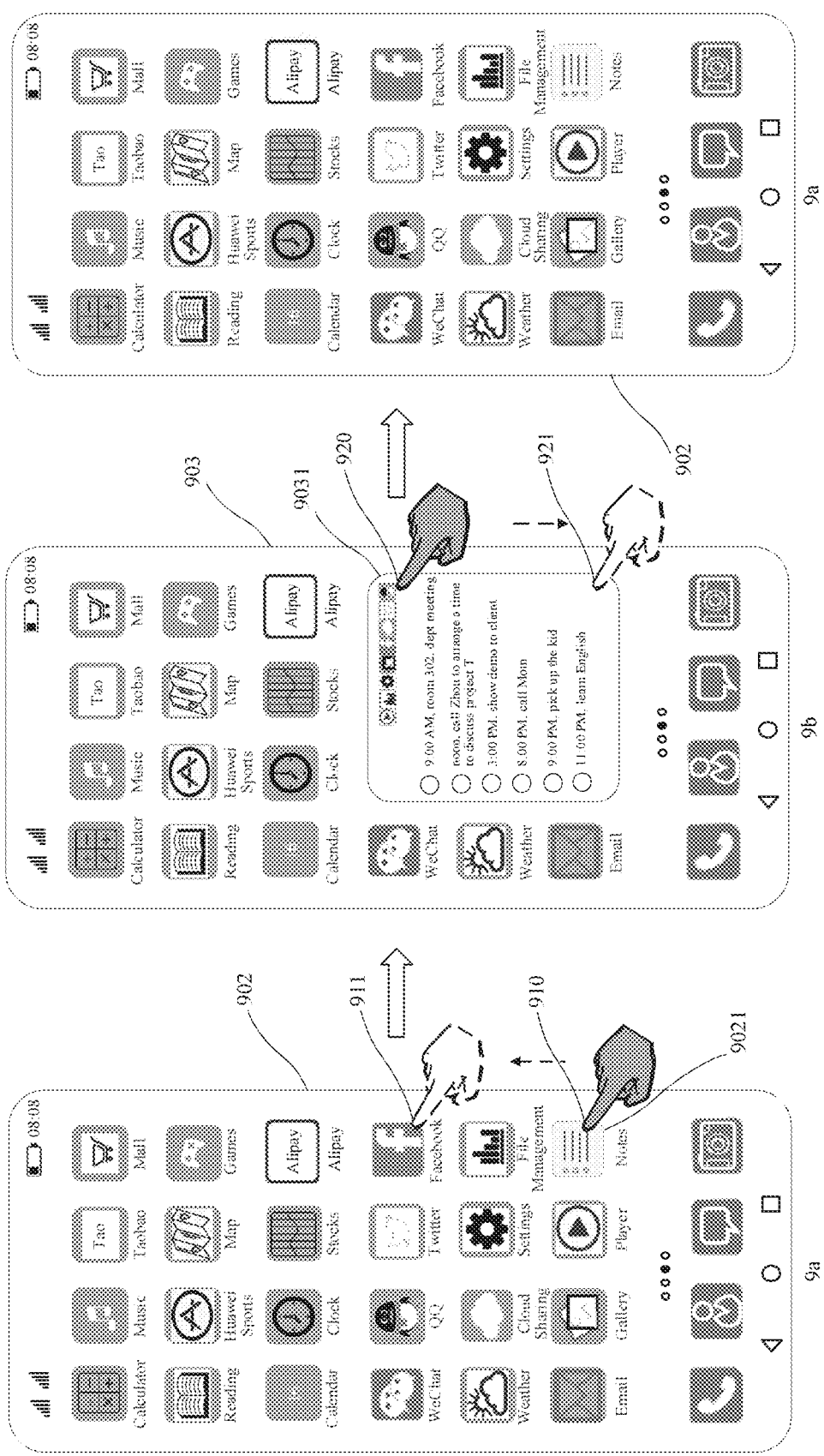
FIG. 9 is a schematic diagram of user interfaces of a card display method according to an embodiment of this application.

FIG. 9 is a schematic diagram of user interfaces of a card display method according to an embodiment of this application. An icon of a Notes application is used as an example for description. As shown in FIG. 9a, on an interface 902 shown in FIG. 9a, a user moves a finger in a direction shown in FIG. 9a with a touch point on the icon 9021 of the Notes application as a starting point. Then, the interface 902 shown in FIG. 9a changes to an interface 903 shown in FIG. 9b, and a card 9031 is generated on the interface 903 shown in FIG. 9b. A region occupied by the card 9031 as shown in FIG. 9b is a first region. On the interface 903 shown in FIG. 9b icons displayed in the first region include icons of nine applications which are Notes, Player, File Management, Settings, Gallery. Facebook, Cloud Sharing, Twitter, and QQ. Alternatively, a first control corresponding to the icon of the Notes application may not be displayed on the card 9031. Controls corresponding to the other eight application icons that are displayed in the first region on the interface 903 are displayed in an upper right corner of the card 9031. Optionally, the first control corresponding to the icon of the Notes application may be displayed in an upper left corner of the card 9031. Optionally, controls displayed in the upper right corner of the card 9031 may not correspond to the eight application icons, and may correspond to other icons, where the other icons are located on a home screen. The other icons may be located on a current screen of the home screen, or may be located on another screen of the home screen. Optionally, in addition to a gesture input shown in FIG. 9a, a user input may also be a speech input, for example, "display a card based on the Notes icon". Optionally, the gesture input shown in FIG. 9a may be the same as or different from a gesture input used for displaying a window for sharing or deletion of an icon. In other words, two different gesture inputs are supported in this embodiment of this application, one used for generating and displaying a card based on an icon, and the other used for displaying a window for sharing or deletion of an icon. Alternatively, one gesture input is supported in this embodiment of this application, that is, a gesture input used for generating and displaying a card based on an icon and displaying a window for sharing or deletion of an icon. Optionally, "Share" and "Delete" and/or corresponding controls displayed in the window may be located on the card. In this way, there is no need to display an additional window.

Below the controls that are in the upper right corner of the card 9031, content of the Notes application is displayed, for example, 9:00 AM, room 302, dept meeting; noon, call Zhou to arrange a time to discuss project T; 3:00 PM, show demo to client; 8:00 PM, call Mom; 9:00 PM, pick up the kid; and 11:00 PM, learn English. On the interface 903 shown in FIG. 9b, the user moves the finger in a direction shown in FIG. 9b with a finger touch point 920 on the card 9031 as a starting point. Then, the card 9031 disappears and ceases to be displayed, and the interface 903 shown in FIG. 9b changes or returns to the interface 902 shown in FIG. 9a.

Optionally, on the interface 902 shown in FIG. 9a, the user may alternatively move the finger in a direction other than the direction shown in FIG. 9a with the touch point on the icon 9021 of the Notes application as a starting point. Then, the interface 902 shown in FIG. 9a changes to the interface 903 shown in FIG. 9b. Likewise, on the interface 903 shown in FIG. 9b, the user moves the finger in a direction other than the direction shown in FIG. 9b with the finger touch point on the card 9031 as a starting point. Then, the card 9031 disappears and ceases to be displayed, and the interface 903 shown in FIG. 9b returns to the interface 902 shown in FIG. 9a.

Preferably, a swiping direction of a first gesture input that corresponds to switching from the interface 902 shown in FIG. 9a to the interface 903 shown in FIG. 9b is opposite to a swiping direction of a second gesture input that corresponds to returning from the interface 903 shown in FIG. 9b to the interface 902 shown in FIG. 9a.

It can be learned from FIG. 5, FIG. 6a, and FIG. 6b that the other eight application icons displayed in the first region on the interface 902 shown in FIG. 9a are displayed in a second control region on the card 9031 in a form of controls after being reduced in size by another scale factor, and content of Notes is displayed in a display content region of the card 9031. In this way, the application icons that are not displayed in the first region on the interface 902 shown in FIG. 9b can still be launched through a touch or other manners, with their positions unchanged and their layout unaffected. The other eight application icons displayed in the first region on the interface 902 shown in FIG. 9a are displayed in the upper right corner of the card merely after being reduced in size by a scale factor, having little impact on a current icon layout. In addition, the other eight application icons can still be launched in through touch or other manners, without causing an additional step of operation to the user. In addition, content displayed on the card is the content of Notes, which is convenient for the user to intuitively and easily obtain the content, with only one step of operation required. To view more Notes content displayed on the card, the user may, for example, swipe in another direction on the card. Therefore, it is not mandatory that the icon of the Notes application is displayed in a first control region, that is, the upper left corner, of the card 9031 in a form of a control after being reduced in size by a specific scale factor. This is because, without the first control corresponding to the icon of the Notes application being displayed in the first control region on the card 9031, the user can still learn that the content displayed on the card is a content interface or content simplified interface that is displayed after the Notes application is launched.

In addition, the card display method provided in this embodiment of this application is particularly suitable for a case in which the user needs to always check the card over a relatively long period of time. For example, a family of three go to a mall one day, buying clothes, cosmetics, school supplies, and other items for the kid, husband, and wife, and eating and watching a movie in the mall. Because a payment code needs to be used frequently, the husband may perform one step of operation on a current screen of a home screen of a mobile phone to generate and display an Alipay card that displays the payment code. To use the payment code, the husband can directly take out the mobile phone and show the card. When the payment code is not in use, the mobile phone screen can be kept locked. In this way, when spending in a mall, a consumer does not need to frequently switch between launching and exiting a payment code, thereby providing convenience of use. Further, for another example, if the user needs to always view Notes over a period of time, the user may make a preset gesture only once. When viewing Notes next time, the user only needs to swipe to the screen, without making the preset gesture again. After a period of time, if the user wants to view content of another application or display a quick access to another application, the user may first close the card, and then generate and display a card based on another icon by making a preset gesture with a touch point on the icon of the another application as a starting point.

In this way, a card and icons can coexist on the current screen of the home screen. In addition, on the current screen of the home screen, based on a user gesture, a card can be generated and displayed, or a card can be closed and restored to icons. The user can directly view card content on the current screen of the home screen; the user can also directly launch an application corresponding to any icon on a region other than a card on the current screen; and the user can also launch an application corresponding to each of N controls directly on the card, thereby facilitating ease of operation and better user experience. For example, the user can launch the WeChat application by directly touching a WeChat icon, and the user can also launch the QQ application by directly touching a control that corresponds to the QQ application and that is in the upper right corner of the card. Therefore, the user can not only intuitively obtain first card content, but also directly launch the application corresponding to each of the N controls, and can also directly perform an operation on the current screen. This facilitates convenience of use for the user in these three aspects, striking a balance among convenience of use in the three aspects. In addition, in the method provided in this embodiment of this application, conversion between the icons displayed in the first region on the interface 902 shown in FIG. 9*a* and the card 9031 has a visual effect of magnetic absorption, thereby improving user experience.

In some embodiments, the icon 9021 of the Notes application may be displayed in the upper left corner of the card 9031 directly in a form of a control without being reduced in size by a specific scale factor, or may be displayed in the upper left corner of the card 9031 in a form of a control after being enlarged by a specific scale factor. In some embodiments, the card 9031 may not be in a shape of a rounded square, but be in another shape. The other shapes are any shapes perceivable by a person skilled in the art, including but not limited to a rounded rectangle, a runway rectangle, and the like.

On the interface 902 shown in FIG. 9*a*, the user may move the finger not only in the direction shown in FIG. 9*a*, but the user may move the finger in another direction, for example, any direction such as a direction obliquely 45 degrees upward or a horizontal direction. This is not limited herein.

In FIG. 9*a*, the first gesture input is used for generating a card based on an icon. Based on the first gesture input, the card 9031 is generated and displayed. A starting point of the first gesture input may be located on the icon 9021 of the Notes application or in a specific region around the icon 9021 of the Notes application. The swiping direction of the first gesture input is a first direction. The first direction may include only one fixed direction, or may include different directions, for example, being first to the left and then upwards. In addition, the first gesture input may be a gesture input obtained by touching the current screen of the home screen. The first gesture input may alternatively be a gesture input obtained by swiping in mid-air above the current screen of the home screen. For example, the first gesture input is a gesture input obtained by drawing a circle in mid-air above the current screen of the home screen. In this case, a mobile terminal performs icon-based card generation based on a vertically projected gesture input of the first gesture input on the current screen of the home screen. Likewise, on the interface 903 shown in FIG. 9*b*, the user may move the finger not only in the direction shown in FIG. 9*b*, but the user may move the finger in another direction. In FIG. 9*b*, the second gesture input is used for restoring icons based on a card. A starting point of the second gesture input may be located on the card 9031 or in a specific region around the card 9031. The swiping direction of the second gesture input is a second direction. The second direction may include only one fixed direction, or may include different directions. The swiping direction of the second gesture input may or may not be opposite to the swiping direction of the first gesture input. For example, the direction of the second gesture input is the direction shown in FIG. 9*b*, and the direction of the first gesture input may be a direction obliquely 45 degrees upward in FIG. 9*a*. A correspondence between the swiping direction of the first gesture input and the swiping direction of the second gesture input needs to be preset. Preferably, the swiping direction of the second gesture input is opposite to the swiping direction of the first gesture input.

In addition, the starting point of the second gesture input may be the same as or different from an ending point of the first gesture input. An ending point of the second gesture input may be the same as or different from the starting point of the first gesture input.

The starting point of the first gesture input may be located on an icon to be converted into a card, or may be located in a specific region around the icon to be converted into a card. That the starting point of the first gesture input is located in a specific region around the icon to be converted into a card may be that a distance between the starting point and a center of the icon to be converted into a card is the shortest compared with distances between the starting point and centers of other icons. For example, when the icon to be converted into a card is the icon of the Notes application, and if compared with distances between the starting point of the first gesture input and centers of other icons, a distance between the starting point of the first gesture input and a center of the icon of the Notes application is the shortest, the starting point of the first gesture input is located in a specific region around the icon of the Notes application. If the starting point of the first gesture input is located in the exact middle of two icons with an equal distance between the starting point of the first gesture input and centers of the two icons, which is the shortest compared with distances between the starting point of the first gesture input and centers of other icons, an icon based on which a card is generated is determined according to a preset rule. For example, if the starting point of the first gesture input is located in the exact middle of the icon of the Player application and the icon of the Notes application in a horizontal direction in FIG. 9a, it is determined that a card is generated based on the icon of the Player application, because a distance between the first gesture input and the icon of the Player application decreases while a distance between the first gesture input and the icon of the Notes application increases as the user moves a finger from the starting point. Certainly, the preset rule may be another rule.

Optionally, one first icon may be alternatively determined in another manner. For example, the preset gesture is a closed curve enclosing only one first icon, and the one first icon enclosed by the closed curve is determined as the one first icon.

Optionally, that the starting point of the first gesture input is located in a specific region around the icon to be converted into a card may alternatively be that the starting point of the first gesture input is located in a circle with the center of the icon to be converted into a card as a center of the circle and a preset length as a radius. Certainly, that the starting point of the first gesture input is located in a specific region around the icon to be converted into a card is not limited to the foregoing implementations. Other implementations perceivable by a person skilled in the art also fall within the protection scope of the embodiments of this application.

The starting point of the second gesture input may be located on a card to be converted into an icon, or may be located in a specific region around the card to be converted into an icon. That the starting point of the second gesture input is located in a specific region around the card to be converted into an icon may be that the starting point of the second gesture input is located in a circle with a center of the card as a center of the circle and a preset length as a radius. For example, there are two cards on a current screen of a home screen of an electronic device. If the starting point of the second gesture input is located in a specific region around two cards, a card whose center is closer to the starting point of the second gesture input is determined, and the card with its center closer to the card is used as the card to be converted into an icon. If the starting point has equal distances to the centers of the two cards, a card based on which conversion into icons is performed is determined according to a preset rule. FIG. 27c is used as an example. A distance between a starting point of a second gesture input and a center of a card 27042 is equal to a distance between the starting point of the second gesture input and a center of a card 27041. Because the card 27042 is located above the card 27041, it is determined that restoration to icons is performed based on the card 27042. Certainly, the preset rule may be another rule.

Optionally, that the starting point of the second gesture input is located in a specific region around the card to be converted into an icon may alternatively be that the starting point of the second gesture input is located in a region within a specific distance from a center of the card. Certainly, that the starting point of the second gesture input is located in a specific region around the card to be converted into an icon is not limited to the foregoing implementations. Other implementations perceivable by a person skilled in the art also fall within the protection scope of the embodiments of this application.

The ending point of the first gesture input and the ending point of the second gesture input are not limited. The ending point of the first gesture input may be located on an icon to be covered and absorbed by the card, or may be located in a specific region around the icon to be covered and absorbed by the card. For example, the ending point of the first gesture input may be located in a right part of the icon of the Facebook application in FIG. 9a. The ending point of the second gesture input may be located on a card to be converted into an icon, or may be located in a specific region around the card to be converted into an icon. For example, the ending point of the second gesture input may be located below the card 9031 in FIG. 9b.

In response to the first gesture input, a card is generated based on an icon. Preferably, in response to the starting point and the swiping direction of the first gesture input, the card is generated based on the icon. Preferably, in response to the starting point, the swiping direction, and the ending point of the first gesture input, the card is generated based on the icon. Preferably, the icon is determined based on the starting point of the first gesture input. Preferably, a default size of the card is preset. For example, in some embodiments, in card information provided by a common application app, a default size of a card is preset to be a rounded rectangle covering three rows and two columns of icons. Preferably, a pin point of the card is determined based on a position of the icon. For example, a pin point in the lower right corner of the card 9031 in FIG. 9b is determined based on a position of the icon 9021 of the Notes application. Preferably, a direction in which the card is generated is determined based on the swiping direction of the first gesture. For example, from FIG. 9a to FIG. 9b, a direction in which the card 9031 is generated is determined based on the swiping direction of the first gesture.

In response to the second gesture input, an icon is restored based on a card. Preferably, in response to the starting point of the second gesture input, the icon is restored based on the card. Preferably, in response to the starting point and the swiping direction of the second gesture input, the icon is restored based on the card. Preferably, the starting point of the second gesture input is located on the card. Preferably, the starting point of the second gesture input is located in a specific region on the card. Preferably, the starting point of the second gesture input is located in a specific region around the card.

It should be noted that in FIG. 9a. FIG. 9b, and subsequent figures, although a finger moving on a screen of an electronic device is shown, the finger is used merely as an illustrative example, and is not intended for a limitation. Various touch devices such as styluses also fall within the protection scope of the embodiments of this application. In addition, the first gesture input is not limited to a gesture input obtained by touching a touchscreen of an electronic device, but may further include a gesture input obtained through moving of a tap on the touchscreen of the electronic device.

Figure 10:
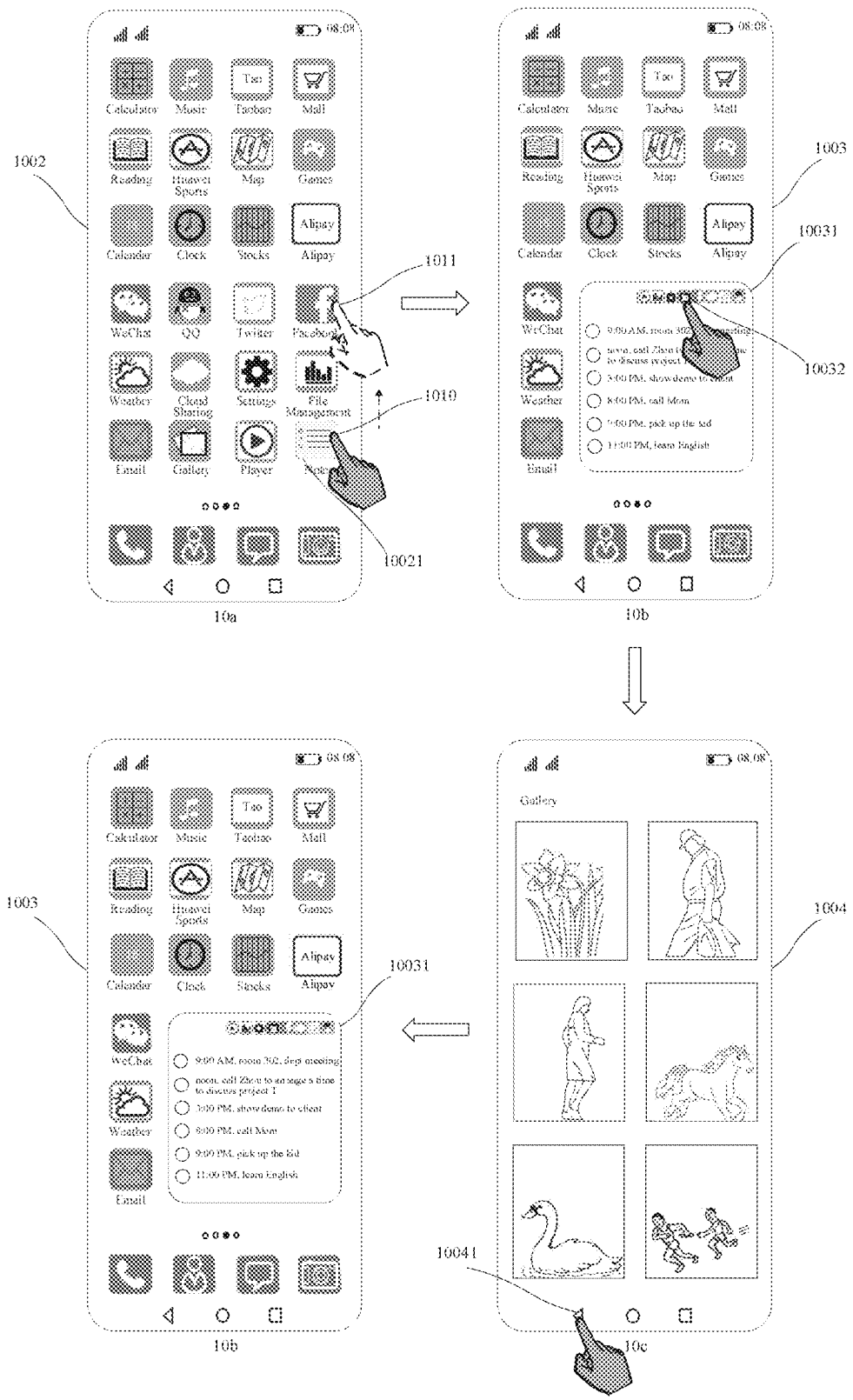
FIG. 10 is a schematic diagram of user interfaces of a card display method according to an embodiment of this application.

After the card is generated and displayed, each of the N controls displayed on the card is a control related to each of N icons, and the user may touch each of the N controls to launch a corresponding application. FIG. 10 is used as an example for further elaboration. In FIG. 10a, after a user swipes in a swiping direction shown in FIG. 10a with a touch point 1010 on an icon 10021 of a Notes application as a starting point, an interface 1002 shown in FIG. 10a changes to an interface 1003 shown in FIG. 10b. On the interface 1003, controls are displayed in an upper right corner of a card 10031. The controls are related to icons. A Gallery control in the controls is used as an example for description. After the user touches the Gallery control 10032 in the controls, a Gallery application corresponding to the Gallery control 10032 is launched, and correspondingly, the interface 1003 shown in FIG. 10*b* changes to an interface 1004 shown in FIG. 10*c*. On the interface 1004, the user may perform a normal operation on the Gallery application. After completing the operation, the user touches a button 10041, and the interface 1004 shown in FIG. 10*c* returns to the interface 1003 shown in FIG. 10*b*. Further, the user may alternatively touch an icon displayed in a region outside the card 10031 on the interface 1003 shown in FIG. 10*b*. For example, the user touches a WeChat icon on the interface 1003, to launch a WeChat application and access an interface that is displayed after the WeChat application is launched. After completing an operation on the interface that is displayed after the WeChat application is launched, the user touches the return button to still return to the interface 1003 shown in FIG. 10*b*. Alternatively, the user may first touch the WeChat icon on the interface 1003, to launch the WeChat application and access the interface that is displayed after the WeChat application is launched, and after completing an operation on the interface that is displayed after the WeChat application is launched, the user touches the return button to still return to the interface 1003 shown in FIG. 10*b*; and then, the user touches the Gallery control 10032 on the card 10031 on the interface 1003 to access the interface 1004 shown in FIG. 10*c*, and after completing an operation, the user touches the button 10041 to return to the interface 1003 shown in FIG. 10*b*.

Figure 11:
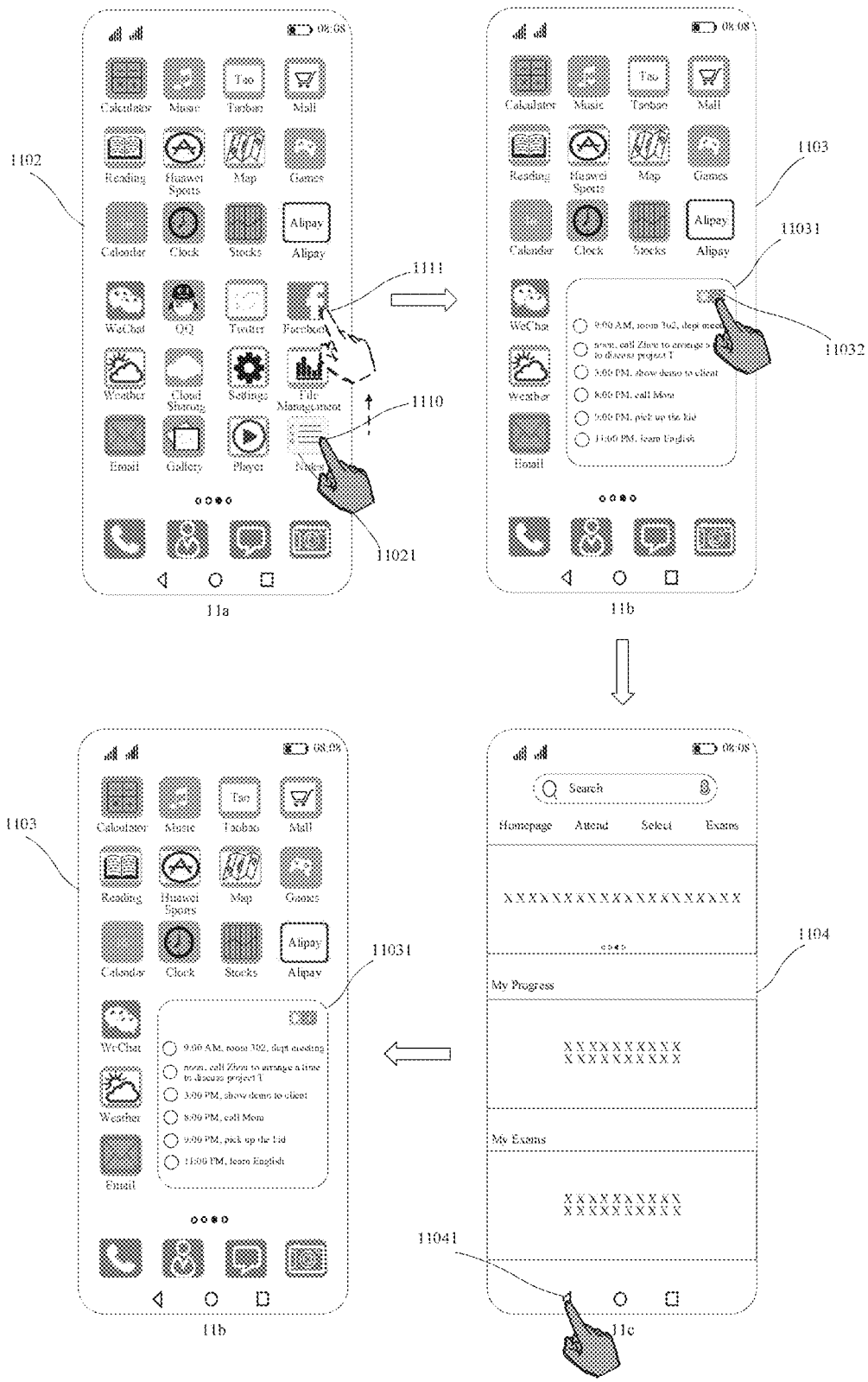
FIG. 11 is a schematic diagram of user interfaces of a card display method according to an embodiment of this application.

Alternatively, after the card is generated and displayed, the controls displayed on the card may be controls related to icons other than the icons covered by the card, and the user may touch each of the N controls to launch a corresponding application. FIG. 11 is used as an example for further expanded description. In FIG. 11*a*, after a user swipes in a swiping direction shown in FIG. 11*a* with a touch point 1110 on an icon 11021 of a Notes application as a starting point, an interface 1102 shown in FIG. 11*a* changes to an interface 1103 shown in FIG. 11*b*. On the interface 1103, controls are displayed in an upper right corner of a card 11031. The controls are related to icons other than the icons covered by the card. A Learning control in the controls is used as an example for description. After the user touches the Learning control 11032 in the controls, a Learning application corresponding to the Learning control 11032 is launched, and correspondingly; the interface 1103 shown in FIG. 11*b* changes to an interface 1104 shown in FIG. 11*c*. On the interface 1104, the user may perform a normal operation on the Learning application. After completing the operation, the user touches a button 11041, and the interface 1104 shown in FIG. 11*c* returns to the interface 1103 shown in FIG. 11*b*. Controls displayed in a second control region are in linkage with card content by operation or content. For example, the second control region displays controls which are controls that are displayed after icons of applications for sharing such as WeChat and QQ are reduced in size by another scale factor. Alternatively, the second control region displays controls that are associated with card content. For example, the card content includes "21.00, learn English", and the controls include a control that is displayed after an icon of the Learning application is reduced in size by another scale factor. The icon of the Learning application may not be displayed on a current screen of a home screen of an electronic device, but for example, displayed on another screen of the home screen of the electronic device. Further, the user may alternatively touch an icon displayed in a region outside the card 11031 on the interface 1103 shown in FIG. J ib. For example, the user touches a WeChat icon on the interface 1103, to launch the WeChat application and access an interface that is displayed after the WeChat application is launched. After completing an operation on the interface that is displayed after the WeChat application is launched, the user touches the return button to still return to the interface 1103 shown in FIG. 11*b*. Alternatively, the user may first touch the WeChat icon on the interface 1103, to launch the WeChat application and access the interface that is displayed after the WeChat application is launched, and after completing an operation on the interface that is displayed after the WeChat application is launched, the user touches the return button to still return to the interface 1103 shown in FIG. 11*b*; and then, the user touches the Gallery control 11032 on the card 11031 on the interface 1103 to access the interface 1104 shown in FIG. 11*c*, and after completing an operation, the user touches the button 11041 to return to the interface 1103 shown in FIG. 11*b*.

Figure 12:
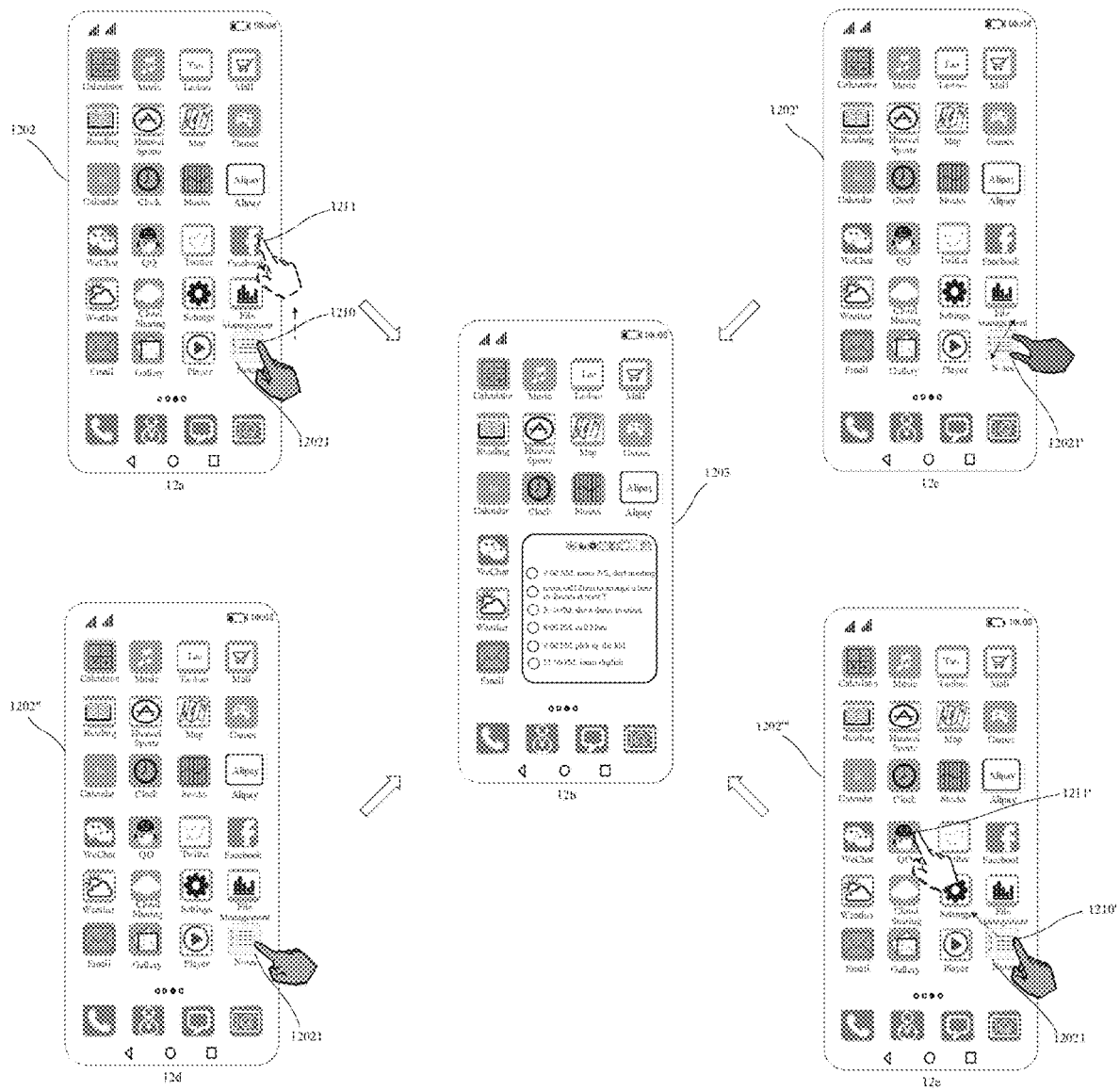
FIG. 12 is a schematic diagram of user interfaces of a card display method according to an embodiment of this application.

Alternatively, in addition to the gesture input manner shown in FIG. 9*a* with a touch point on an icon as a starting point and the direction shown in FIG. 9*a* as a swiping direction, there may be a plurality of manners for making the first gesture input. FIG. 12 shows four manners including the manner shown in FIG. 9. A manner shown in FIG. 12*a* is the same as the manner shown in FIG. 9, and details are not described herein again. FIG. 12*c* shows that after a user touches two points on an icon of a Notes application and swipes outward, a card shown in FIG. 12*b* is also generated based on the icon of the Notes application. FIG. 12*d* shows that after a user touches and holds an icon of a Notes application, a card shown in FIG. 12*b* is also generated based on the icon of the Notes application. FIG. 12*e* shows that after a user swipes in a direction shown in FIG. 12*e* with a touch point on an icon of a Notes application as a starting point, a card shown in FIG. 12*b* is also generated based on the icon of the Notes application. It can be learned from the foregoing that FIG. 12*a*, FIG. 12*d*, and FIG. 12*e* show that a card is generated based on an icon through single-point touching, whereas FIG. 12*c* shows that a card is generated based on an icon through two-point touching. In addition to the two-point touching manner shown in FIG. 12*c*, a card may be generated based on an icon in a multi-point touching manner such as three-point touching or four-point touching. Further details are not described herein. A person skilled in the art should understand that a specific implementation of the first gesture used to trigger icon-based card generation is not limited to the foregoing manners, but may alternatively be any other manners perceivable by a person skilled in the art. Details are not further described herein.

Figure 13:
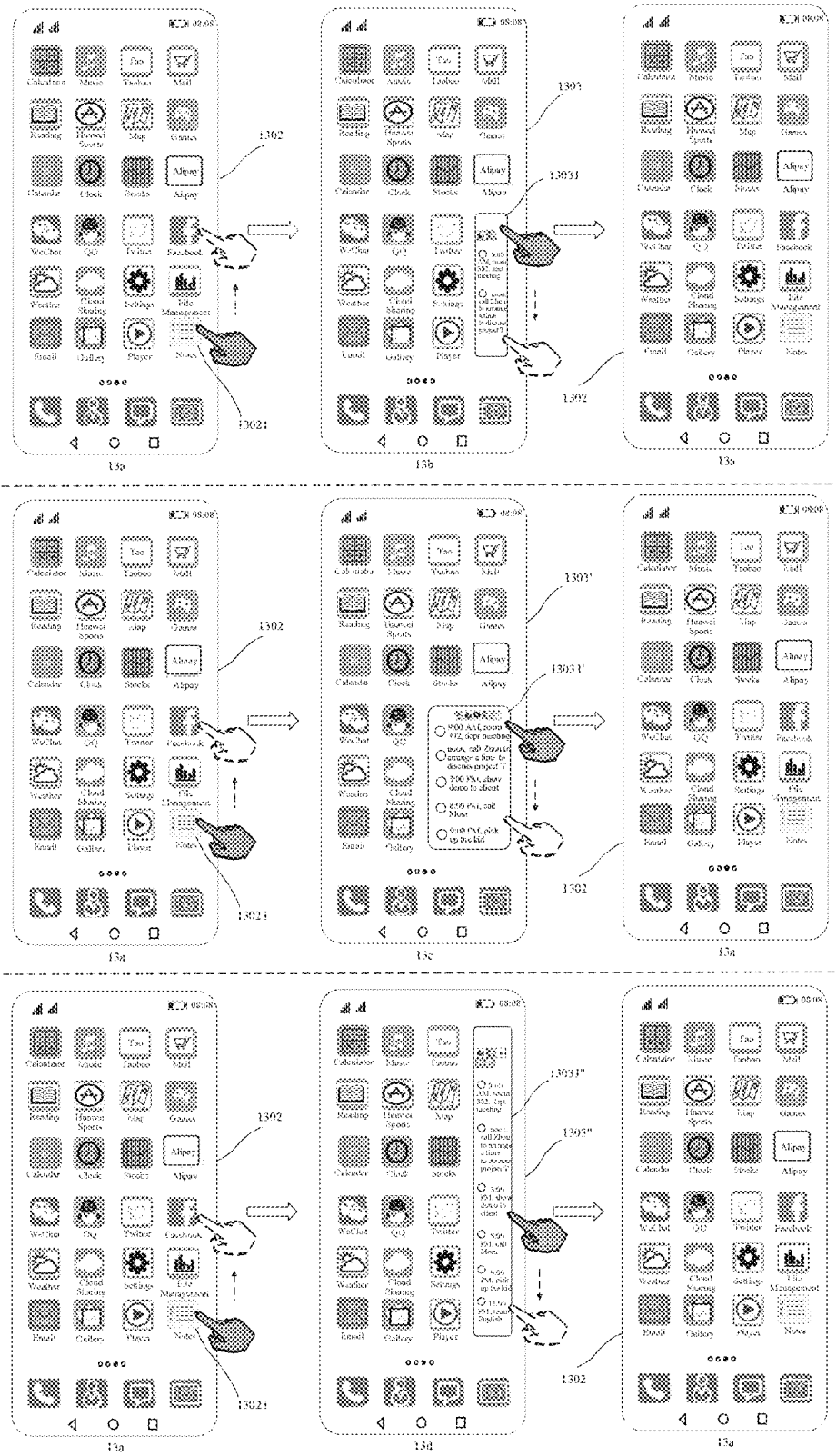
FIG. 13 is a schematic diagram of user interfaces of a card display method according to an embodiment of this application.

In different embodiments, under triggering of a first gesture input, cards generated based on an icon may cover a plurality of different ranges. An example is used in which the starting point of the first gesture input is on an icon of a Notes application, and the direction of the first gesture is upward. FIG. 13 shows three manners in which cards generated based on an icon cover different ranges. In some embodiments, as shown in FIG. 13*a* and FIG. 13*b*, after a user swipes a finger in a direction shown in FIG. 13*a* with a touch point on the icon of the Notes application as a starting point, a card 13031 shown in FIG. 13*b* is generated. Icons covered by the card 13031 are those of Notes, File Management, and Facebook. After the user swipes the finger in a direction shown in FIG. 13*b* with a touch point on the card 13031 as a starting point, the card 13031 is restored to the icons of the Notes, File Management, and Facebook applications shown in FIG. 13*a*, and an interface shown in FIG. 13*b* is restored to an interface shown in FIG. 13*a*.

In some embodiments, as shown in FIG. 13a and FIG. 13c, after a user swipes a finger in a direction shown in FIG. 13a with a touch point on the icon of the Notes application as a starting point, a card 13031' shown in FIG. 13c is generated. Icons covered by the card 13031' are those of Notes, Player, File Management, Settings, Facebook, and Twitter. After the user swipes the finger in a direction shown in FIG. 13c with a touch point on the card 13031' as a starting point, the card 13031' is restored to the icons of the Notes, Player, File Management, Settings. Facebook, and Twitter applications shown in FIG. 13a, and an interface shown in FIG. 13c is restored to an interface shown in FIG. 13a.

In some embodiments, as shown in FIG. 13a and FIG. 13d, after a user swipes a finger in a direction shown in FIG. 13a with a touch point on the icon of the Notes application as a starting point, a card 13031" shown in FIG. 13d is generated. Icons covered by the card 13031" are icons of Notes, File Management, Facebook, Alipay, Games, and Mall applications. After the user swipes the finger in a direction shown in FIG. 13d with a touch point on the card as a starting point, the card 13031" is restored to the icons of the Notes, File Management, Facebook, Alipay, Games, and Mall applications shown in FIG. 13a, and an interface shown in FIG. 13d is restored to an interface shown in FIG. 13a.

In the foregoing different embodiments, in response to starting points and directions of the same first gesture inputs, cards covering different ranges can be generated. The starting point and direction in FIG. 13a are merely an illustrative example. With other touch points as a starting point and swiping in other directions, cards covering different ranges can also be generated based on an icon. For example, after the user swipes horizontally to the left with the touch point on the icon of the Notes application as a starting point, a card covering icons of the Notes, Player, Gallery, and Email applications can be generated based on the icon of the Notes application, a card covering icons of the Notes, Player. and Gallery applications can also be generated based on the icon of the Notes application, and so on. Details are not further described herein. A correspondence between ranges covered by a card and the starting points and directions of the first gesture needs to be preset. After the setting is completed, the same first gestures can trigger generation of only cards covering a same range.

Figure 14:
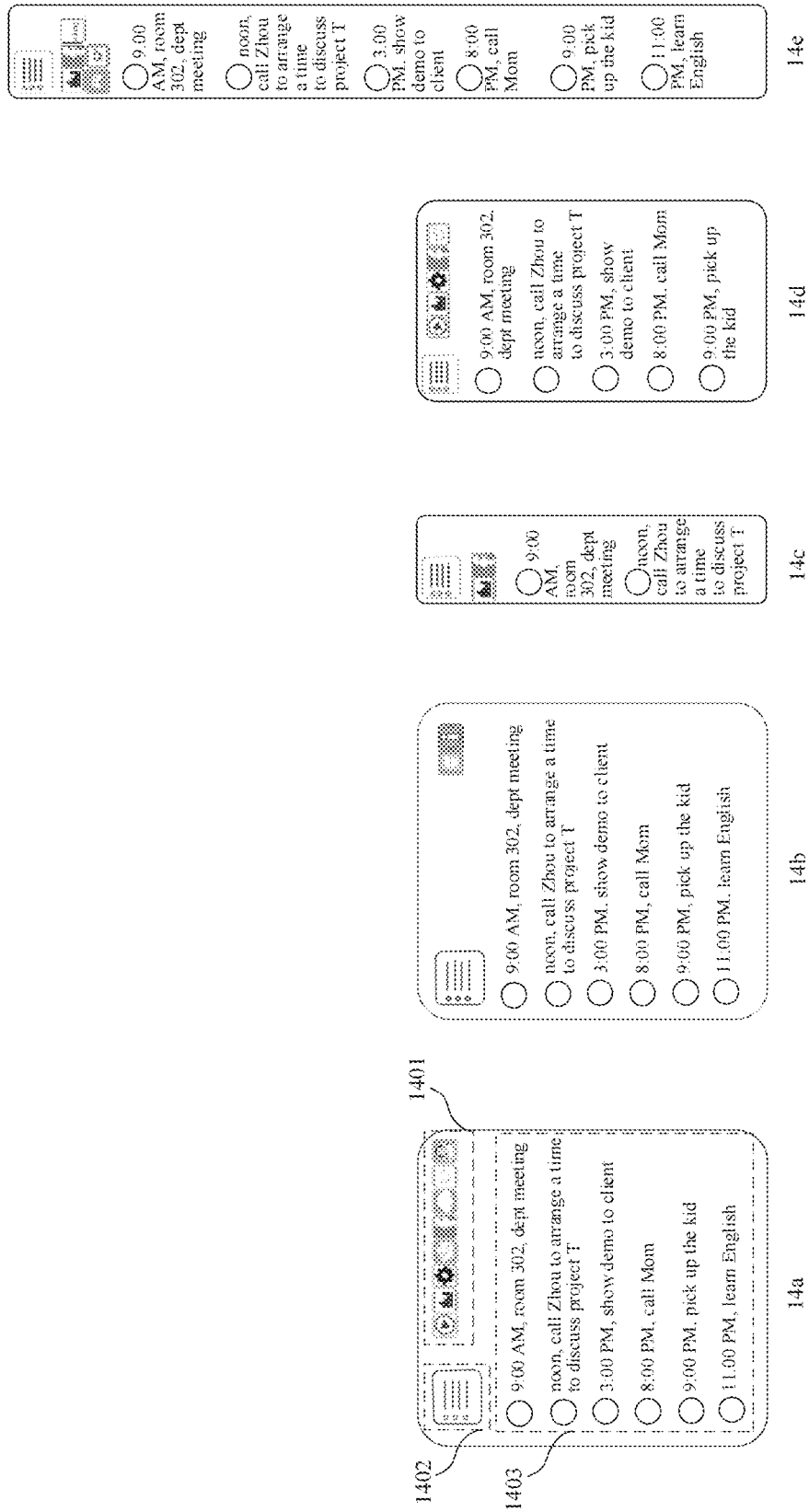
FIG. 14 is a schematic diagram of user interfaces of a card display method according to an embodiment of this application.

In addition to the cards including no first control that are shown in FIG. 9b, FIG. 10b, FIG. 11b, FIG. 12b, FIG. 13b, FIG. 13c, and FIG. 13d, a card may alternatively include a first control. Correspondingly, cards including a first control may be shown in FIG. 14a. FIG. 14b, FIG. 14c, FIG. 14d, and FIG. 14e. FIG. 14a is used as an example for further description. In FIG. 14a, a first control is displayed in a first control region 1402, controls are displayed in a second control region 1401, and card content is displayed in a card content region 1403.

Figure 15:
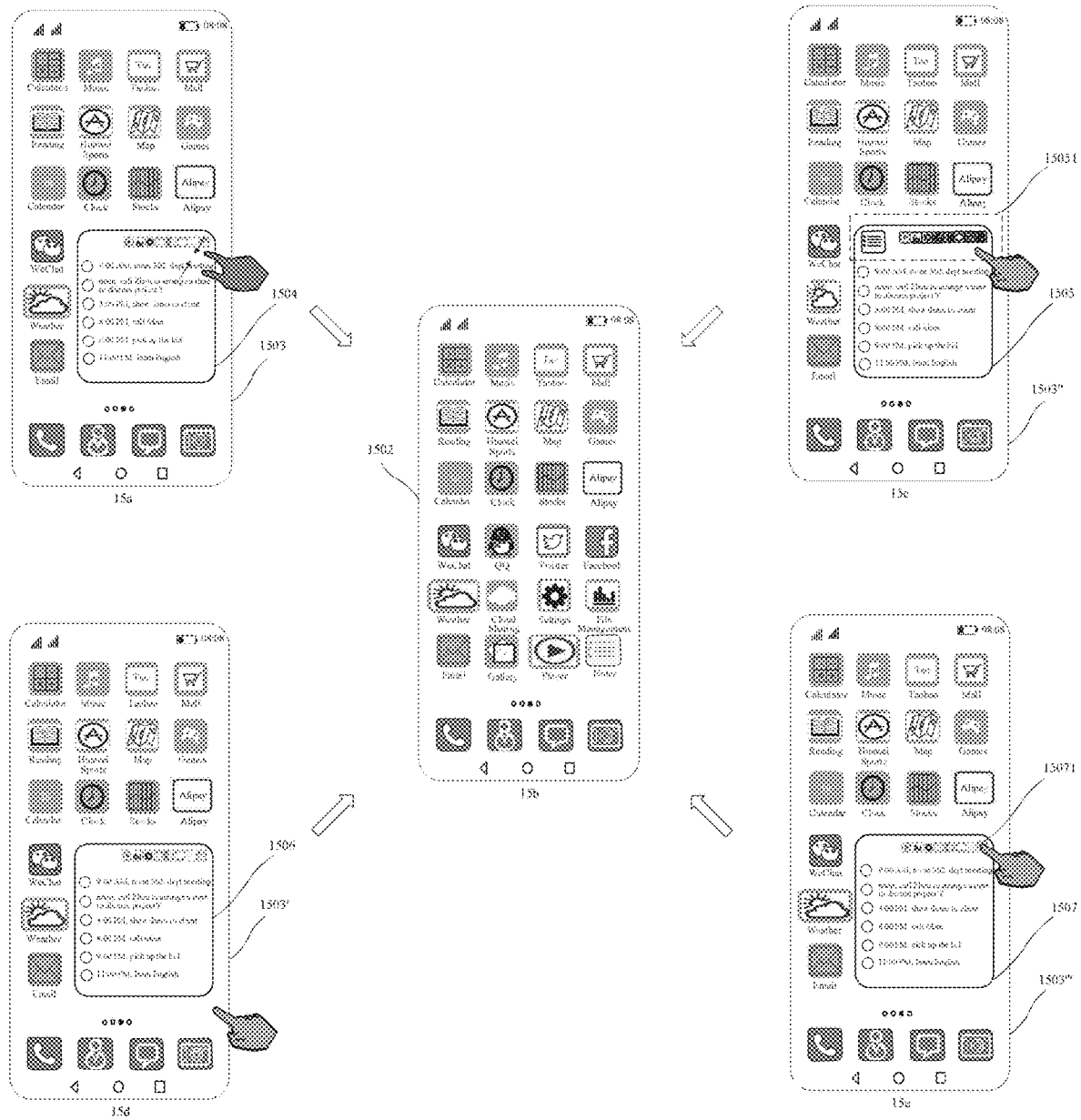
FIG. 15 is a schematic diagram of user interfaces of a card display method according to an embodiment of this application.

In addition to the gesture input manner shown in FIG. 9b with a touch point on a card as a starting point and the direction shown in FIG. 9b as a swiping direction, there may be a plurality of manners for making the second gesture input that is used to trigger card-based icon restoration. FIG. 15 shows four of the manners. FIG. 15a shows that after a user touches two points on a card 1504 and swipes inward, icons shown in FIG. 15b are also restored based on the card 1504. FIG. 15c shows that after a user selects a control region 15051 on a card 1505, icons shown in FIG. 15b are also restored based on the card 1505. FIG. 15d shows that after a user touches a region outside a card 1506 on an interface 1503', icons shown in FIG. 15b are also restored based on the card 1506. FIG. 15e shows that after a user touches any icon in a second control region on a card 1507, icons shown in FIG. 15b are also restored based on the card 1507. With icons restored based on the cards, an interface 1503, the interface 1503', an interface 1503", and an interface 1503'" become an interface 1502. In FIG. 15a, FIG. 15c, FIG. 15d, and FIG. 15e, the card 1504, the card 1505, the card 1506, and the card 1507 are all the same cards, and the interface 1503, the interface 1503', the interface 1503", and the interface 1503'" are all the same interfaces. Different reference numerals are used in different accompanying drawings only for clear description. In addition to the two-point touching manner shown in FIG. 15a, icons may be restored based on a card in a multi-point touching manner such as three-point touching or four-point touching. Further details are not described herein.

Figure 16:
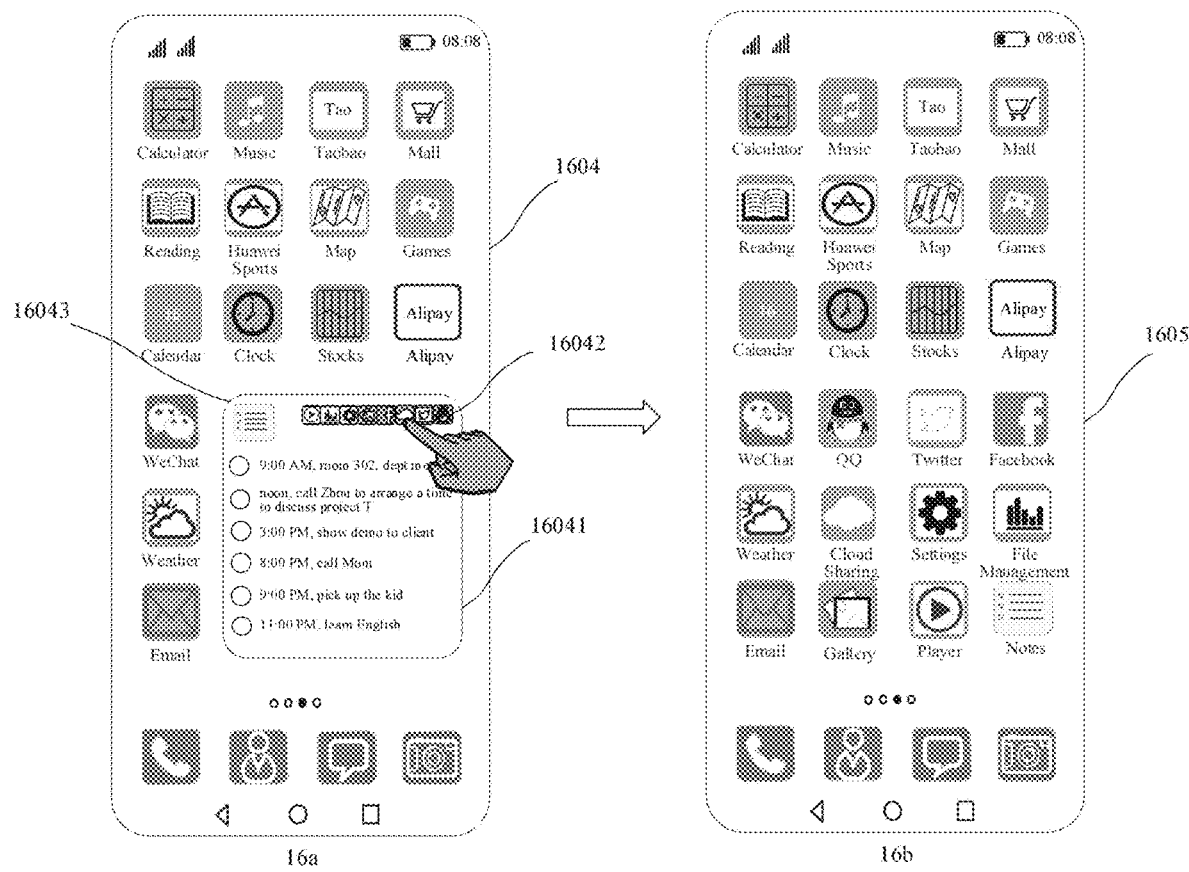
FIG. 16 is a schematic diagram of user interfaces of a card display method according to an embodiment of this application.

In addition, FIG. 16 shows another manner of the second gesture input that triggers card-based icon restoration. An interface 1604 shown in FIG. 16a includes a card 16041, and the card 16041 includes a second control region 16042. After a user selects the second control region 16042 by using a finger, the interface 1604 shown in FIG. 16a changes to an interface 1605 shown in FIG. 16b. In this case, the card 16041 is restored to icons.

A person skilled in the art should understand that the second gesture input for triggering card-based icon restoration is not limited to the foregoing manners, but may alternatively be any other manners perceivable by a person skilled in the art. Details are not further described herein.

Figure 17:
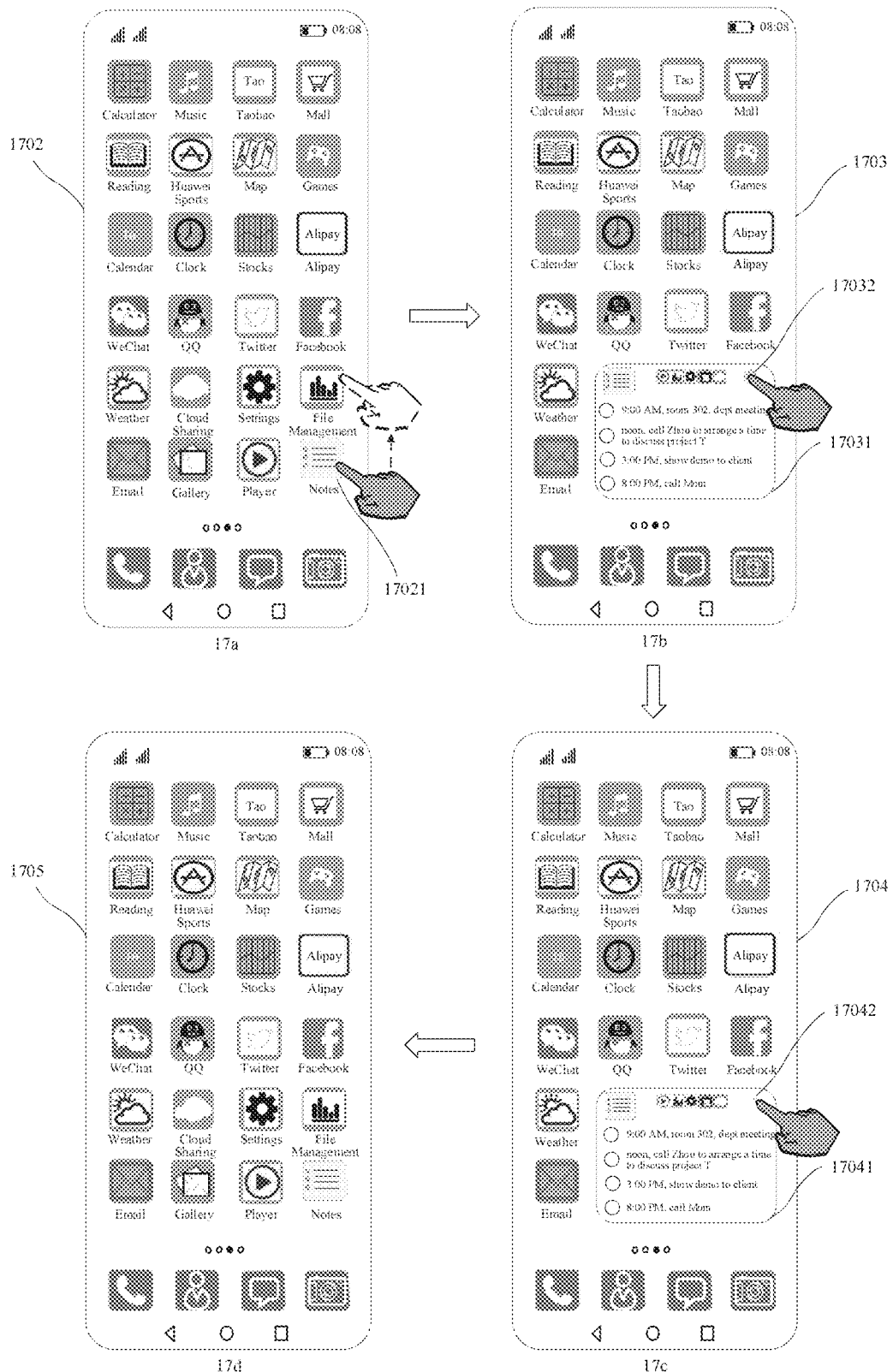
FIG. 17 is a schematic diagram of user interfaces of a card display method according to an embodiment of this application.

In addition to the foregoing manners, there are still other manners for generating a card based on an icon and restoring icons based on a card. FIG. 17 shows another manner for generating a card based on an icon and restoring icons based on a card. On an interface 1702 shown in FIG. 17a, a user swipes a finger upward in a direction shown in FIG. 17a with a touch point on an icon of a Notes application as a starting point. Then, the interface 1702 shown in FIG. 17a changes to an interface 1703 shown in FIG. 17b, and a card 17031 is generated on the interface 1703. At that time, the card 17031 floats on the interface 1703. After the user touches a pin button 17032 on the card 17031 by using a finger, the interface 1703 changes to an interface 1704, the card 17031 changes to a card 17041, and the pin button 17032 included on the card 17031 changes to a close button 17042 included on the card 17041. At that time, the card 17041 is pinned to the interface 1704. After the user touches the close button 17042 by using a finger, the interface 1704 returns to the interface 1702. In this case, after a card is generated, the card has two states: a floating state and a pinned state. When the card is in the floating state, on detection of a first operation, the card changes from the floating state to the pinned state. When the card is in the pinned state, on detection of a second operation, the card is restored to icons. Optionally, when the card is in the pinned state, on detection of a third operation, the card changes from the pinned state to the floating state. In addition, w % ben the card is in the floating state, the card may be dragged to another position. In this case, content of the card changes with an icon covered at the position.

Figure 18:
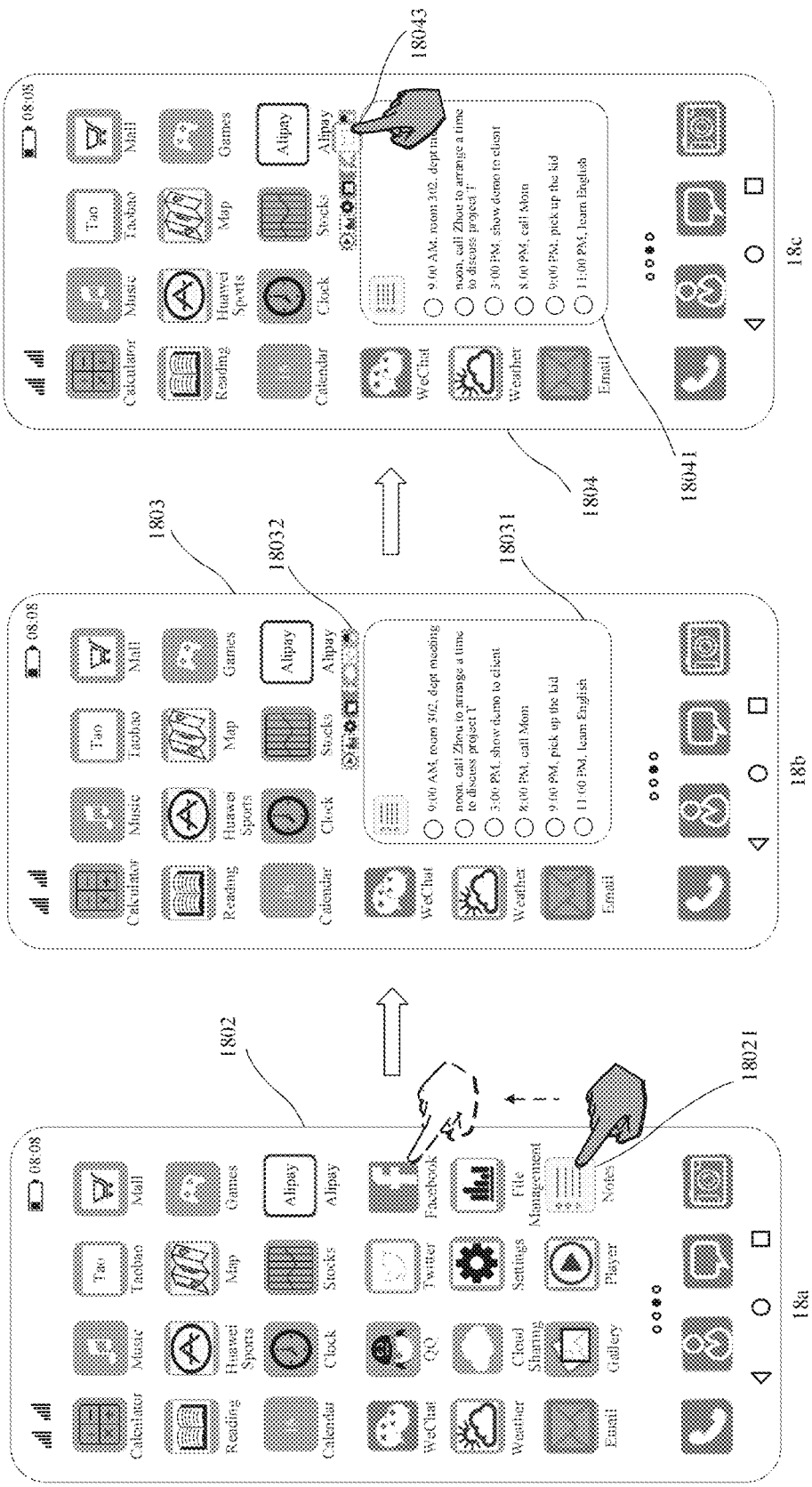
FIG. 18 is a schematic diagram of user interfaces of a card display method according to an embodiment of this application.

In the embodiments of this application, a plurality of manners are further provided for launching an application corresponding to each control in a second control region on a card. FIG. 18 to FIG. 22 show several of the manners. Launching a Twitter application is used as an example. As shown in FIG. 18, in FIG. 18a, after a user swipes upward in a direction shown in FIG. 18a with a touch point on an icon 18021 of a Notes application as a starting point, a card 18031 is generated. An interface displayed at that time is an interface 1803 shown in FIG. 18*b*. A second control region 18032 is located in an upper part of the card 18031. Launching the Twitter application on the interface 1803 is used as an example. After the user places a finger above a control of the Twitter application in the second control region 18032, the control 18043 of the Twitter application is enlarged. In this case, the interface 1803 shown in FIG. 18*b* changes to an interface 1804 shown in FIG. 18*c*, and correspondingly, the card 18031 changes to a card 18041. Then, after the user moves the finger away from the control 18043 of the Twitter application in a direction perpendicular to a current screen of a home screen, the Twitter application is launched.

Figure 19:
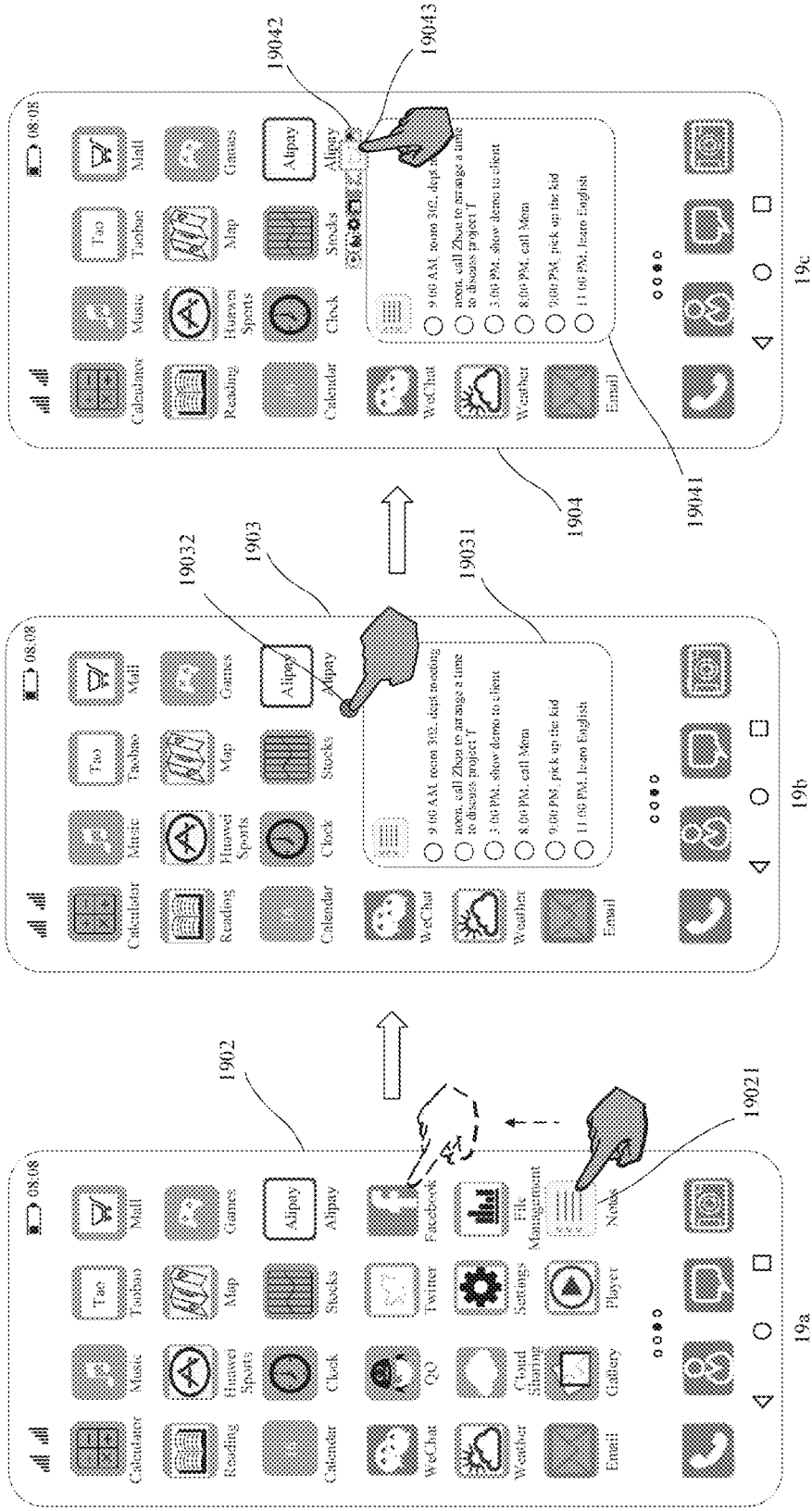
FIG. 19 is a schematic diagram of user interfaces of a card display method according to an embodiment of this application.

As shown in FIG. 19, in FIG. 19*a*, after a user swipes upward in a direction shown in FIG. 19*a* with a touch point on an icon 19021 of a Notes application as a starting point, a card 19031 is generated. An interface displayed at that time is an interface 1903 shown in FIG. 19*b*. A floating ball 19032 is located above the card 19031. Launching a Twitter application is used as an example. After the user touches the floating ball 19032 by using a finger or places a finger above the floating ball 19032, the floating ball 19032 unfolds to display a second control region 19042. Then, after the user places a finger above a control of the Twitter application in the second control region 19042, the control 19043 of the Twitter application is enlarged. Subsequently, after the user moves the finger away from the control 19043 of the Twitter application in a direction perpendicular to a current screen of a home screen, the Twitter application is launched.

Figure 20:
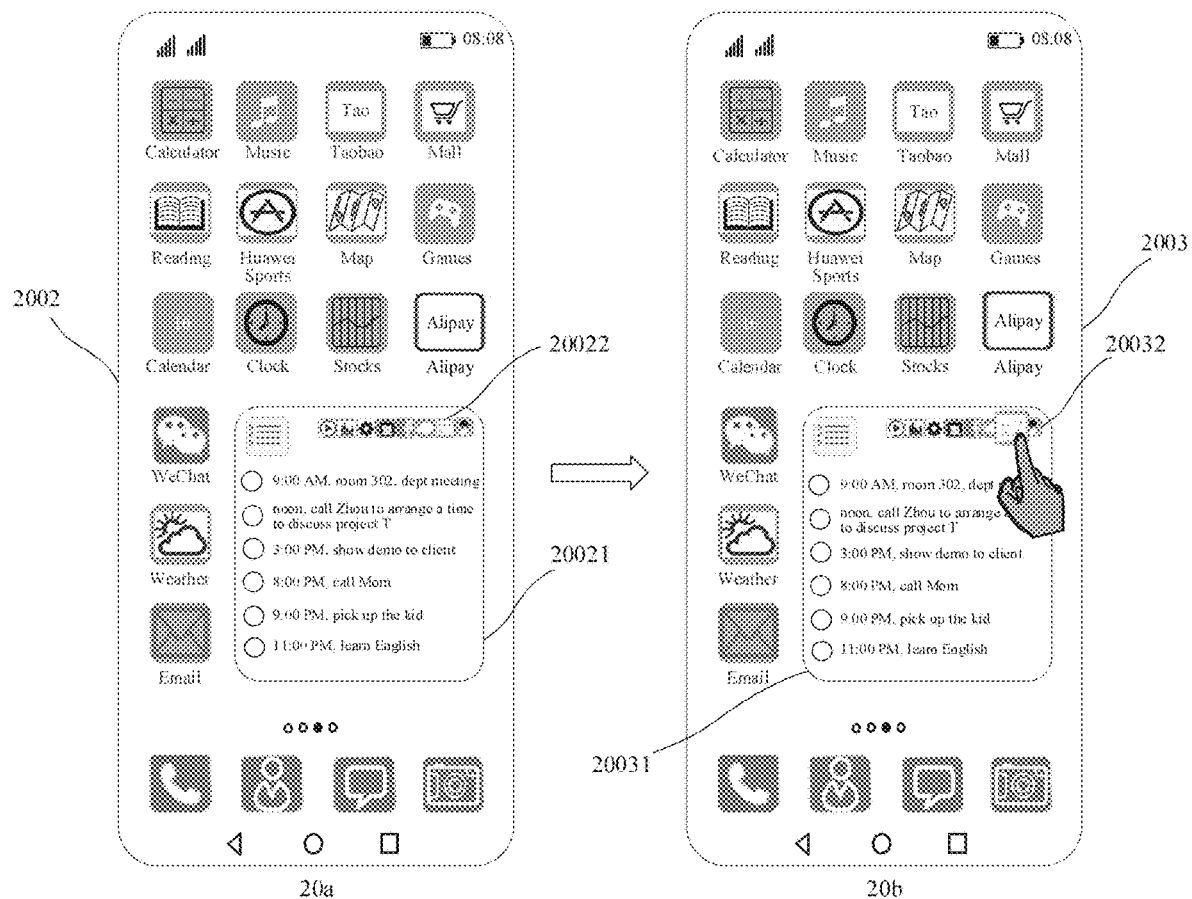
FIG. 20 is a schematic diagram of user interfaces of a card display method according to an embodiment of this application.

As shown in FIG. 20, after a user places a finger above a control 20022 of a Twitter application in a second control region in a direction perpendicular to a current screen of a home screen, the control of the Twitter application is enlarged. Then, after the user moves the finger away from the enlarged control of the Twitter application in the direction perpendicular to the current screen of the home screen, the Twitter application is launched.

Figure 21:
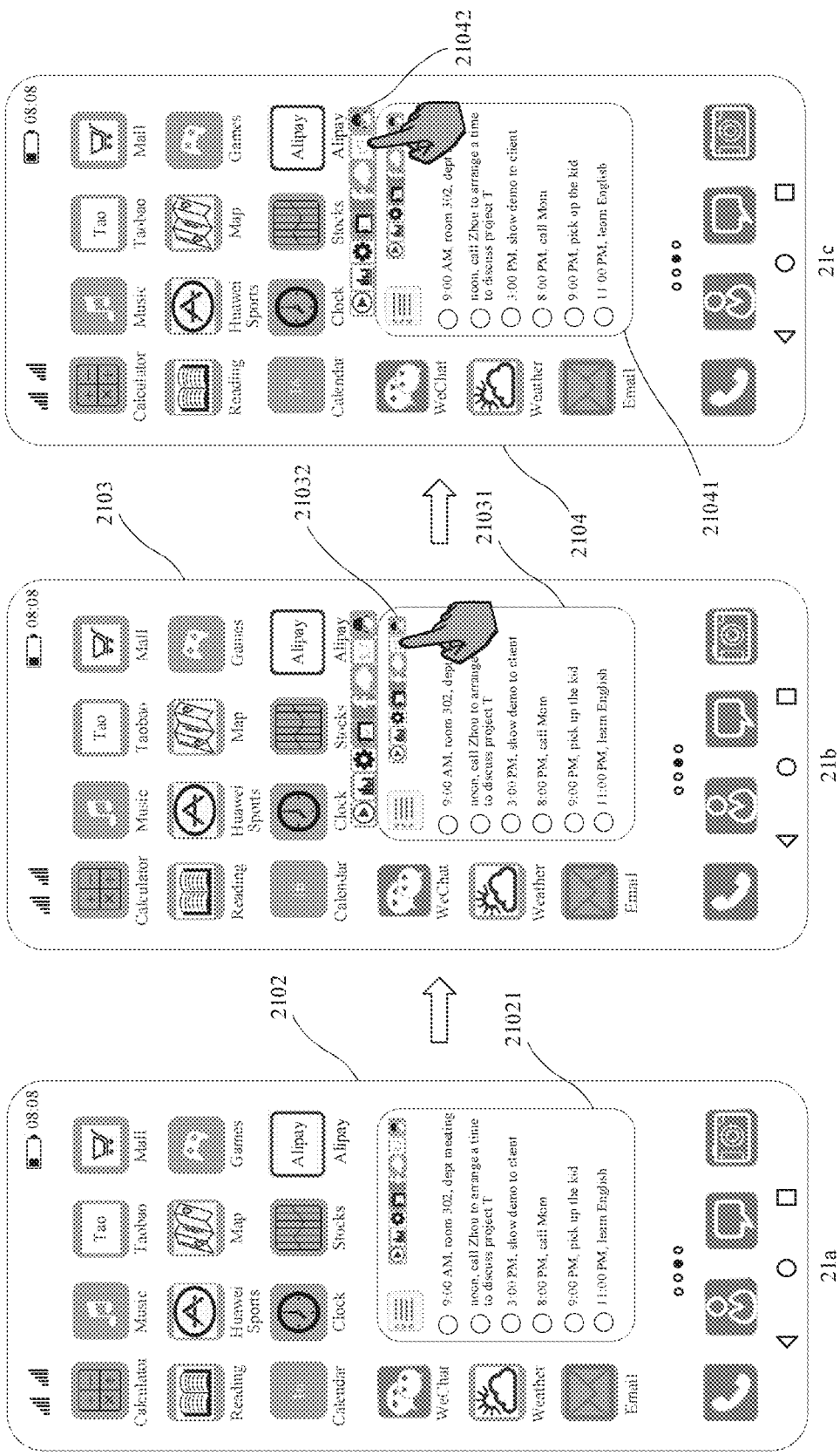
FIG. 21 is a schematic diagram of user interfaces of a card display method according to an embodiment of this application.

As shown in FIG. 21, in a direction perpendicular to a current screen of a home screen, if a user places a finger above any control in a second control region 21032, an enlarged second control region is displayed on top of the second control region 21032; and in the direction perpendicular to the current screen of the home screen, if the user does not place a finger above any control in the second control region 21032, no enlarged second control region is displayed on top of the second control region 21032. After the user touches, by using a finger, a control a Twitter application in the enlarged second control region 21042, the Twitter application is launched.

Figure 22:
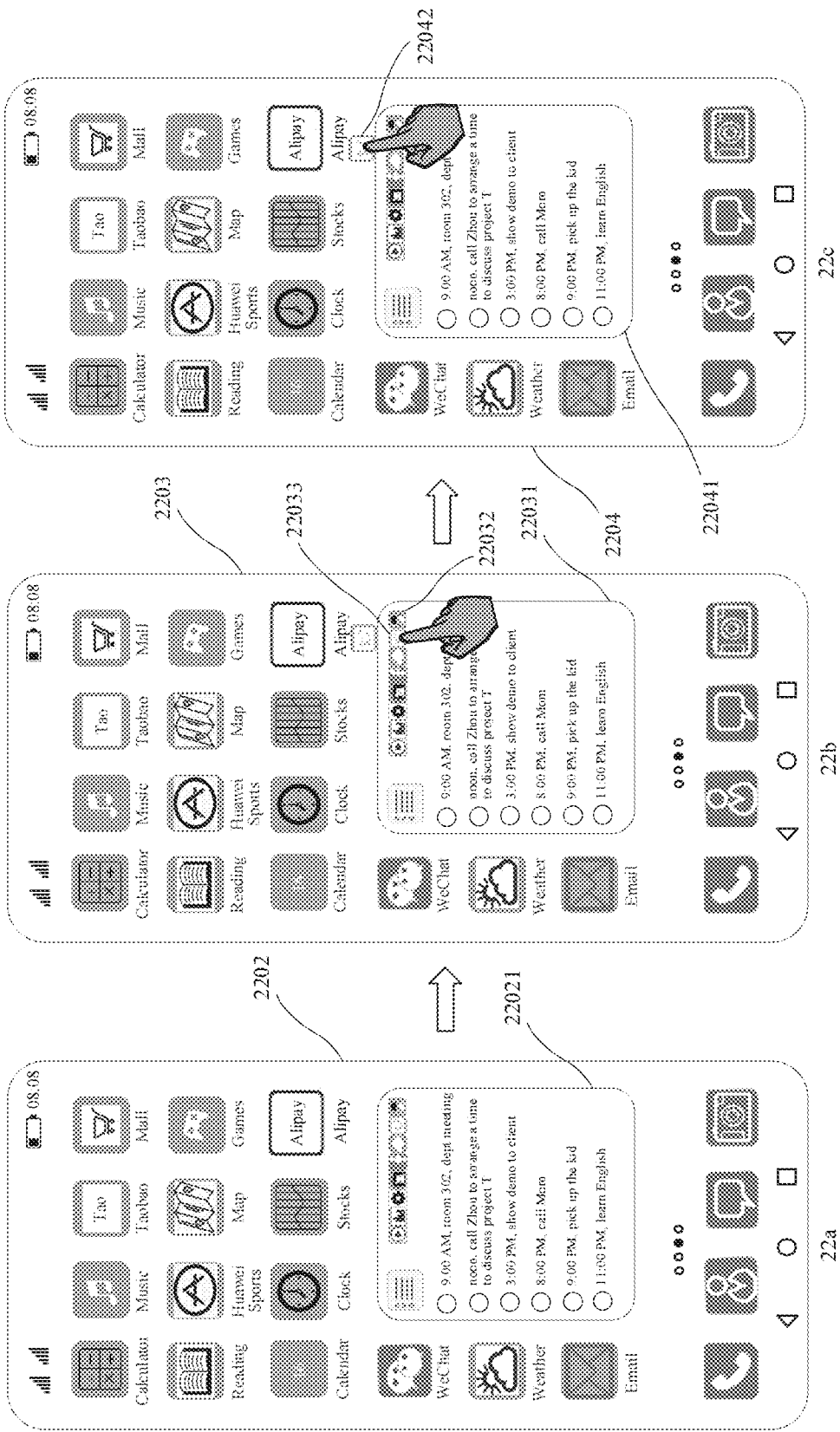
FIG. 22 is a schematic diagram of user interfaces of a card display method according to an embodiment of this application.

As shown in FIG. 22, in a direction perpendicular to a current screen of a home screen, if a user places a finger above a control of a Twitter application in a second control region 22032, an enlarged control of the Twitter application is displayed on top of the control of the Twitter application in the second control region 22032; and in the direction perpendicular to the current screen of the home screen, if the user does not place a finger above the control of the Twitter application in the second control region 22032, no enlarged control of the Twitter application is displayed on top of the control of the Twitter application in the second control region 21032. After the user touches the enlarged control of the Twitter application by using a finger, the Twitter application is launched.

In addition, alternatively, a user may directly touch, by using a finger, a control of a Twitter application included in a second control region on an interface. Then, the Twitter application is launched.

For manners of launching an application corresponding to each control in a second control region on a card, in addition to the foregoing manners, other manners perceivable by a person skilled in the art all fall within the protection scope of the embodiments of this application. Details are not further described herein.

To launch an application corresponding to a first control in a first control region on a card, a user may directly touch the first control in the first control region, or for example, may use a manner in which the user first places a finger above the first control in the first control region and then moves the finger away from the first control, in a direction perpendicular to a current screen of a home screen. Likewise, for manners of launching an application corresponding to a first control in a first control region on a card, in addition to the foregoing manners, other manners perceivable by a person skilled in the art all fall within the protection scope of the embodiments of this application. Details are not further described herein.

Figure 23:
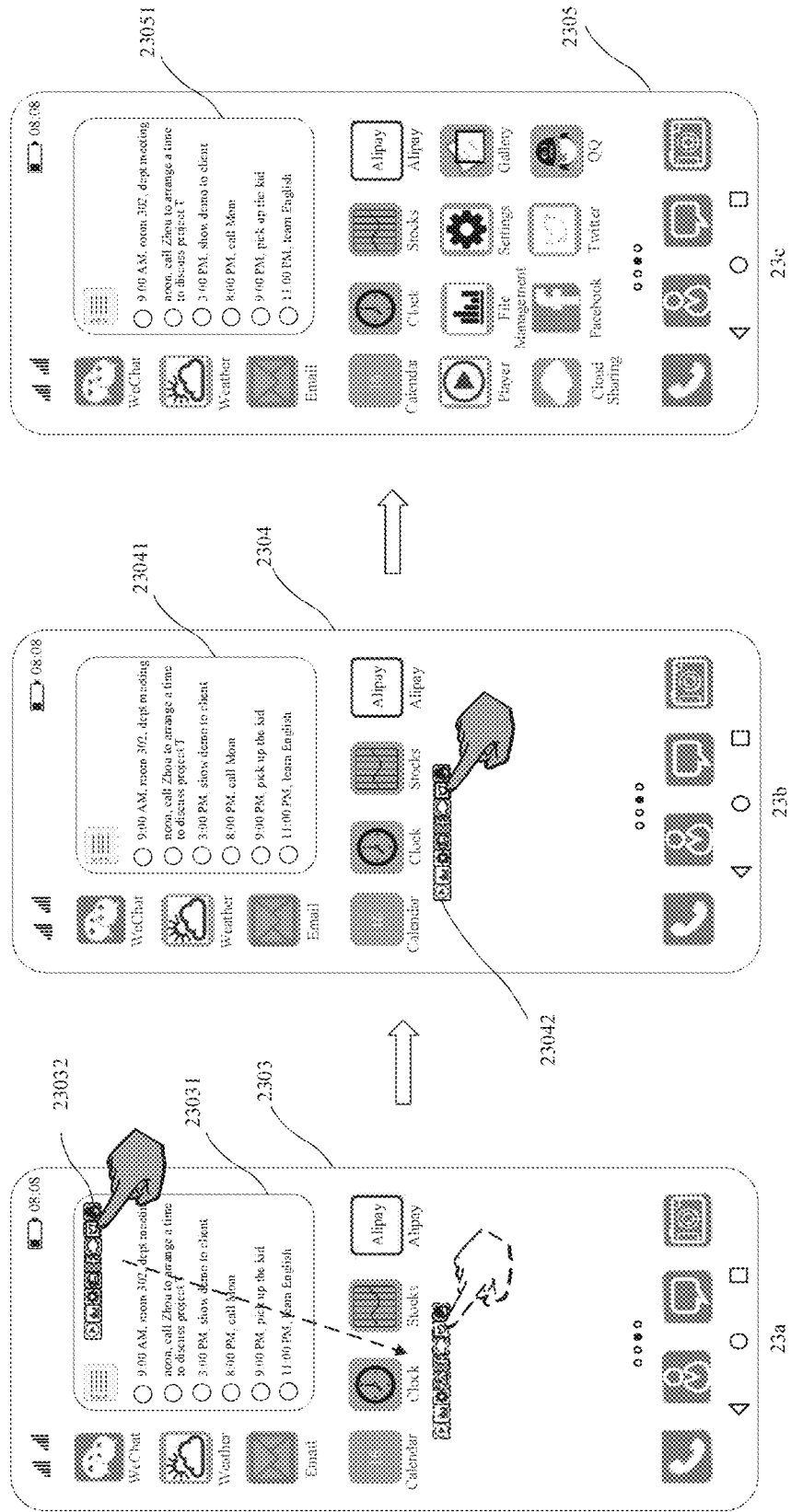
FIG. 23 is a schematic diagram of user interfaces of a card display method according to an embodiment of this application.

In some embodiments, controls in a second control region on a card can also be quickly restored to icons on a current screen of a home screen. As shown in FIG. 23*a*, there is extra space in a lower part of an interface 2303. A user selects a second control region 23032 on a card 23031, and drags the second control region 23032 toward the lower part of the interface 2303. After the user drags the second control region 23032 to a lower part of an interface 2304 shown in FIG. 23*b*, the second control region 23032 changes to a second control region 23042. Then, the user releases the selected second control region 23042. At that time, controls in the second control region 23042 are restored to an original icon size, and arranged in a lower part of an interface 2305 shown in FIG. 23*c* in the same manner as they are arranged on a home screen. In this way, the controls in the second control region on the card can be quickly restored to icons on the current screen, thereby providing convenience of operation for the user.

Figure 24:
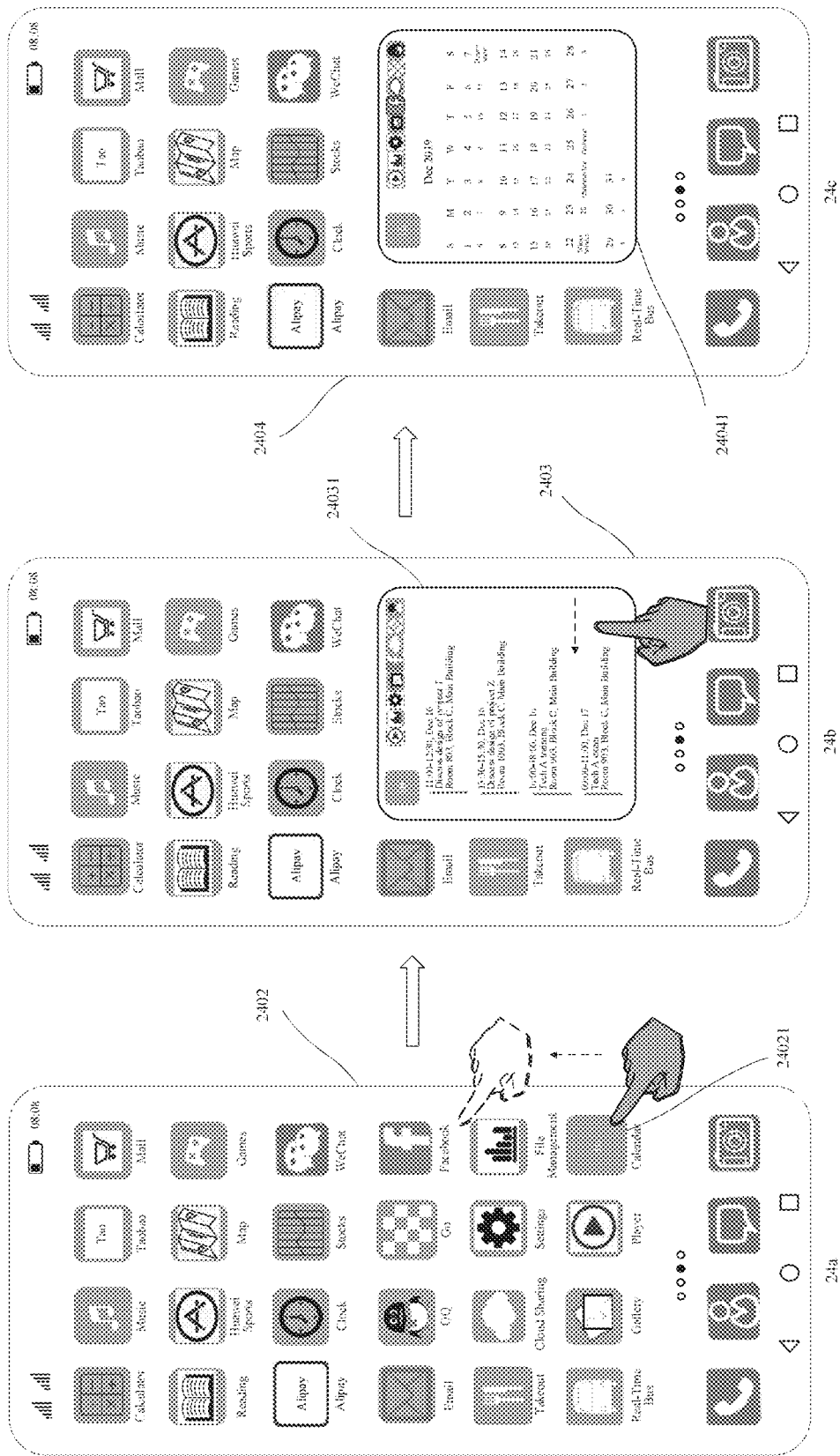
FIG. 24 is a schematic diagram of user interfaces of a card display method according to an embodiment of this application.

In addition, one icon may correspond to not only one card. One application icon may correspond to a plurality of cards. An example is used in which an icon of a Calendar application corresponds to two cards. As shown in FIG. 24, after a user swipes a finger upward in a direction shown in FIG. 24*a* with a touch point on an icon 24021 of a Calendar application on an interface 2402 as a starting point, a card 24031 is generated. An interface displayed at that time is an interface 2403 shown in FIG. 24*b*. Then, the user swipes a finger to the left on the card 24031 in a direction shown in FIG. 24*b*. At that time, the card 24031 changes to a card 24041, and an interface displayed is an interface 2404 shown in FIG. 24*c*. The card 24031 differs from the card 24041 in display style, displayed content, and display form. The user may also swipe a finger to the right on the card 24041, to switch from the card 24041 to the card 24031. In other words, one application icon may correspond to a plurality of cards, and after the cards are generated, switching between the plurality of cards can be implemented through operations. It should be noted that several cards corresponding to one application icon need to be set in advance.

Figure 25:
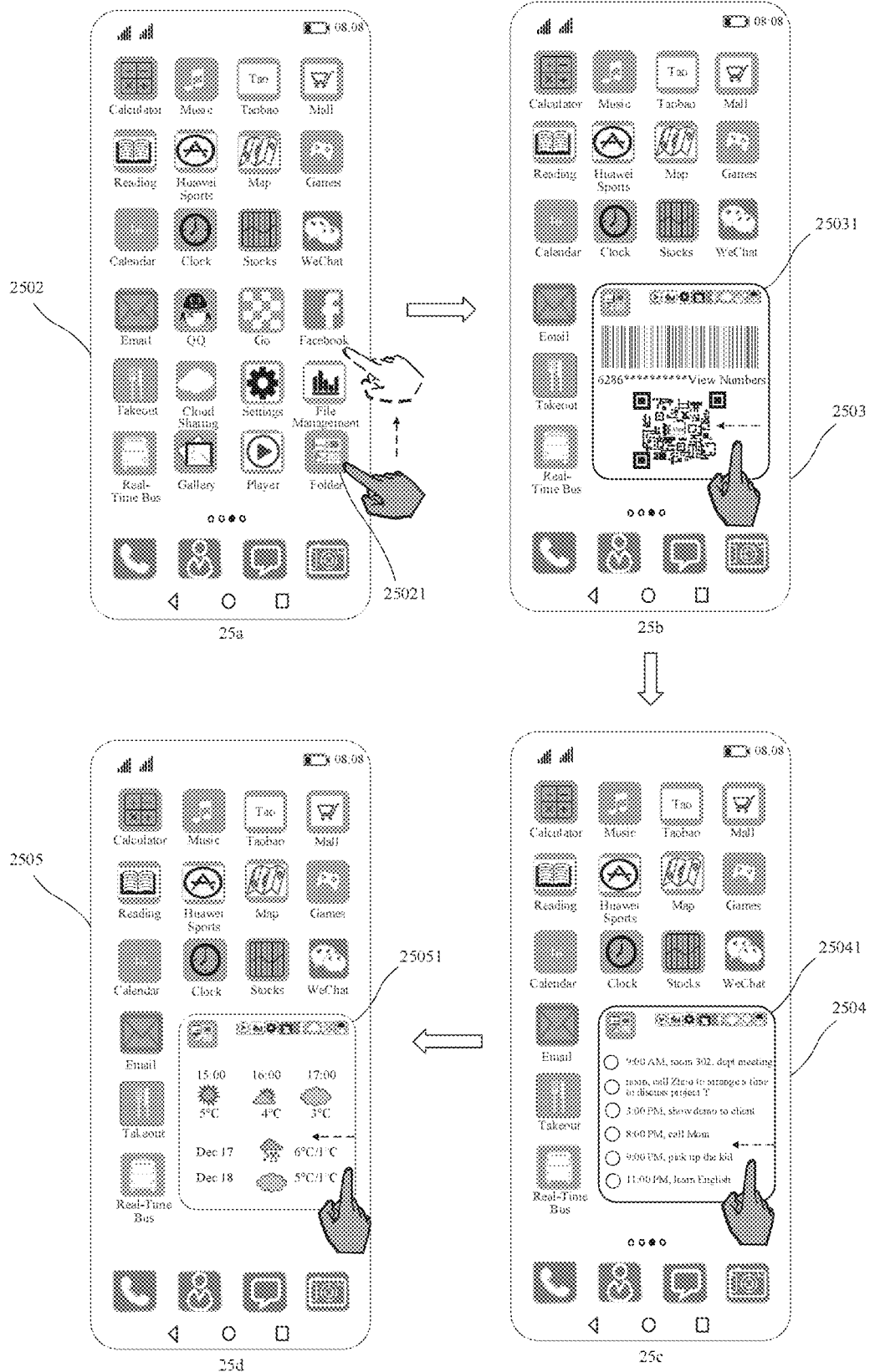
FIG. 25 is a schematic diagram of user interfaces of a card display method according to an embodiment of this application.

In addition, a card can also be generated based on a folder icon. The folder icon is an icon of a folder into which icons on a home screen are added and that is displayed in a form of an icon. As shown in FIG. 25, after a user swipes a finger upward in a direction shown in FIG. 25*a* with a touch point on a folder icon 25021 on an interface 2502 as a starting point, a card 25031 is generated. An interface displayed at that time is an interface 2503 shown in FIG. 25*b*. Then, the user swipes a finger to the left on the card 25031 in a direction shown in FIG. 25*b*. At that time, the card 25031 changes to a card 25041, and an interface displayed is an interface 2504 shown in FIG. 25*c*. Then, the user swipes a finger to the left on the card 25041 in a direction shown in FIG. 25*c*. At that time, the card 25041 changes to a card 25051, and an interface displayed is an interface 2505 shown in FIG. 25*d*. The user may also swipe a finger to the right on the card 25051, and at that time, the card 25051 changes to the card 25041. The user continues to swipe the finger to the right on the card 25041, and at that time, the card 25041 changes to the card 25031. The card 25031 corresponds to a card generated based on an icon of an Alipay application in the folder icon, the card 25041 corresponds to a card generated based on an icon of a Notes application in the folder icon, and the card 25051 corresponds to a card generated based on an icon of a Calendar application in the folder icon. In other words, one folder icon may correspond to a plurality of cards. After cards are generated, switching between a plurality of cards respectively corresponding to a plurality of icons included in the folder icon can be implemented through operations.

Figure 26:
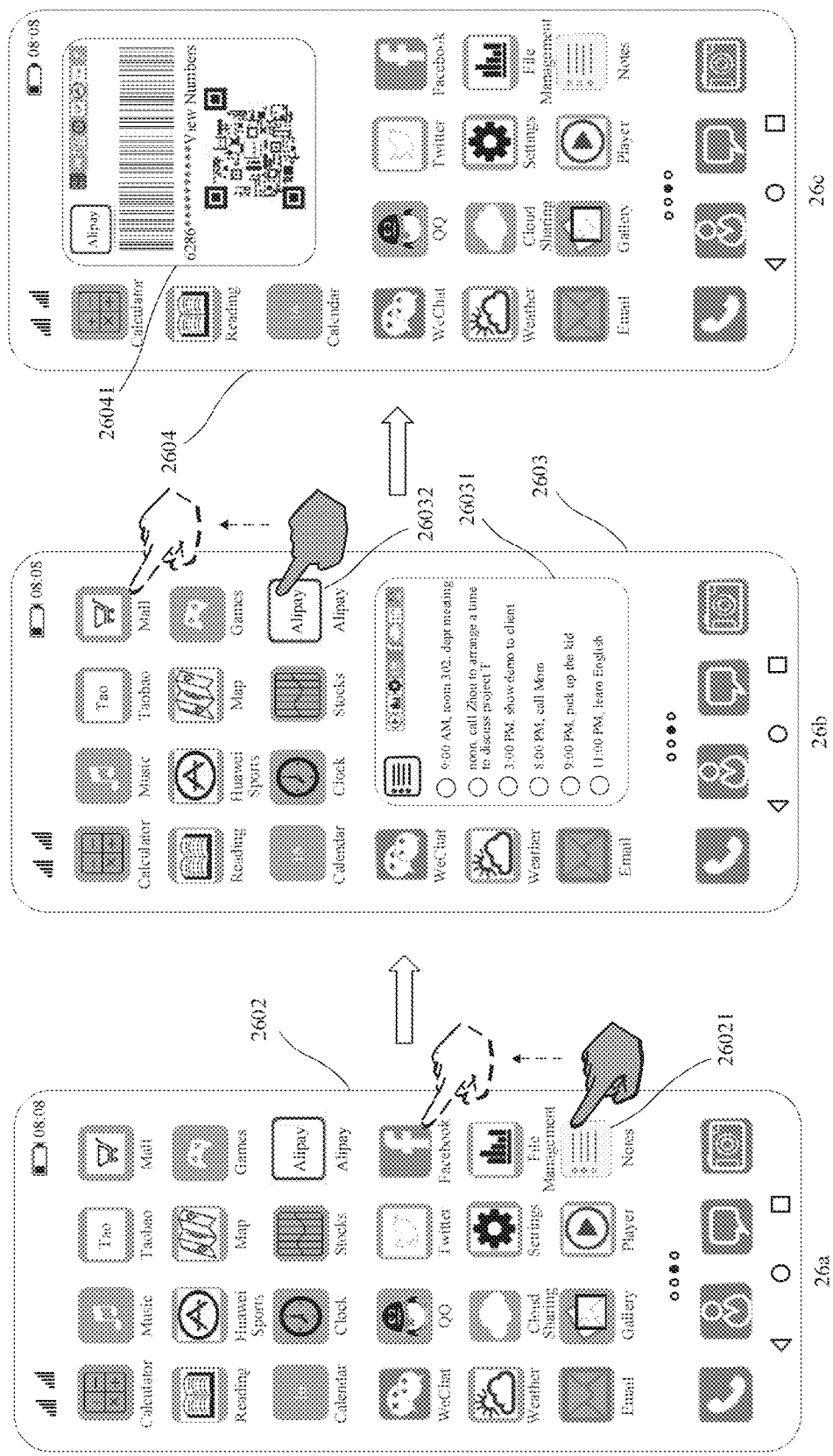
FIG. 26 is a schematic diagram of user interfaces of a card display method according to an embodiment of this application.

In some circumstances, at least one card needs to be displayed on a current screen of an electronic device. In this case, a problem of displaying a plurality of cards needs to be addressed. In the embodiments of this application, several implementations for displaying a plurality of cards on a current screen are provided. As shown in FIG. 26*a*, after a user swipes a finger upward in a direction shown in FIG. 26*a* with a touch point on an icon 26021 of a Notes application on an interface 2602 as a starting point, a card 26031 is generated. An interface displayed at that time is an interface 2603 shown in FIG. 26*b*. Then, after the user swipes the finger upward in a direction shown in FIG. 26*b* with a touch point on an icon 26032 of an Alipay application on the interface 2603 as a starting point, a card 26041 is generated. At that time, the card 26031 is restored to icons previously covered by the card 26031, and an interface displayed is an interface 2604 shown in FIG. 26*c*. In other words, in the implementation shown in FIG. 26, there can only be one card at most at a same moment.

Figure 27:
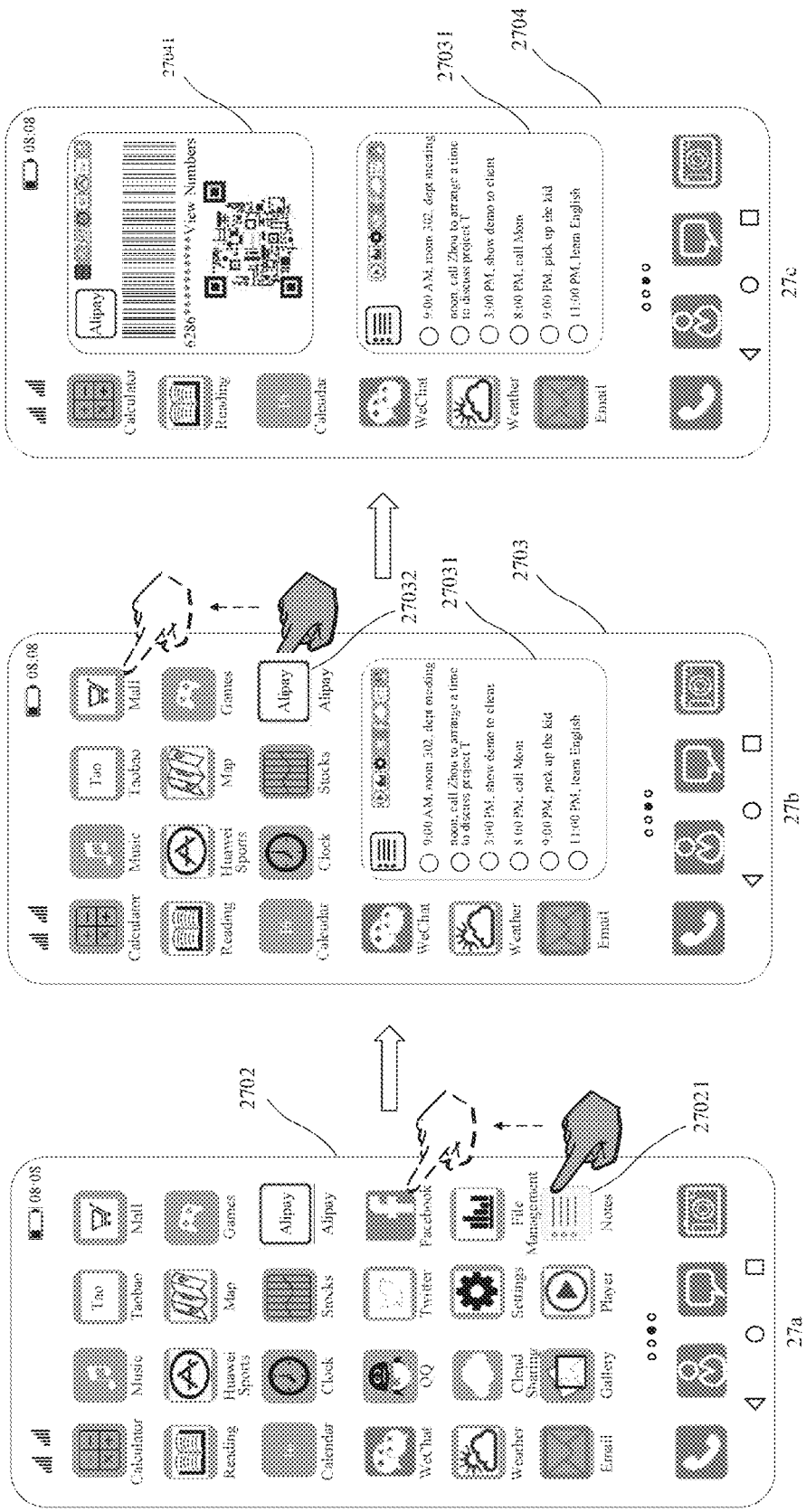
FIG. 27 is a schematic diagram of user interfaces of a card display method according to an embodiment of this application.

As shown in FIG. 27, after a user swipes a finger upward in a direction shown in FIG. 27*a* with a touch point on an icon 27021 of a Notes application on an interface 2702 as a starting point, a card 27031 is generated. An interface displayed at that time is an interface 2703 shown in FIG. 27*b*. Then, after the user swipes the finger upward in a direction shown in FIG. 27*b* with a touch point on an icon 27032 of an Alipay application on the interface 2703 as a starting point, a card 27041 is generated. At that time, the card 27031 remains unchanged, and an interface displayed is an interface 2704 shown in FIG. 27*c*. In other words, in the implementation shown in FIG. 27, there may be a plurality of cards at a same moment, only with no overlapping region between the plurality of cards. As an example, FIG. 27 illustrates a rule for coexistence of a plurality of cards in this embodiment. Although only two cards are shown in FIG. 27, the two cards are not used to limit the scope of the embodiments of this application. Three cards, four cards, five cards, and more cards all fall within the scope of the embodiments of this application. This also applies for subsequent examples of a plurality of cards. These examples do not impose limitations on a quantity of cards in the embodiments of this application but are merely illustrative.

Figure 28:
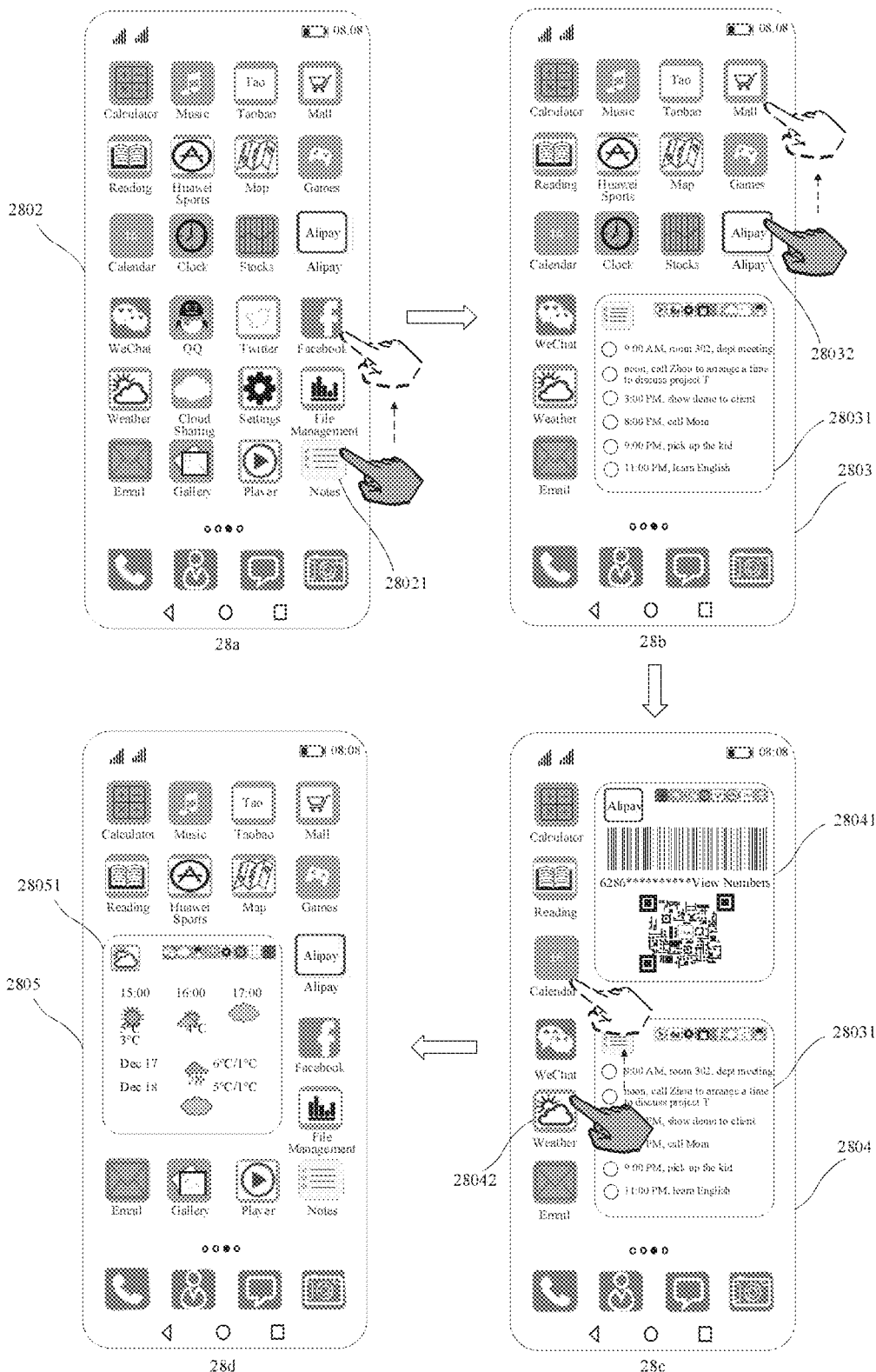
FIG. 28 is a schematic diagram of user interfaces of a card display method according to an embodiment of this application.

As shown in FIG. 28, after a user swipes a finger upward in a direction shown in FIG. 28*a* with a touch point on an icon 28021 of a Notes application on an interface 2802 as a starting point, a card 28031 is generated. An interface displayed at that time is an interface 2803 shown in FIG. 28*b*. Then, after the user swipes a finger upward in a direction shown in FIG. 28*b* with a touch point on an icon 28032 of an Alipay application on the interface 2803 as a starting point, a card 28041 is generated. At that time, the card 28031 remains unchanged, and an interface displayed is an interface 2804 shown in FIG. 28*c*. Then, after the user swipes a finger upward in a direction shown in FIG. 28*c* with a touch point on an icon 28042 of a Weather application on the interface 2804 as a starting point, a card 28051 is generated. At that time, the card 28031 and the card 28041 are restored to icons previously covered by the card 28031 and icons previously covered by the card 28041, respectively, and an interface displayed is an interface 2805 shown in FIG. 28*d*. In other words, in the implementation shown in FIG. 28, when there is no overlapping region between cards, a plurality of cards can coexist on a current screen; and when there is an overlapping region between cards, only a last generated card is displayed, and a card that overlaps the last generated card is restored to icons previously covered by the card.

In addition to the foregoing implementations for displaying a plurality of cards on a current screen, there are also many other implementations, and details are not further described herein. It should be emphasized that other manners perceivable by a person skilled in the art all fall within the protection scope of the embodiments of this application.

Figure 29:
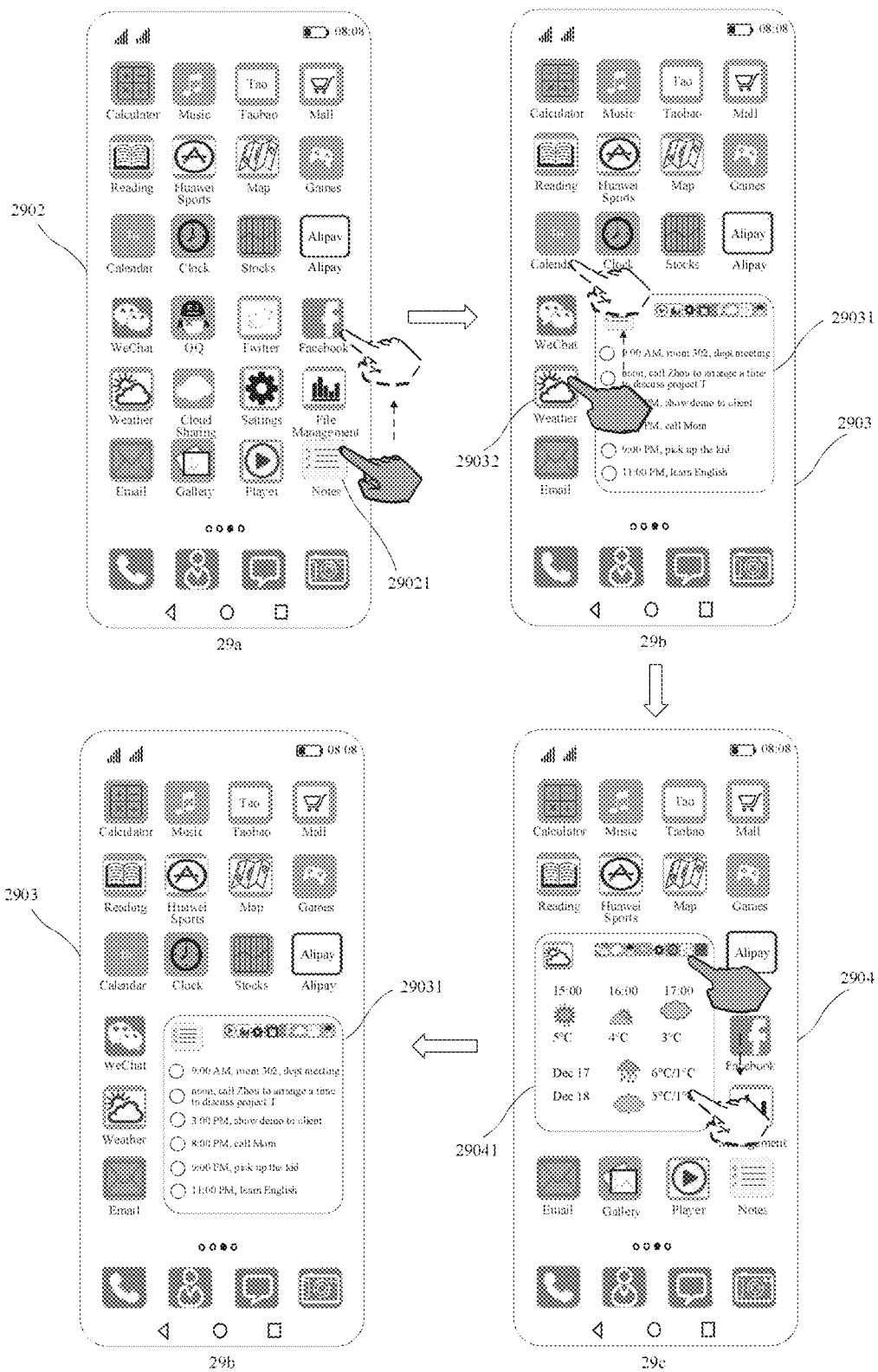
FIG. 29 is a schematic diagram of user interfaces of a card display method according to an embodiment of this application.

In addition, after the user stops display of the last generated card by performing an operation, for example, restoring the card to icons, how to display a penultimate generated card also needs to be defined. For this, several implementations are also provided in the embodiments of this application. As shown in FIG. 29, after a user swipes a finger upward in a direction shown in FIG. 29*a* with a touch point on an icon 29021 of a Notes application on an interface 2902 as a starting point, a card 29031 is generated. An interface displayed at that time is an interface 2903 shown in FIG. 29*b*. Then, after the user swipes a finger upward in a direction shown in FIG. 29*b* with a touch point on an icon 29032 of a Weather application on the interface 2903 as a starting point, a card 29041 is generated. At that time, the card 29031 disappears, and an interface displayed is an interface 2904 shown in FIG. 29*c*. Then, after the user swipes a finger downward in a direction shown in FIG. 29*c* with a touch point on the card 29041 as a starting point, the card 29041 disappears, and the previously generated card 29031 is displayed again. At that time, the interface is restored to the interface 2903. In other words, in the implementation shown in FIG. 29, after a last generated card is no longer displayed, a penultimate generated card is displayed on a current screen.

Figure 30:
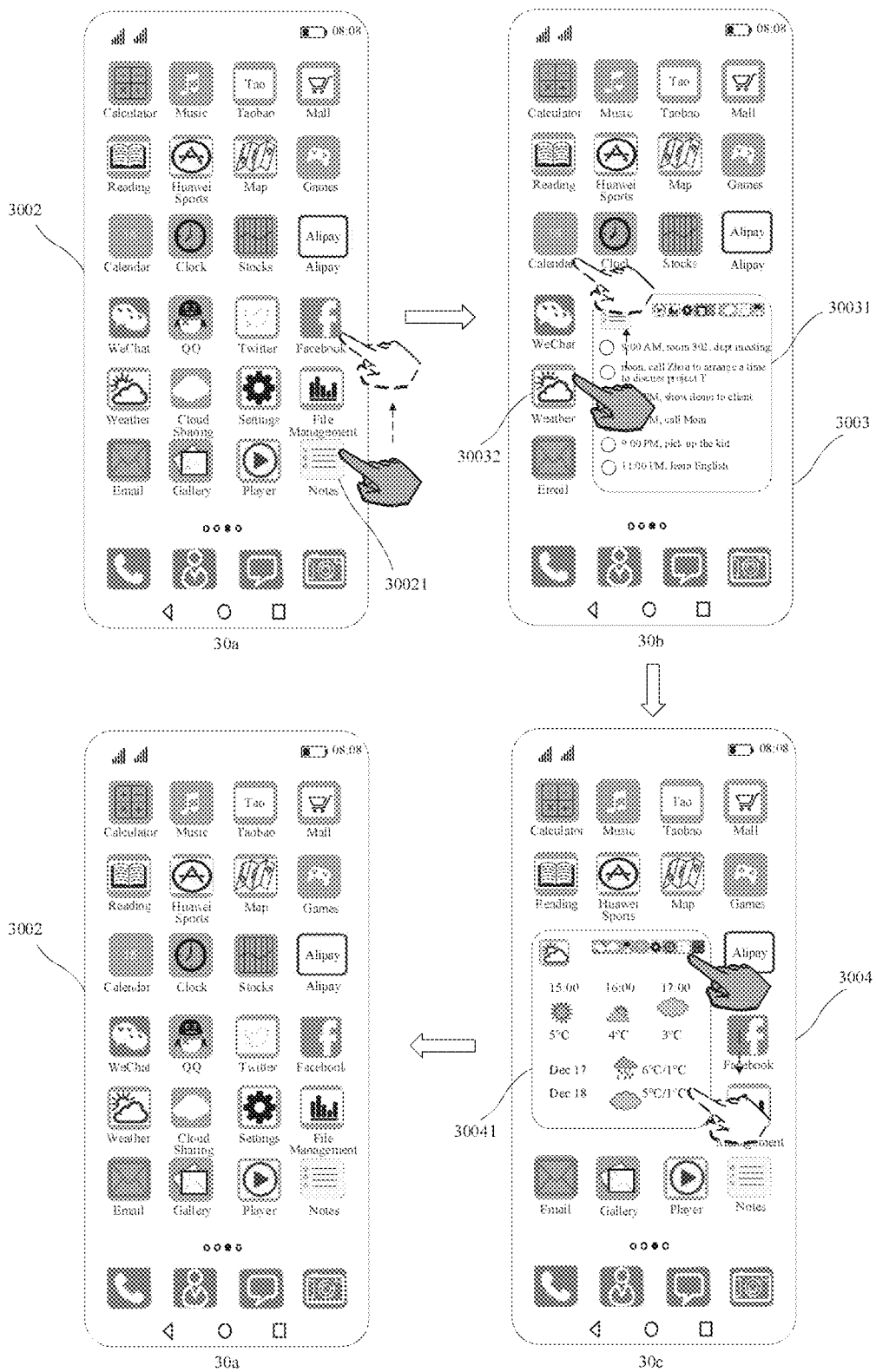
FIG. 30 is a schematic diagram of user interfaces of a card display method according to an embodiment of this application.

As shown in FIG. 30, after a user swipes a finger upward in a direction shown in FIG. 30*a* with a touch point on an icon 30021 of a Notes application on an interface 3002 as a starting point, a card 30031 is generated. An interface displayed at that time is an interface 3003 shown in FIG. 30*b*. Then, after the user swipes a finger upward in a direction shown in FIG. 30*b* with a touch point on an icon 30032 of a Weather application on the interface 3003 as a starting point, a card 30041 is generated. At that time, the card 30031 disappears, and an interface displayed is an interface 3004 shown in FIG. 30c. Then, after the user swipes a finger downward in a direction shown in FIG. 30c with a touch point on the card 30041 as a starting point, the card 30041 is restored to icons covered by the card 30041, and the previously generated card 30031 is not displayed either. At that time, the interface is restored to the interface 3002. In other words, in the implementation shown in FIG. 30, after a last generated card is no longer displayed, a penultimate generated card is not displayed on a current screen either.

For how to display a penultimate generated card after a last generated card is no longer displayed, in addition to the foregoing implementations, other manners perceivable by a person skilled in the art all fall within the protection scope of the embodiments of this application. Details are not further described herein.

Figure 31:
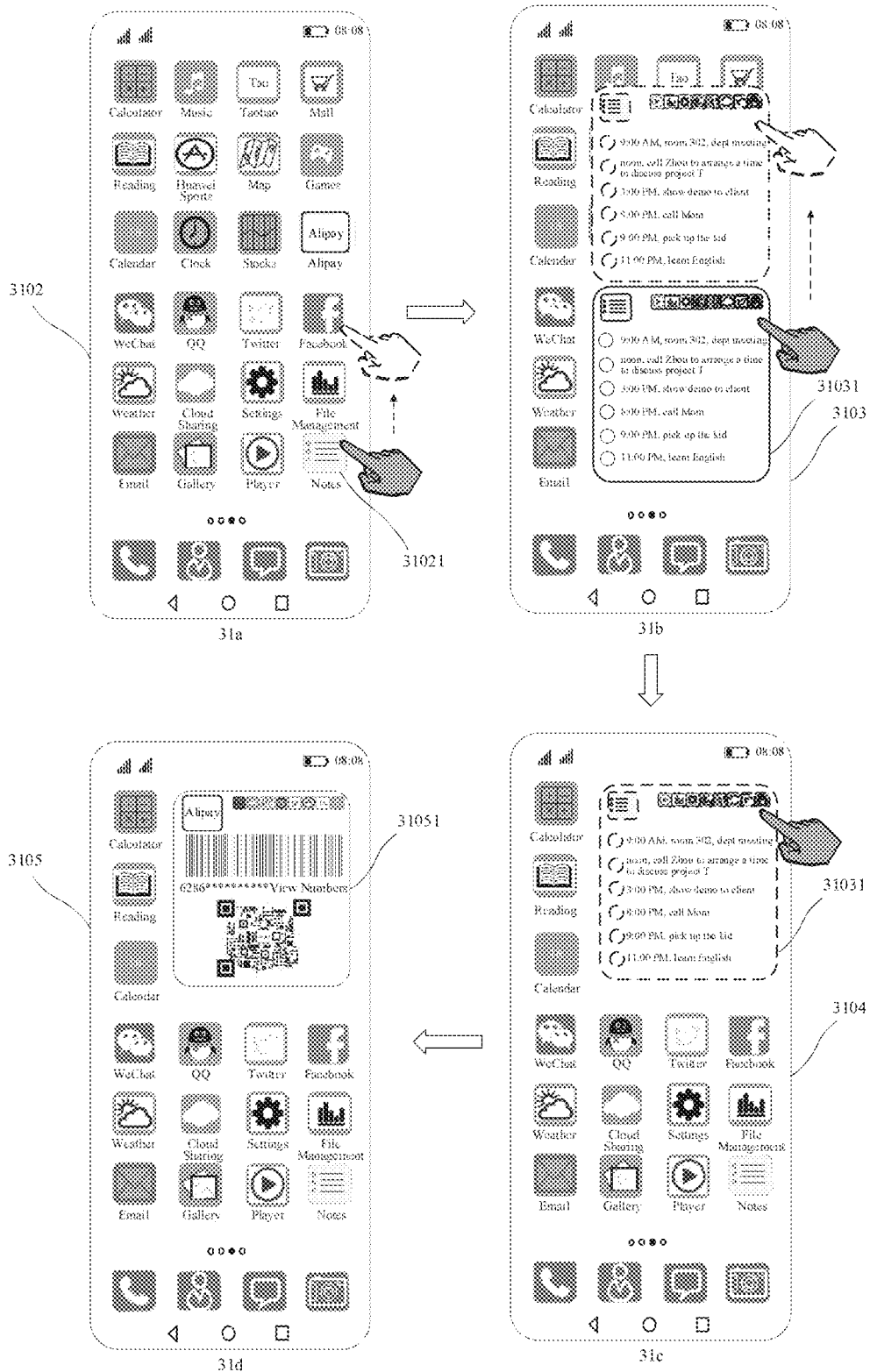
FIG. 31 is a schematic diagram of user interfaces of a card display method according to an embodiment of this application.

In addition, after a card is generated based on an icon, the card can also be dragged. FIG. 31 shows how a card changes after the card is dragged to different positions. As shown in FIG. 31, after a user swipes a finger upward in a direction shown in FIG. 31a with a touch point on an icon 31021 of a Notes application on an interface 3102 as a starting point, a card 31031 is generated. An interface displayed at that time is an interface 3103 shown in FIG. 31b. Then, the user selects the card 31031 and drags the card 31031 upward by using a finger. When the card 31031 is dragged to a position shown in FIG. 31c, an interface displayed at that time is an interface 3104 shown in FIG. 31c. After the user releases the card 31031, the card 31031 changes to a card 31051, and an interface displayed at that time is an interface 3105 shown in FIG. 31d. It can be learned that content of the card 31051 changes. The content of the card 31051 displayed at that time is denoted as card content 1. In addition, after the user swipes in an upward direction with a touch point on an icon of an Alipay application on the interface 3102 as a starting point, a card is generated. Icons covered by the card are icons of Alipay, Stocks, Games, Map. Clock, Mall, Huawei Sports, Taobao, and Music applications. The content of the card displayed at that time is denoted as card content 2. The card content 1 is the same as the card content 2. In other words, in the implementation shown in FIG. 31, after a card generated based on an icon is dragged to another position and released, content of the card may change.

Figure 32:
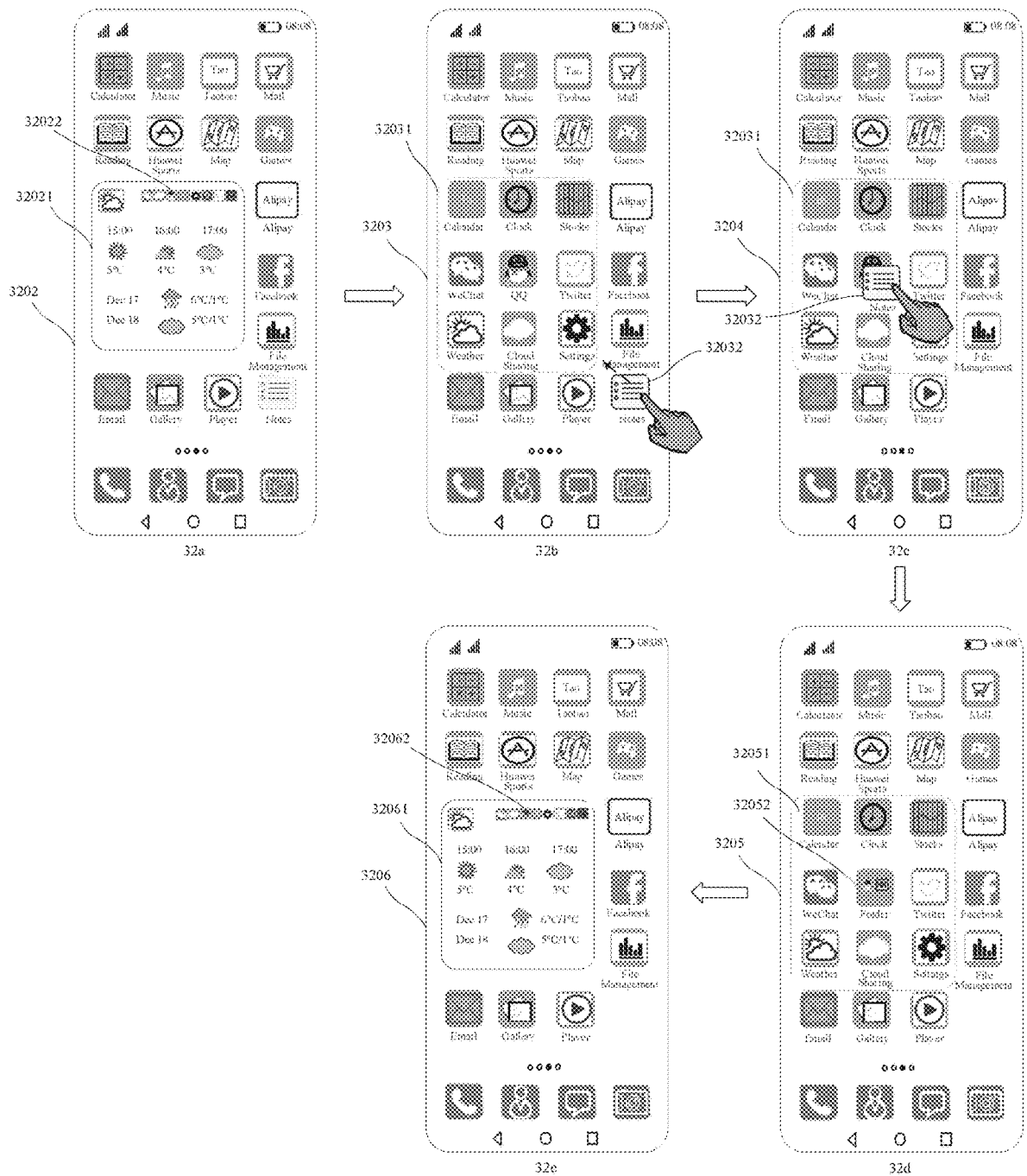
FIG. 32 is a schematic diagram of user interfaces of a card display method according to an embodiment of this application.
Figure 33:
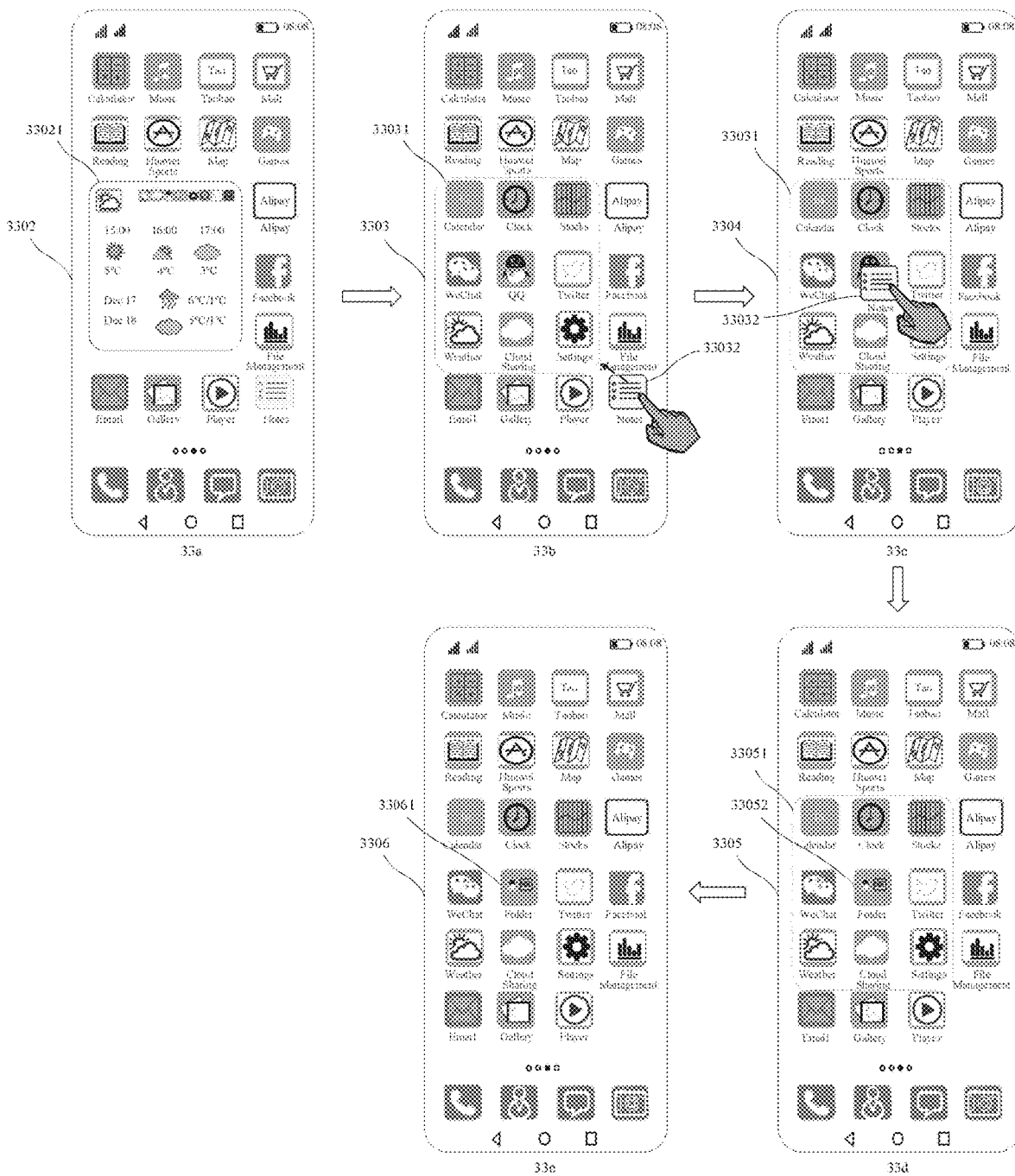
FIG. 33 is a schematic diagram of user interfaces of a card display method according to an embodiment of this application.

When a card and icons coexist on a current screen, operations such as dragging, deletion, and combining may also be performed on icons covered by the card. After such operations, how to display the card and the icons needs to be defined. For this, FIG. 32 to FIG. 38 show several specific implementations. FIG. 32 and FIG. 33 show two implementations of displaying a card and icons on a current screen of an electronic device after an icon outside the card is dragged to an icon covered by the card to generate a folder icon.

As shown in FIG. 32, a card 32021 and icons outside the card 32021 coexist on an interface 3202 shown in FIG. 32a. A second control region in an upper right corner of the card 32021 includes a QQ control. After a user touches and holds an icon 32022 of a Notes application by using a finger, a home screen enters an editing state. At that time, the interface changes to an interface 3203, the card 32021 also changes to a card 32031 that is in a transparent or semi-transparent state, and icons covered by the card 32031 are displayed on the interface 3203. Then, by using a finger, the user drags an icon 32032 of a Notes application toward an icon of a QQ application covered by the card 32031. When the user places the icon 32032 of the Notes application above the icon of the QQ application, the interface changes to an interface 3204. After the user releases the icon 32032 of the Notes application, the icon of the QQ application and the icon 32032 of the Notes application are combined into a folder icon 32052. At that time, the interface changes to an interface 3205, and the card 32031 that is in the transparent or semi-transparent state changes to a card 32051 that is in the transparent or semi-transparent state. Then, the card 32051 changes to a card 32061, and the card 32061 is no longer transparent. At that time, the interface changes to an interface 3206. When the card 32061 is compared with the card 32021, a difference between the two is that a second control region in an upper right corner of the card 32061 includes a folder control 32062 and no longer includes the QQ control 32022. In other words, in the implementation shown in FIG. 32, after a home screen enters an editing state and an icon outside a card is dragged to an icon covered by the card to generate a folder icon, a newly generated card differs from the original card only in that controls included in second control regions are different and the rest are all the same.

As shown in FIG. 33, a card 33021 and icons outside the card 33021 coexist on an interface 3302 shown in FIG. 33a. A second control region in an upper right corner of the card 33021 includes a QQ control. After a user touches and holds an icon 33032 of a Notes application by using a finger, a home screen enters an editing state. At that time, the interface changes to an interface 3303, the card 33021 changes to a card 33031 that is in a transparent or semi-transparent state, and icons covered by the card 33031 are displayed on the interface 3303. Then, by using a finger, the user drags the icon 33032 of the Notes application toward an icon of a QQ application covered by the card 33031. When the user places the icon 33032 of the Notes application above the icon of the QQ application, the interface changes to an interface 3304. After the user releases the icon 33032 of the Notes application, the icon of the QQ application and the icon 33032 of the Notes application are combined into a folder icon 33052. At that time, the card 33031 changes to a card 33051 that is in the transparent or semi-transparent state, and the interface changes to an interface 3305. Then, the card 33051 disappears. At that time, the interface changes to an interface 3306. In other words, in the implementation shown in FIG. 33, after a home screen enters an editing state and an icon outside a card is dragged to an icon covered by the card to generate a folder icon, the card is no longer displayed.

Figure 34:
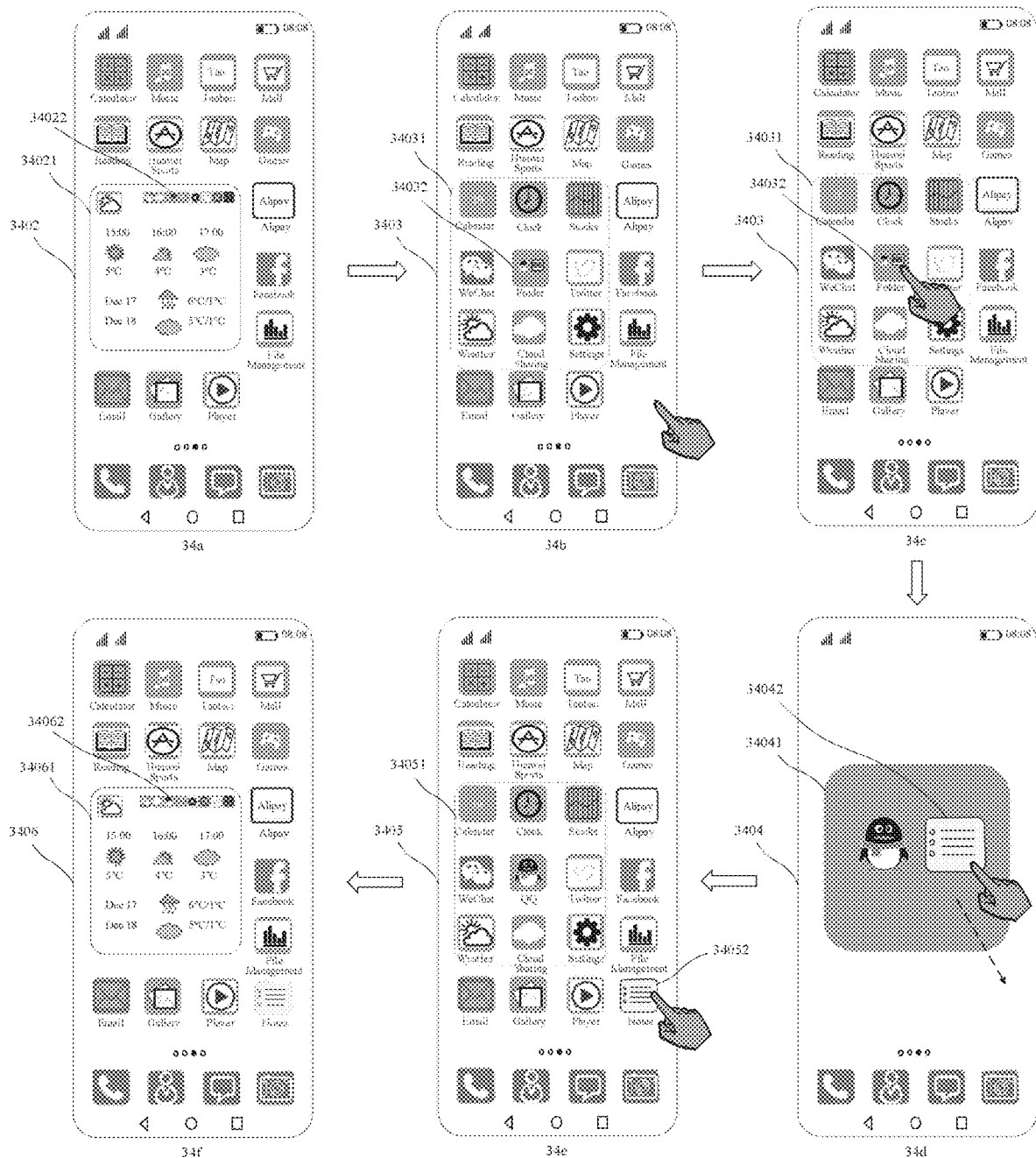
FIG. 34 is a schematic diagram of user interfaces of a card display method according to an embodiment of this application.

In addition to dragging an icon outside a card to an icon covered by the card to generate a folder icon, a specific application icon in a folder icon covered by a card may also be dragged out of the card. FIG. 34 shows an implementation of displaying a card and icons on a current screen of an electronic device after a specific application icon in a folder icon covered by a card is dragged out of the card. As shown in FIG. 34, a card 34021 and icons outside the card 34021 coexist on an interface 3402 shown in FIG. 34a. A second control region in an upper right corner of the card 34021 includes a folder control 34022. After a user touches and holds a blank space by using a finger, a home screen enters an editing state. At that time, the card 34021 changes to a card 34031 that is in a transparent or semi-transparent state, the interface changes to an interface 3403, and icons covered by the card 34031 are displayed on the interface 3403. Then, the user touches a folder icon 34032 by using a finger. At that time, the interface changes to an interface 3404, and the folder icon 34032 is enlarged and displayed as a folder icon 34041. Then, the user selects and drags an icon 34042 of a Notes application outward by using a finger.

After the user drags the icon 34042 of the Notes application to a position shown in FIG. 34e and releases the icon 34042 of the Notes application, the icon 34042 of the Notes application is reduced in size and displayed as an icon 34052 of the Notes application. At that time, the card 34031 changes to a card 34051 that is in the transparent or semi-transparent state, and the interface changes to an interface 3405. Then, the card 34051 changes to a card 34061, and the card 34061 is no longer transparent. At that time, the interface 3405 changes to an interface 3406. When the card 34061 is compared with the card 34021, a difference between the two is that a second control region in an upper right corner of the card 34061 includes a QQ control 34062 and no longer includes the folder control 34022. In other words, in the implementation shown in FIG. 34, after a home screen enters an editing state and a specific application icon in a folder icon covered by a card is dragged out of the card, a newly generated card differs from the original card only in that controls included in second control regions are different and the rest are all the same.

Figure 35:
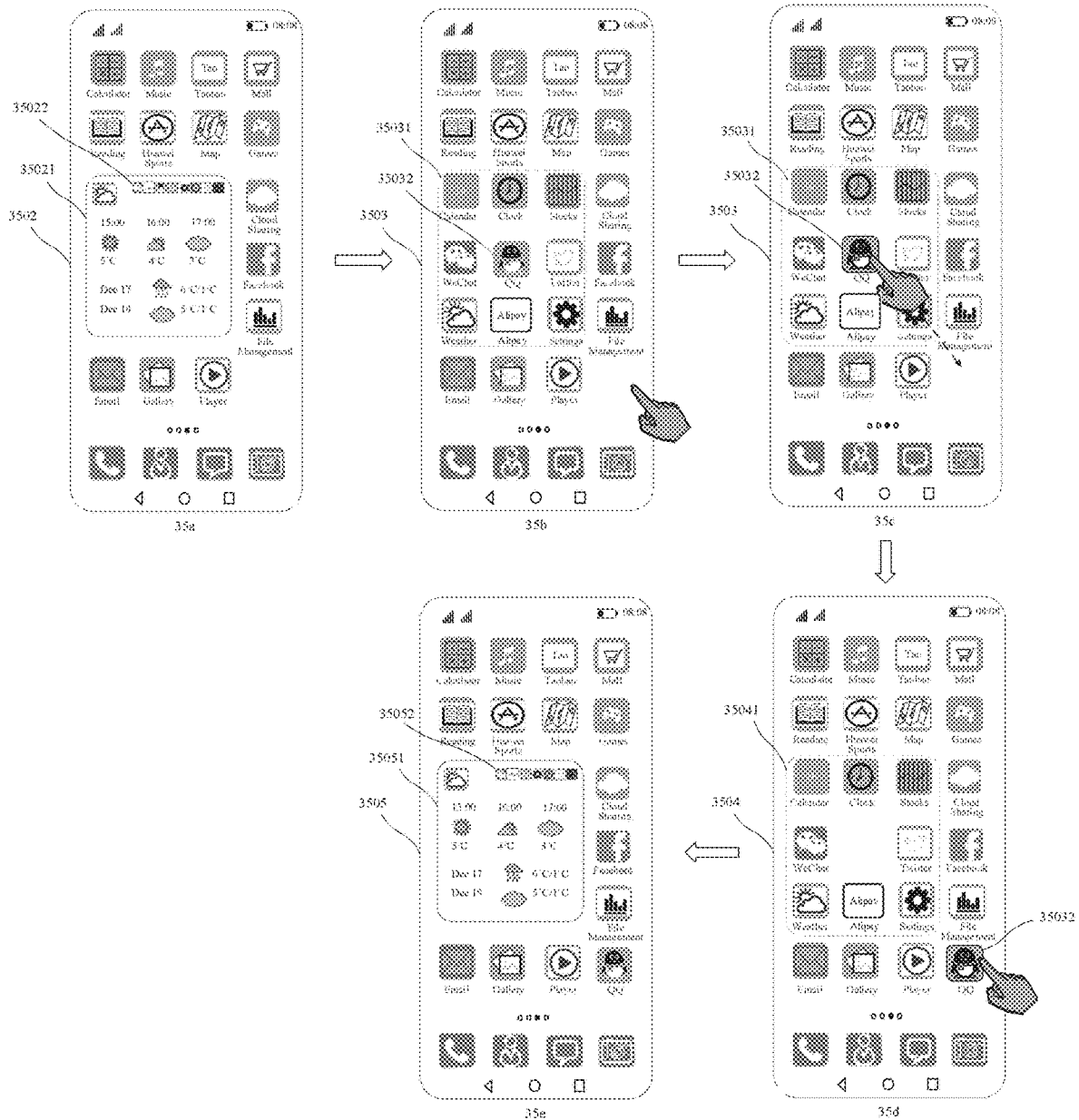
FIG. 35 is a schematic diagram of user interfaces of a card display method according to an embodiment of this application.
Figure 36:
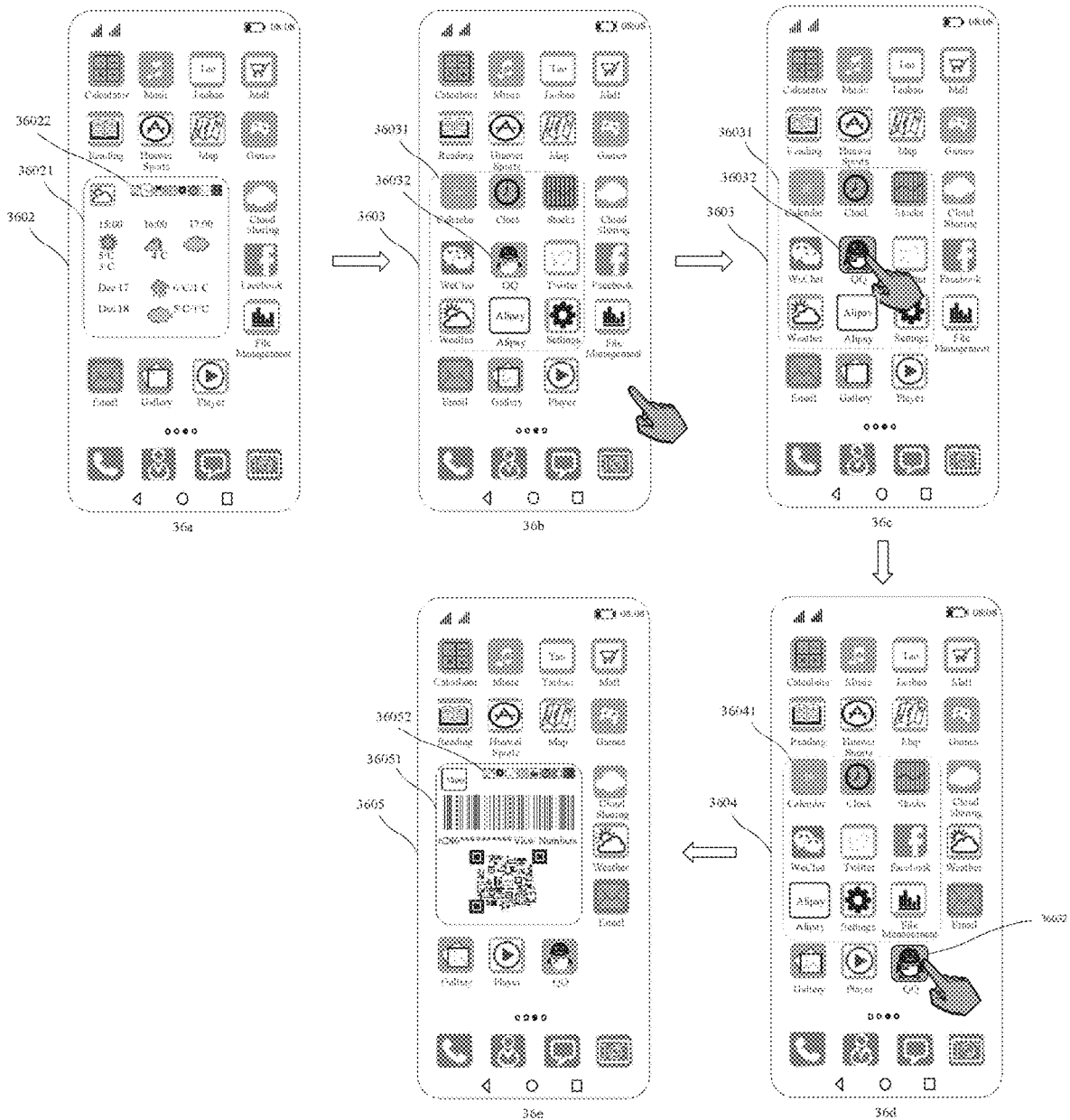
FIG. 36 is a schematic diagram of user interfaces of a card display method according to an embodiment of this application.

In addition to dragging a specific application icon in a folder icon covered by a card out of the card, an application icon covered by a card may also be directly dragged out of the card. FIG. 35 and FIG. 36 show two implementations of displaying a card and icons on a current screen of an electronic device after an application icon covered by the card is directly dragged out of the card. As shown in FIG. 35, a card 35021 and icons outside the card 35021 coexist on an interface 3502 shown in FIG. 35a. A second control region 35022 in an upper right corner of the card 35021 includes icons of WeChat, Alipay, QQ, Calendar. Settings, Clock, Twitter, and Stocks applications. After a user touches and holds a blank space by using a finger, a home screen enters an editing state. At that time, the card 35021 changes to a card 35031 that is in a transparent or semi-transparent state, the interface changes to an interface 3503, and icons covered by the card 35031 are displayed on the interface 3503. Then, the user selects and drags the icon 35032 of the QQ application outward by using a finger. After the user drags the icon 35032 of the QQ application to a position shown in FIG. 35d and releases the icon 35032 of the QQ application, the card 35031 changes to a card 35041 that is in the transparent or semi-transparent state, and the interface changes to an interface 3504. On the interface 3504, a position vacated after the icon of the QQ application is dragged away is not sequentially filled by another application icon. Then, the card 35041 changes to a card 35051, and the card 35051 is no longer transparent. At that time, the interface 3504 changes to an interface 3505, and a second control region 35052 in an upper right corner of the card 35051 includes the icons of the WeChat, Alipay, Calendar. Settings, Clock, Twitter, and Stocks applications. When the card 35051 is compared with the card 35021, a difference between the two is that the second control region 35052 of the card 35051 does not include a QQ control whereas the second control region 35022 of the card 35021 includes the QQ control. In other words, in the implementation shown in FIG. 35 after a home screen enters an editing state and an application icon covered by a card is dragged out of the card, a newly generated card differs from the original card only in that controls included in second control regions are different and the rest are all the same.

As shown in FIG. 36, a card 36021 and icons outside the card 36021 coexist on an interface 3602 shown in FIG. 36a. A second control region 36022 in an upper right corner of the card 36021 includes icons of WeChat, Alipay. QQ, Calendar, Settings, Clock, Twitter, and Stocks applications. After a user touches and holds a blank space by using a finger, a home screen enters an editing state. At that time, the card 36021 changes to a card 36031 that is in a transparent or semi-transparent state, the interface changes to an interface 3603, and icons covered by the card 36031 are displayed on the interface 3603. Then, the user selects and drags the icon 36032 of the QQ application outward by using a finger. After the icon 36032 of the QQ application is dragged away from an original position, following icons of applications such as Twitter, Facebook. Weather. Alipay, and File Management are sequentially filled into the vacancy. At that time, the card 36031 changes to a card 36041 that is in the transparent or semi-transparent state. After the user drags the icon 36032 of the QQ application to a position shown in FIG. 36d and releases the icon 36032 of the QQ application, the interface changes to an interface 3604. Then, the card 36041 changes to a card 36051, and the card 36051 is no longer transparent. At that time, the interface 3604 changes to an interface 3605, and a second control region 36052 in an upper right corner of the card 36051 includes the icons of the WeChat, Settings, Twitter, Calendar, File Management, Clock, Facebook, and Stocks applications. When the card 36051 is compared with the card 36021, a difference between the two is that content in a card content region of the card 36051, content in a first control region of the card 36051, and content in a second control region of the card 36051 are different from content in a card content region of the card 36021, content in a first control region of the card 36021, and content in a second control region of the card 36021, respectively. In other words, in the implementation shown in FIG. 36, after a home screen enters an editing state and an application icon covered by a card is dragged out of the card, a newly generated card differs from the original card in that content in a card content region of the card, content in a first control region of the card, and content in a second control region of the card change.

Figure 37:
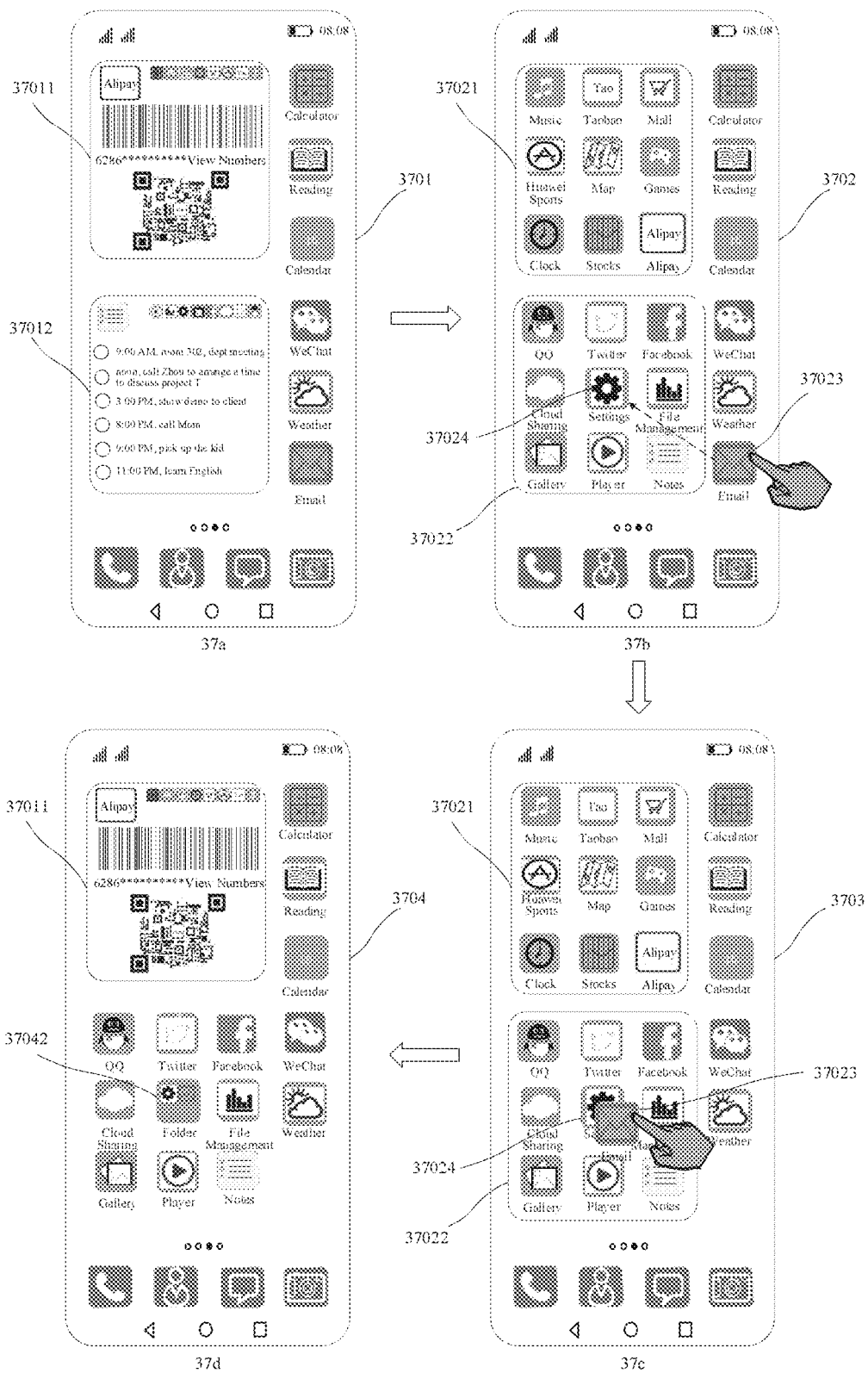
FIG. 37 is a schematic diagram of user interfaces of a card display method according to an embodiment of this application.
Figure 38:
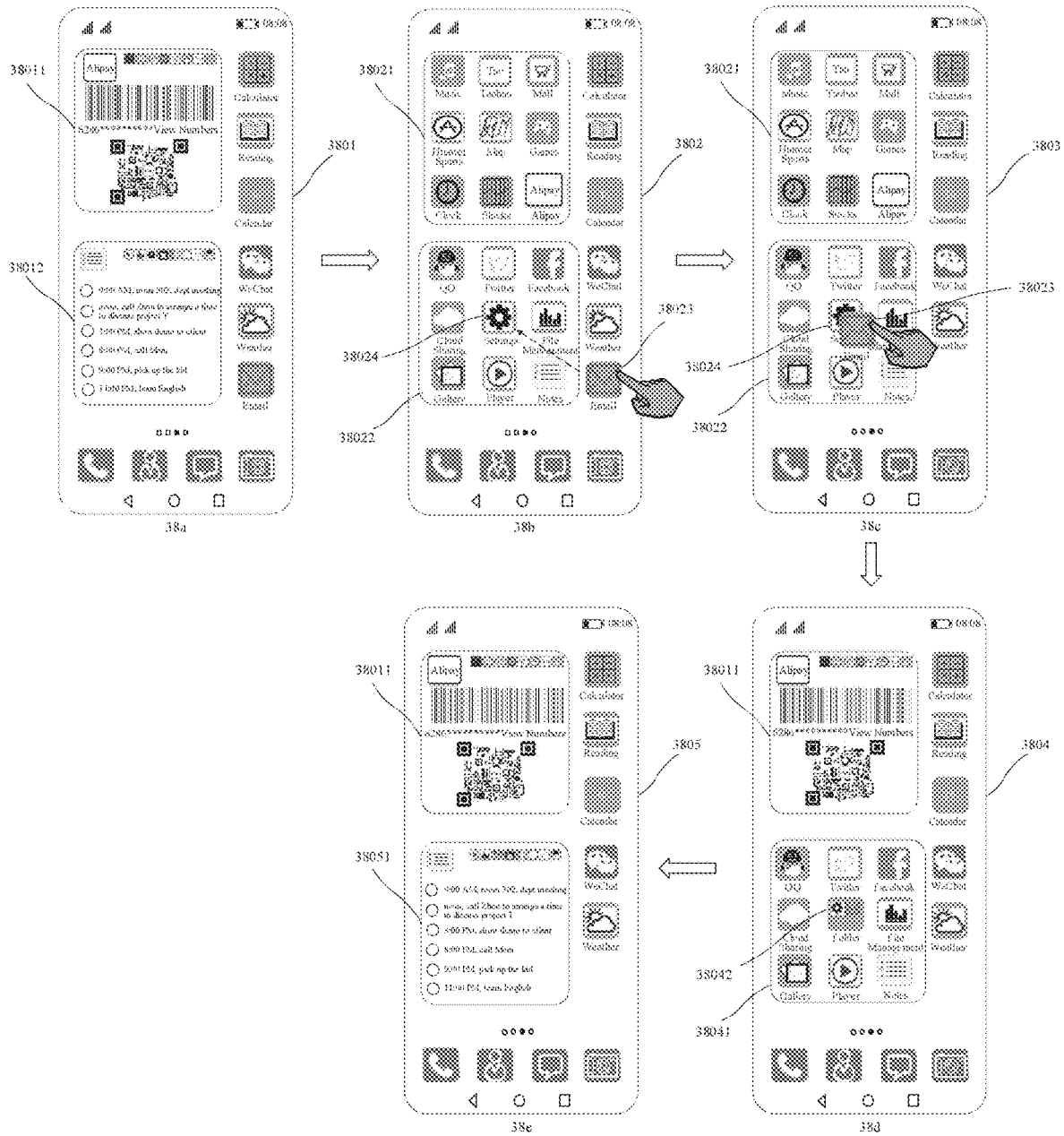
FIG. 38 is a schematic diagram of user interfaces of a card display method according to an embodiment of this application.

In addition, when there are a plurality of cards on a current screen of an electronic device, an icon outside the cards may be dragged to an icon covered by one of the cards to generate a folder. FIG. 37 and FIG. 38 show implementations of displaying cards and icons on a current screen of an electronic device after an icon outside the cards is dragged to an icon covered by one of the cards to generate a folder. For example, there are two cards. As shown in FIG. 37, a card 37011 and a card 37012 are on an interface 3701 shown in FIG. 37a. After a user touches and holds an icon 37023 of an Email application by using a finger, a home screen enters an editing state. At that time, the card 37011 and the card 37012 change to a card 37021 that is in a transparent or semi-transparent state and a card 37022 that is in a transparent or semi-transparent state, respectively, the interface changes to an interface 3702, and icons covered by the card 37021 and the card 37022 are displayed on the interface 3702. Then, by using a finger, the user drags the icon 37023 of the Email application toward an icon 37024 of a Settings application covered by the card 37022. When the user places the icon 37023 of the Email application above the icon 37024 of the Settings application, the interface changes to an interface 3703. After the user releases the icon 37023 of the Email application, the icon 37024 of the Settings application and the icon 37023 of the Email application are combined into a folder icon 37042. Then, the card 37021 changes to a card 37041, the card 37041 is no longer transparent, and the card 37022 disappears. At that time, the interface changes to an interface 3704, and the icons covered by the card 37022 are displayed on the interface 3704. In other words, in the implementation shown in FIG. 37, after a plurality of cards are displayed on a current screen and a home screen enters an editing state, an edited card is no longer displayed.

As shown in FIG. 38, a card 38011 and a card 38012 are on an interface 3801 shown in FIG. 38*a*. After a user touches and holds an icon 38023 of an Email application by using a finger, a home screen enters an editing state. At that time, the card 38011 and the card 38012 change to a card 38021 that is in a transparent or semi-transparent state and a card 38022 that is in a transparent or semi-transparent state, respectively, the interface changes to an interface 3802, and icons covered by the card 38021 and the card 38022 are displayed on the interface 3802. Then, by using a finger, the user drags the icon 38023 of the Email application toward an icon 38024 of a Settings application covered by the card 38022. When the user places the icon 38023 of the Email application above the icon 38024 of the Settings application, the interface changes to an interface 3803. After the user releases the icon 38023 of the Email application, the icon 38024 of the Settings application and the icon 38023 of the Email application are combined into a folder icon 38042. Then, the card 38021 changes to a card 38011, the card 38011 is no longer transparent, and the card 38022 changes to a card 38041. At that time, the interface changes to an interface 3804, and icons covered by the card 38041 are displayed on the interface 3804. Then, the card 38041 changes to a card 38051, the card 38051 is no longer transparent, the interface 3804 changes to an interface 3805, and the card 38011 remains unchanged. When the card 38051 is compared with the card 38012, a difference between the two is that controls included in a second control region of the card 38051 are different from controls included in a second control region of the card 38012. In other words, in the implementation shown in FIG. 38, after a plurality of cards are displayed on a current screen and a home screen enters an editing state, an edited card still remains but displays different content.

Figure 39:
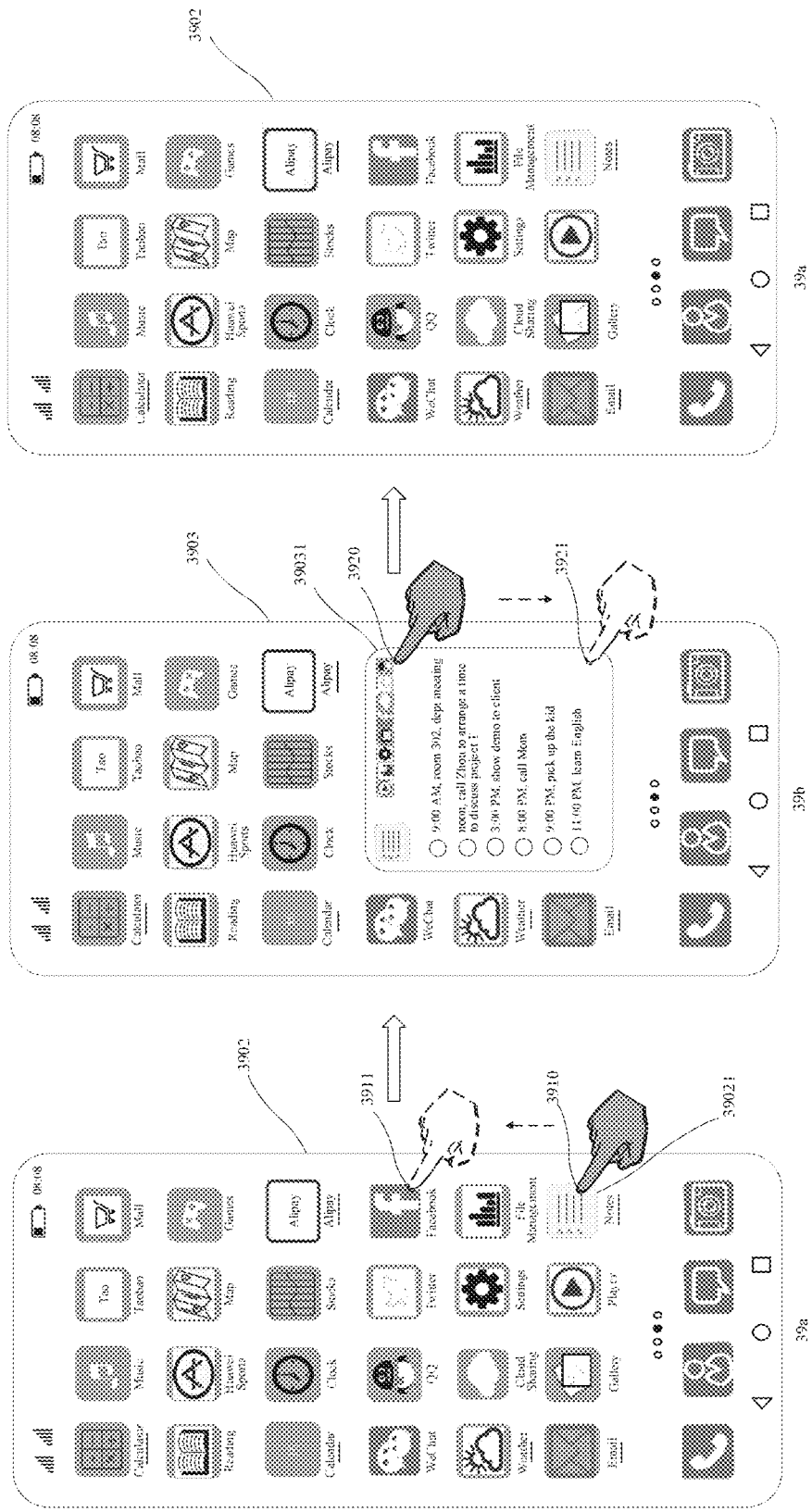
FIG. 39 is a schematic diagram of user interfaces of a card display method according to an embodiment of this application.

In some circumstances, not all icons on a current screen of a home screen of an electronic device can be used for generating cards. For example, a third-party application is installed on the electronic device, but the third-party application does not provide card information according to a setting requirement. Therefore, it is necessary to distinguish between the icons on the current screen of the home screen to provide convenience of use for a user. FIG. 39 is a schematic diagram of user interfaces of distinguishing an icon that can be used for generating a card from an icon that cannot be used for generating a card, by checking differences between the icons. As shown in FIG. 39*a*, text below an icon that can be used for generating a card is underlined, whereas text below an icon that cannot be used for generating a card is not underlined. In this way, a user can identify, by checking whether icons on a current screen of a home screen are so marked, an icon that can be used for generating a card. For example, the user finds that text below an icon of a Notes application shown in FIG. 39*a* is underlined, and therefore, the icon of the Notes application is an icon that can be used for generating a card. For a folder icon, as long as one of icons included in the folder icon can be used for generating a card, text under the folder icon is also underlined. The marking manner may alternatively be displaying a horizontal line between the icon that can be used for generating a card and the text below the icon, or displaying a rectangle box surrounding the icon that can be used for generating a card, or displaying a special mark such as a star in a specific position such as an upper right corner outside the icon that can be used for generating a card, or the like. Alternatively, an animation display manner may be used to identify an icon that can be used for generating a card. For example, within a specific period of time, a specific animation is displayed for an icon that can be used for generating a card, whereas no animation is displayed for an icon that cannot be used for generating a card. These examples of the marking manner are merely illustrative, and are not intended to limit the scope of the embodiments of this application. Other distinguishing manners perceivable by a person skilled in the art all fall within the scope of the embodiments of this application. Content about card generation based on the icon of the Notes application in FIG. 39*a* and content about card-based icon restoration in FIG. 39*b* are consistent with related content in FIG. 9*a* and FIG. 9*b*, respectively, and are not further described herein.

Figure 40:
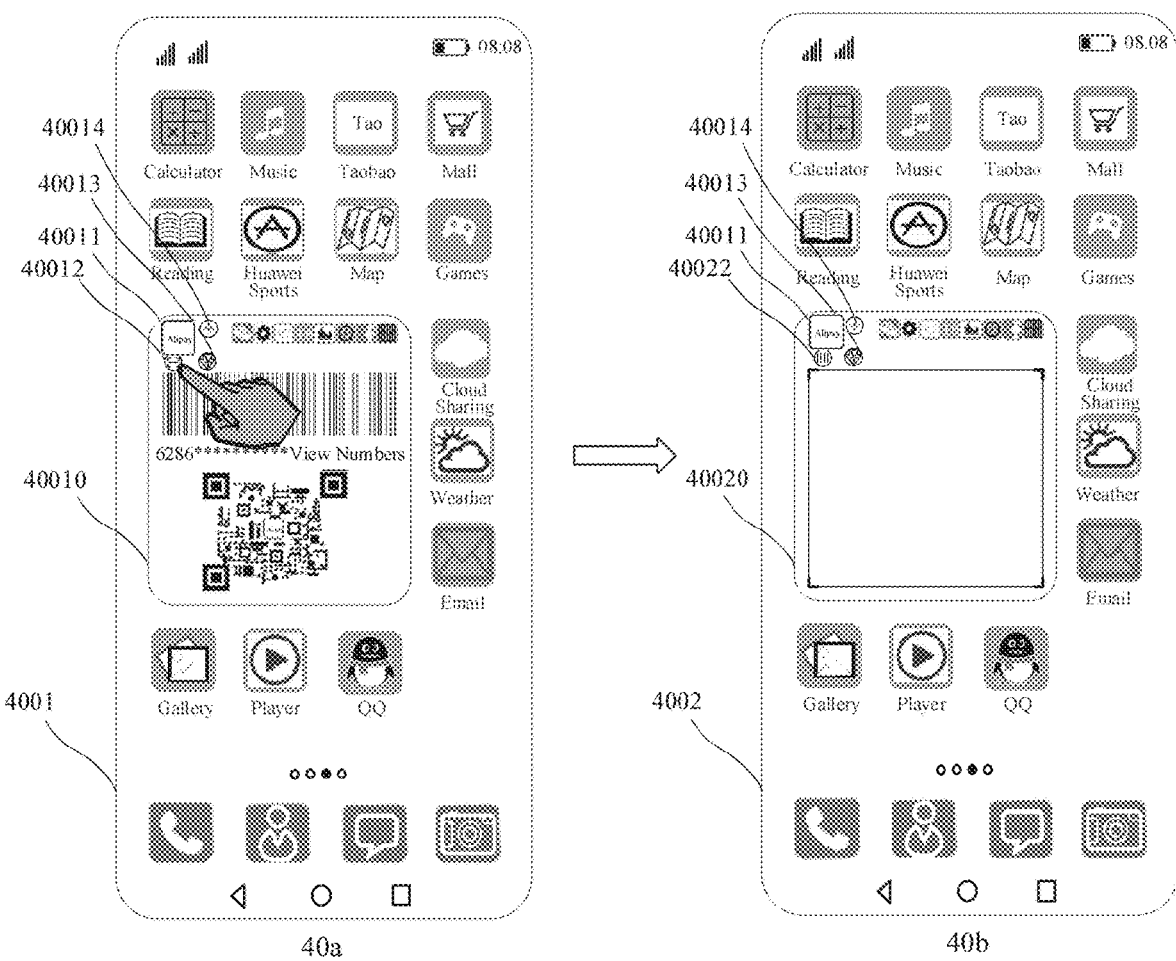
FIG. 40 is a schematic diagram of user interfaces of a card display method according to an embodiment of this application.
Figure 41:
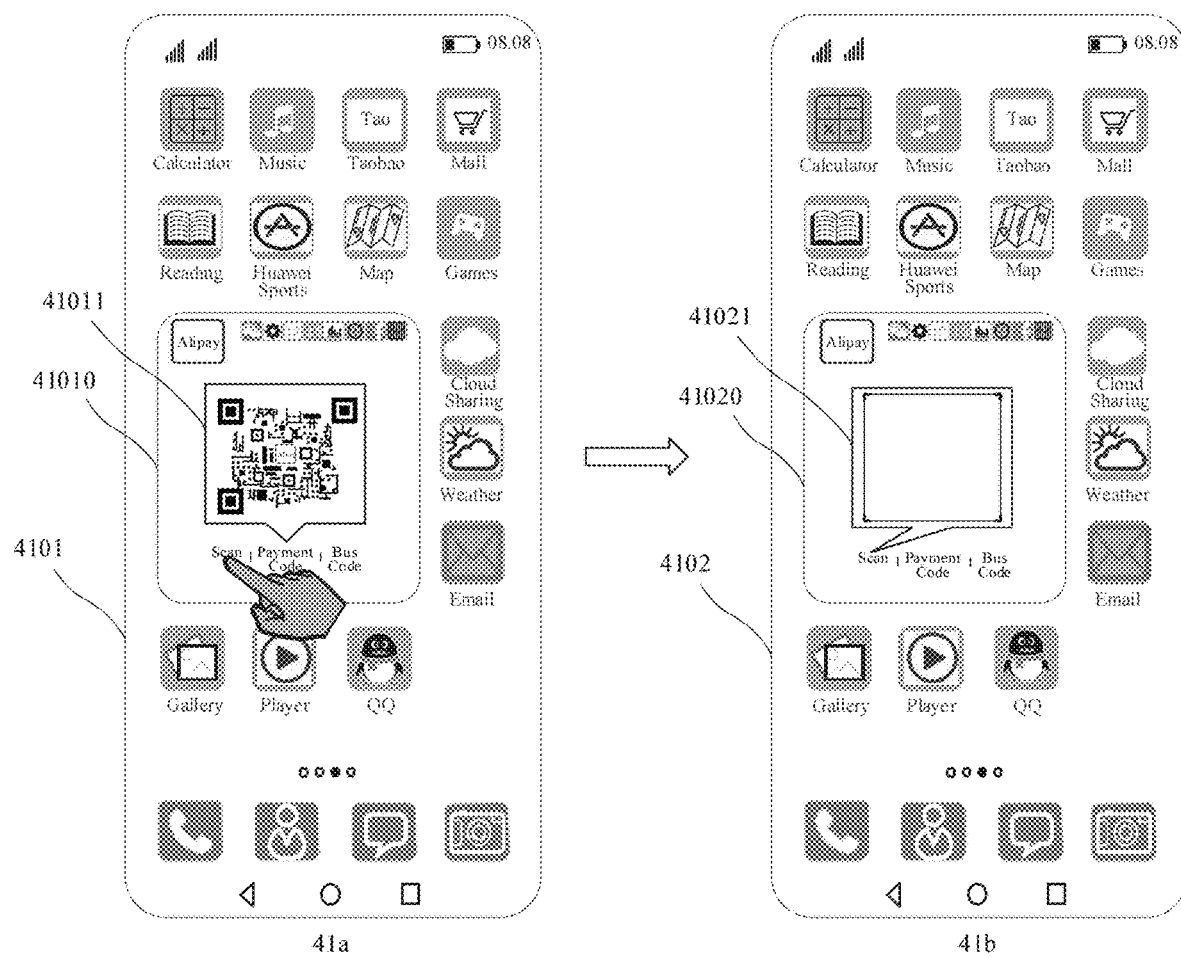
FIG. 41 is a schematic diagram of user interfaces of a card display method according to an embodiment of this application.

To implement switching between several functions of a first control on a same card, embodiments shown in FIG. 40 and FIG. 41 are further provided in the embodiments of this application. As shown in FIG. 40, a card 40010 is displayed on an interface 4001 shown in FIG. 40*a*. A first control 40011 is displayed in an upper left corner of the card 40010, and first sub-controls 40012, 40013, and 40014 are displayed around the first control 40011. The first sub-control 40012 is used as an example. On the interface 4001 shown in FIG. 40*a*, a payment code function of Alipay can be used directly. After a user touches the first sub-control 40012, the interface 4001 shown in FIG. 40*a* changes to an interface 4002 shown in FIG. 40*b*. Correspondingly, the first sub-control 40012 changes to a first sub-control 40022, and a payment code interface displayed in card content of the card 40010 also changes to a scan interface displayed in card content of the card 40020. In this way, on the interface 40020 shown in FIG. 40*b*, a scan function of Alipay can be used directly. When the user needs to call more functions, the user may directly touch/tap the first control 40011 to launch the Alipay application or directly touch/tap the first sub-control 40014.

As shown in FIG. 41, a card 41010 is displayed on an interface 4101 shown in FIG. 41*a*. Card content 41011 is displayed on the card 41010. In an upper part of the card content 41011, a QR code and an indication box accommodating the QR code are displayed, and in a lower part of the card content 41011, "Scan", "Payment Code", and "Bus Code" are displayed. At that time, an indication arrow of the indication box points to "Payment Code" displayed in the lower part. After a user touches/taps "Scan", the interface 4101 shown in FIG. 41*a* changes to an interface 4102 shown in FIG. 41*b*. On the interface 4102, in an upper part of card content 41021, a functional interface of "Scan" and an indication box accommodating the functional interface are displayed, and in a lower part of the card content 41021, "Scan", "Payment Code", and "Bus Code" are displayed. At that time, an indication arrow of the indication box points to "Scan" displayed in the lower part. In this way, on the interface 4101 shown in FIG. 41*a*, a scan function of Alipay can be used directly. In addition, the user may alternatively touch a button or text that is included in card content for switching to a different sub-function of a same application, thereby implementing switching between display of different sub-functions of the same application corresponding to the card content.

Figure 42:
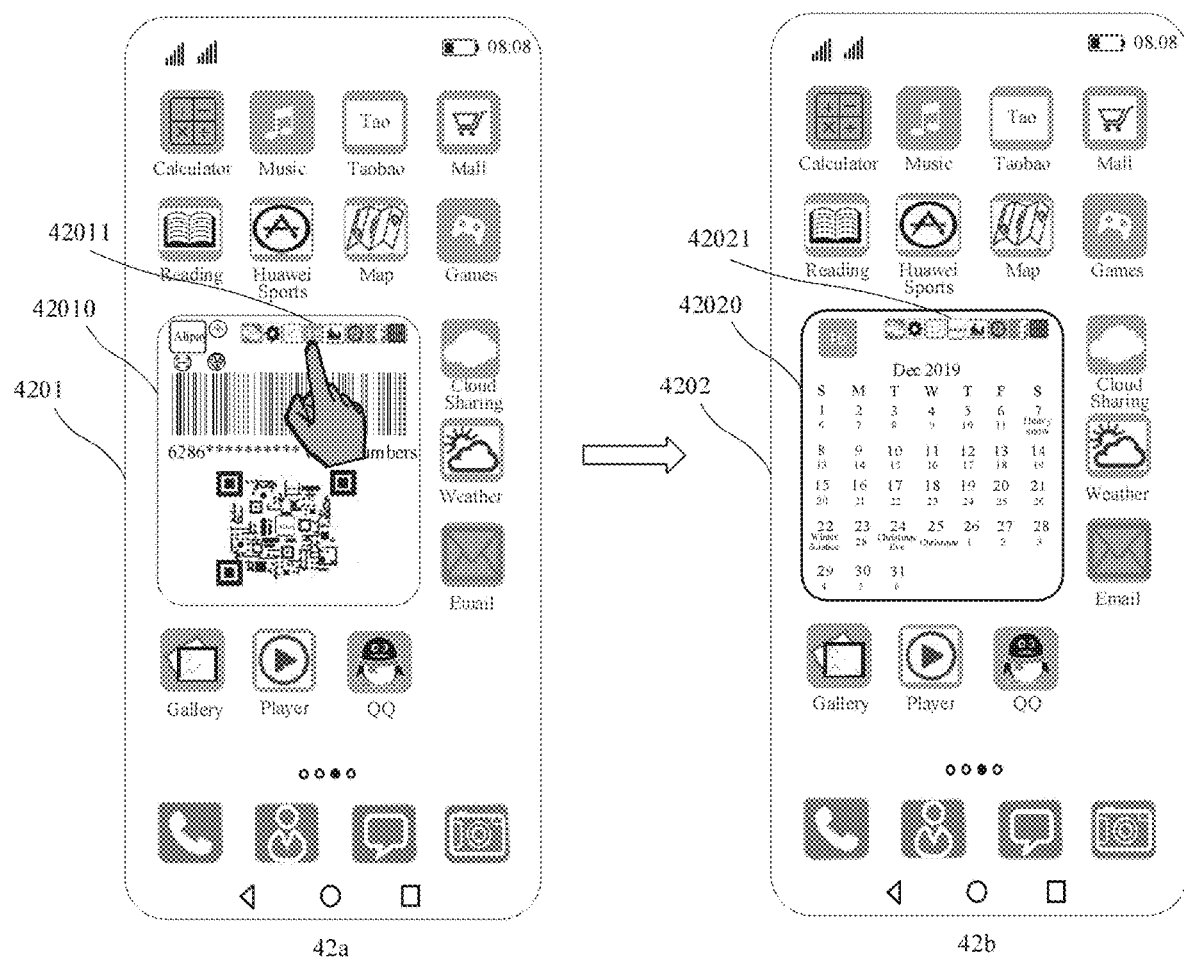
FIG. 42 is a schematic diagram of user interfaces of a card display method according to an embodiment of this application.

To implement switching between a first control and another control on a card and corresponding switching between card display, an embodiment shown in FIG. 42 is further provided in the embodiments of this application. As shown in FIG. 42, a card 42010 is displayed on an interface 4201 shown in FIG. 42*a*. A first control is displayed in an upper left corner of the card 42010. Three first sub-controls are displayed around the first control. Several controls are displayed in an upper right corner of the card 42010. A control 42011 is used as an example. On the interface 4201 shown in FIG. 42a, a payment code function of Alipay can be used directly. After a user touches the control 42011, the interface 4201 shown in FIG. 42a changes to an interface 4202 shown in FIG. 42b. The control 42011 is a control that is displayed after an icon of a Calendar application is reduced in size by a scale factor. Correspondingly, the control 42011 changes to a first control and is displayed in an upper left corner of a card 42020; and a payment code interface displayed in card content of the card 42010 also changes to a calendar interface displayed in card content of the card 42020. In this way, on the interface 42020 shown in FIG. 42b, a content interface of Calendar can be viewed directly. In other words, after the input of the user is detected, the first control and another control on the card can be switched, and the card content is also updated synchronously with the first control.

All or some of the embodiments provided in this application may be used in combination with each other.

The method provided in the embodiments of this application is applicable to the following electronic device.

Figure 43:
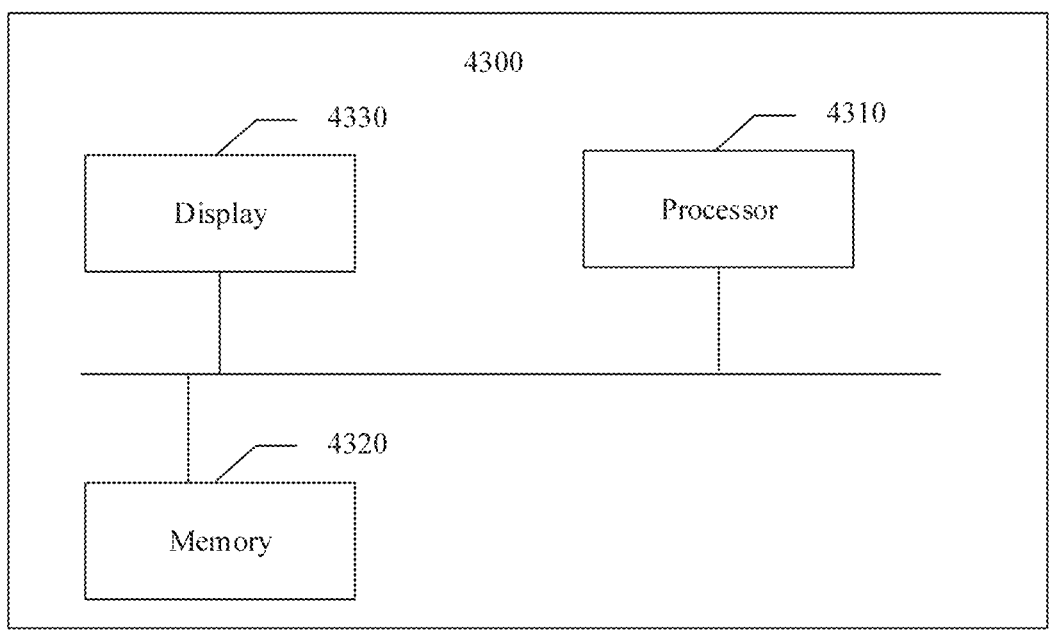
FIG. 43 is a schematic structural diagram of an electronic device according to an embodiment of this application.

FIG. 43 shows an electronic device 4300 according to this application. For example, the electronic device 4300 includes at least one processor 4310, a memory 4320, and a display 4330. The processor 4310 is coupled to the memory 4320 and the touchscreen 4330. Coupling in this embodiment of this application may be a communication connection, or may be in an electrical form or other forms. Specifically, the memory 4320 is configured to store program instructions; the touchscreen 4330 is configured to display user interfaces; and the processor 4310 is configured to invoke the program instructions stored in the memory 4020, so that the electronic device 4300 performs the steps performed by an electronic device in the card display method provided in the embodiments of this application. It should be understood that the electronic device 4300 may be used to implement the card display method provided in the embodiments of this application. For related characteristics, refer to the foregoing content, and details are not described herein again.

In some embodiments, when the display has a touch function, the display is also referred to as a touch display. An operation on the touch display may be implemented by using a virtual key. When the display does not have a touch function, the display is also referred to as a non-touch display. An operation on the non-touch display may be implemented by using a physical key.

This application provides a computer program product including instructions. When the computer program product is run on an electronic device, the electronic device is caused to perform the steps performed by an electronic device in the card display method provided in the embodiments of this application.

This application provides a computer readable storage medium including instructions. When the instructions are run on an electronic device, the electronic device is caused to perform the steps performed by an electronic device in the card display method provided in the embodiments of this application.

It may be clearly understood by a person skilled in the art that the embodiments of this application may be implemented using hardware or a combination of hardware and software. When being implemented using a combination of hardware and software, the foregoing functions may be stored in a computer readable medium. Based on such an understanding, the technical solutions in the embodiments of this application essentially, or the part contributing to the prior art, or all or part of the technical solutions may be represented in a form of a software product. The computer software product is stored in a storage medium, and includes several instructions for instructing a computer device (which may be a personal computer, a server, a network device, or the like) or a processor to perform all or some of the steps of the method described in the embodiments of this application. The storage medium includes various media that can store program code such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. An electronic device, comprising:
one or more processors;
a display coupled to the one or more processors; and
a memory coupled to the one or more processors, the memory configured to store one or more programs that, when executed by the one or more processors, cause the electronic device to be configured to:
display a first interface of a desktop, wherein the first interface comprises a first interaction element, a second interaction element, and a third interaction element, and wherein a desktop adjacent to the first interface comprises a fourth interaction element;
display a second interface in response to a first gesture input from a user, wherein the second interface comprises a first card and the third interaction element, wherein the first card comprises content generated by a first application and the first application corresponds to the first interaction element, wherein a starting point of the first gesture input is at the first interaction element and an ending point of the first gesture input is at the second interaction element;
switch the first card to a second card in the second interface in response to a second gesture input from the user, wherein the second card comprises content generated by the first application, and wherein the second gesture input is a sliding input applied to the first card of the second interface; and
switch the second interface to a third interface in response to a third gesture input from the user, wherein the third interface comprises the fourth interaction element, and wherein the third gesture input is a left or right swipe operation applied to the second interface.

2. The electronic device of claim 1, wherein the second interaction element is blocked by the first card in the second interface.

3. The electronic device of claim 2, wherein after displaying the second interface on the desktop, the one or more programs, when executed by the one or more processors, cause the electronic device to be further configured to, in response to a fourth gesture input from the user, stop displaying the first card and restoring the display of the second interaction element in the second interface.

4. The electronic device of claim 1, wherein after displaying the second interface, the one or more programs, when executed by the one or more processors, cause the electronic device to be further configured to:
- display a fourth interface of a second application in response to a fifth gesture input from the user, wherein the second application corresponds to the third interaction element, and the fifth gesture input is applied to the third interaction element; and
- restore the display of the first card and the third interaction element in response an operation to exit the fourth interface from the user.

5. The electronic device of claim 1, wherein the first interface further comprises a fifth interaction element, and wherein after displaying the first interface of the desktop, the one or more programs, when executed by the one or more processors, cause the electronic device to be further configured to display a fifth interface in response to a sixth gesture input from the user, wherein the fifth interface comprises a third card and the third interaction element, and the third card comprises content generated by the first application, and wherein a starting point of the sixth gesture input is at the first interaction element and an ending point of the sixth gesture input is at the fifth interaction element.

6. The electronic device of claim 1, wherein after displaying the second interface, the one or more programs, when executed by the one or more processors, cause the electronic device to be further configured to:
- lock the display of the electronic device; and
- restore the display of the first card and the third interaction element on the desktop in response to the display of the electronic device being unlocked.

7. The electronic device of claim 1, wherein the second interface further comprises a sixth interaction element and a seventh interaction element, and wherein after displaying the second interface, the one or more programs, when executed by the one or more processors, cause the electronic device to be further configured to display a sixth interface in response to a seventh gesture input from the user, wherein the sixth interface comprises a fourth card and the first card, and the fourth card comprises content generated by a third application, wherein the third application corresponds to the sixth interaction element, and wherein a starting point of the seventh gesture input is at the sixth interaction element and an ending point of the seventh gesture input is at the seventh interaction element.

8. The electronic device of claim 7, wherein after displaying the sixth interface, the one or more programs, when executed by the one or more processors, cause the electronic device to be further configured to switch the fourth card to a fifth card in the sixth interface in response to an eighth gesture input from the user, wherein the fifth card comprises content generated by a fourth application.

9. The electronic device of claim 8, wherein the fourth application corresponds to the seventh interaction element.

10. The electronic device of claim 8, wherein the fourth card comprises a first icon and a second icon, and wherein the first icon indicates the fourth card, and the second icon indicates the fifth card.

11. The electronic device of claim 1, wherein the first card comprises a first control, and the one or more programs, when executed by the one or more processors, cause the electronic device to be further configured to display a seventh interface of the first application in response to a user touch operation on the first control.

12. The electronic device of claim 11, wherein the first control is an icon of the first application.

13. The electronic device of claim 11, wherein the first control is located in an upper left corner of the first card.

14. The electronic device of claim 7, wherein the fourth card further comprises a button for a first function in the third application, and the one or more programs, when executed by the one or more processors, cause the electronic device to be further configured to, in response to a user click on the button for the first function, execute the first function and display a card content corresponding to the first function in the fourth card.

15. The electronic device of claim 1, wherein after switching the first card to the second card in the second interface, the one or more programs, when executed by the one or more processors, cause the electronic device to be further configured to switch the second card back to the first card in the second interface in response to a ninth gesture input from the user, wherein the ninth gesture input is applied to the second card, and a direction of the ninth gesture input is opposite to a direction of the second gesture input.

16. The electronic device of claim 1, wherein after displaying the second interface, the one or more programs, when executed by the one or more processors, cause the electronic device to be further configured to update the content of the first card and the second card.

17. The electronic device of claim 1, wherein the one or more programs, when executed by the one or more processors, cause the electronic device to be further configured to switch the first card or the second card to a third card in the second interface in response to a tenth gesture input from the user, wherein the third card comprises content generated by a second application, and wherein the tenth gesture input is a sliding input applied to the first card or the second card, respectively, of the second interface.

18. A method, comprising:
- displaying a first interface of a desktop, wherein the first interface comprises a first interaction element, a second interaction element, and a third interaction element, and wherein a desktop adjacent to the first interface comprises a fourth interaction element;
- displaying a second interface in response to a first gesture input from a user, wherein the second interface comprises a first card and the third interaction element, wherein the first card comprises content generated by a first application and the first application corresponds to the first interaction element, wherein a starting point of the first gesture input is at the first interaction element and an ending point of the first gesture input is at the second interaction element;
- switching the first card to a second card in the second interface in response to a second gesture input from the user, wherein the second card comprises content generated by the first application, and wherein the second gesture input is a sliding input applied to the first card of the second interface; and
- switching the second interface to a third interface in response to a third gesture input from the user, wherein the third interface comprises the fourth interaction element, and wherein the third gesture input is a left or right swipe operation applied to the second interface.

19. The method of claim 18, wherein the first interface further comprises a fifth interaction element, and after displaying the first interface of the desktop, the method further comprises displaying a fifth interface in response to a sixth gesture input from the user, wherein the fifth interface comprises a third card and the third interaction element, and the third card comprises content of the first application, and wherein a starting point of the sixth gesture input is at the first interaction element and an ending point of the sixth gesture input is at the fifth interaction element.

20. The method of claim 18, wherein the second interface further comprises a sixth interaction element and a seventh interaction element, and wherein after displaying the second interface, the method further comprises:
- displaying a sixth interface in response to a seventh gesture input from the user, wherein the sixth interface comprises a fourth card and the first card, and the fourth card comprises content generated by a third application, wherein the third application corresponds to the sixth interaction element, and wherein a starting point of the seventh gesture input is at the sixth interaction element and an ending point of the seventh gesture input is at the seventh interaction element; and
- switching the fourth card to a fifth card in the sixth interface in response to an eighth gesture input from the user, wherein the fifth card comprises content generated by a fourth application, and the fourth application corresponds to the seventh interaction element.

21. The method of claim 18, wherein after displaying the second interface on the desktop, the method further comprises, in response to a fourth gesture input from the user, stopping displaying the first card and restoring the display of the second interaction element in the second interface.

22. The method of claim 18, wherein after displaying the second interface, the method further comprises:
- locking a display of an electronic device; and
- restoring the display of the first card and the third interaction element on the desktop in response to the display of the electronic device being unlocked.

* * * * *